United States Patent
Au

(10) Patent No.: US 9,766,319 B2
(45) Date of Patent: Sep. 19, 2017

(54) OFF-SET DRIVE ASSEMBLY FOR SOLAR TRACKER

(71) Applicant: NEXTracker Inc., Fremont, CA (US)

(72) Inventor: Alexander W. Au, El Cerrito, CA (US)

(73) Assignee: NEXTRACKER INC., Fremont, CA (US)

( * ) Notice: Subject to any disclaimer, the term of this patent is extended or adjusted under 35 U.S.C. 154(b) by 0 days.

(21) Appl. No.: 14/489,409

(22) Filed: Sep. 17, 2014

(65) Prior Publication Data

US 2015/0000721 A1    Jan. 1, 2015

Related U.S. Application Data

(63) Continuation-in-part of application No. 14/101,273, filed on Dec. 9, 2013.

(Continued)

(51) Int. Cl.
*F16C 23/10*    (2006.01)
*F16C 25/02*    (2006.01)
(Continued)

(52) U.S. Cl.
CPC .......... *G01S 3/7861* (2013.01); *F16C 11/045* (2013.01); *F16C 23/10* (2013.01);
(Continued)

(58) Field of Classification Search
CPC ........ F16C 11/045; F16C 23/10; F16C 35/02; F16C 25/02; F24J 2/541; F24J 2/523;
(Continued)

(56) References Cited

U.S. PATENT DOCUMENTS

| 7,836,879 B2 * | 11/2010 | Mackamul | F16M 11/10 |
| | | | 126/600 |
| 8,168,931 B1 * | 5/2012 | Thel | F24J 2/542 |
| | | | 126/601 |

(Continued)

FOREIGN PATENT DOCUMENTS

| CN | 103426944 A | * | 12/2013 | ........... H01L 31/042 |
| JP | 5508039 B2 | * | 5/2014 | ........... H01L 31/042 |

(Continued)

OTHER PUBLICATIONS

International Search Report and Written Opinion for PCT/US2013/073948, filed on Dec. 9, 2013.

*Primary Examiner* — Marcus Charles
(74) *Attorney, Agent, or Firm* — Richard T. Ogawa; Ogawa P.C.

(57) ABSTRACT

In an example, the present invention provides a solar tracker apparatus configured with an off-set drive assembly. In an example, the apparatus has an inner race structure, which has a cylindrical region coupled to a main body region, the main body comprising an off-set open region. The cylindrical region is an annular sleeve structure coupled to the main body region, which occupies the spatial region within the cylindrical region. In an example, the apparatus has an outer race structure coupled to enclose the inner race structure, configured to couple the inner race structure to allow the inner race structure to move in a rotational manner about a spatial arc region; and configured to allow the inner race structure to pivot about a region normal to a direction of the spatial arc region. In an example, the solar tracker has a clamp assembly that is configured to pivot a torque tube.

17 Claims, 58 Drawing Sheets

Related U.S. Application Data

(60) Provisional application No. 61/735,537, filed on Dec. 10, 2012.

(51) Int. Cl.
*F16C 11/00* (2006.01)
*F24J 2/54* (2006.01)
*F16H 19/08* (2006.01)
*G01S 3/786* (2006.01)
*H01L 31/042* (2014.01)
*F16C 11/04* (2006.01)
*H02S 20/32* (2014.01)
*H02S 20/10* (2014.01)
*F24J 2/52* (2006.01)

(52) U.S. Cl.
CPC .............. *F16C 25/02* (2013.01); *F16H 19/08* (2013.01); *F24J 2/523* (2013.01); *F24J 2/541* (2013.01); *H02S 20/10* (2014.12); *H02S 20/32* (2014.12); *F24J 2002/5482* (2013.01); *Y02E 10/47* (2013.01); *Y10T 74/18792* (2015.01)

(58) Field of Classification Search
CPC ......... F24J 2002/5482; F24J 2002/5468; F24J 2002/5479; F16H 19/08; H01L 31/042; H01L 31/52; H02S 20/32; H02S 20/10; G01S 3/7861; Y02E 10/47
USPC ......... 384/3, 26, 29, 91, 129, 156, 255, 428, 384/441; 136/246–248, 690; 74/89.14; 211/1.52; 126/606

See application file for complete search history.

(56) References Cited

U.S. PATENT DOCUMENTS

| | | | |
|---|---|---|---|
| 8,407,950 B2 * | 4/2013 | Hartelius | F24J 2/5233 52/173.3 |
| 8,459,249 B2 | 6/2013 | Corio | |
| 2003/0034029 A1 | 2/2003 | Shingleton | |
| 2008/0251115 A1 * | 10/2008 | Thompson | F24J 2/541 136/251 |
| 2011/0253195 A1 * | 10/2011 | Kim | F24J 2/541 136/246 |
| 2012/0091077 A1 | 4/2012 | Zurtis | |
| 2012/0132258 A1 * | 5/2012 | Albanese | F24J 2/1057 136/248 |
| 2012/0180845 A1 * | 7/2012 | Cole | F24J 2/541 136/246 |
| 2012/0279489 A1 * | 11/2012 | Vogt | F24J 2/542 126/606 |
| 2015/0092383 A1 | 4/2015 | Corio et al. | |

FOREIGN PATENT DOCUMENTS

| | | | | |
|---|---|---|---|---|
| KR | 20040085388 A | * | 10/2004 | ............ F03D 9/00 |
| KR | 10-0896332 B1 | | 5/2009 | |
| WO | WO 2012/076949 A1 | | 6/2012 | |

* cited by examiner

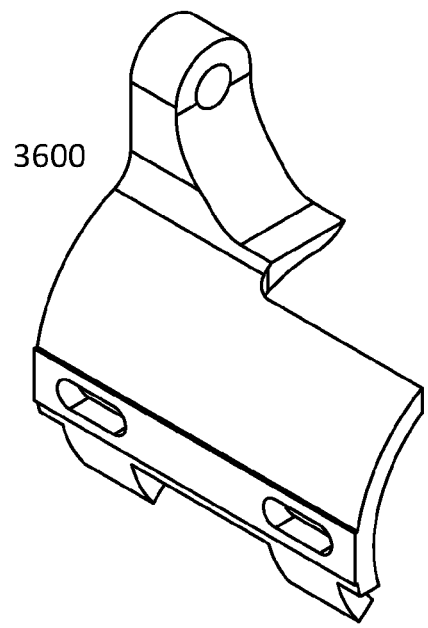
FIGURE 36
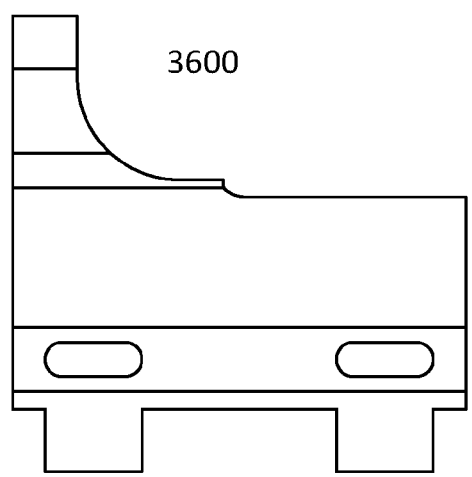 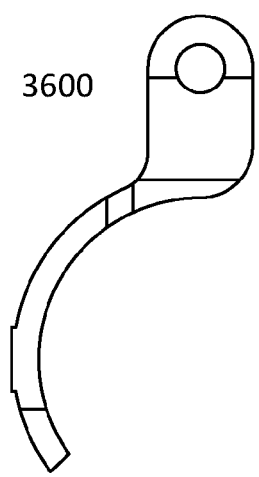
FIGURE 37          FIGURE 38

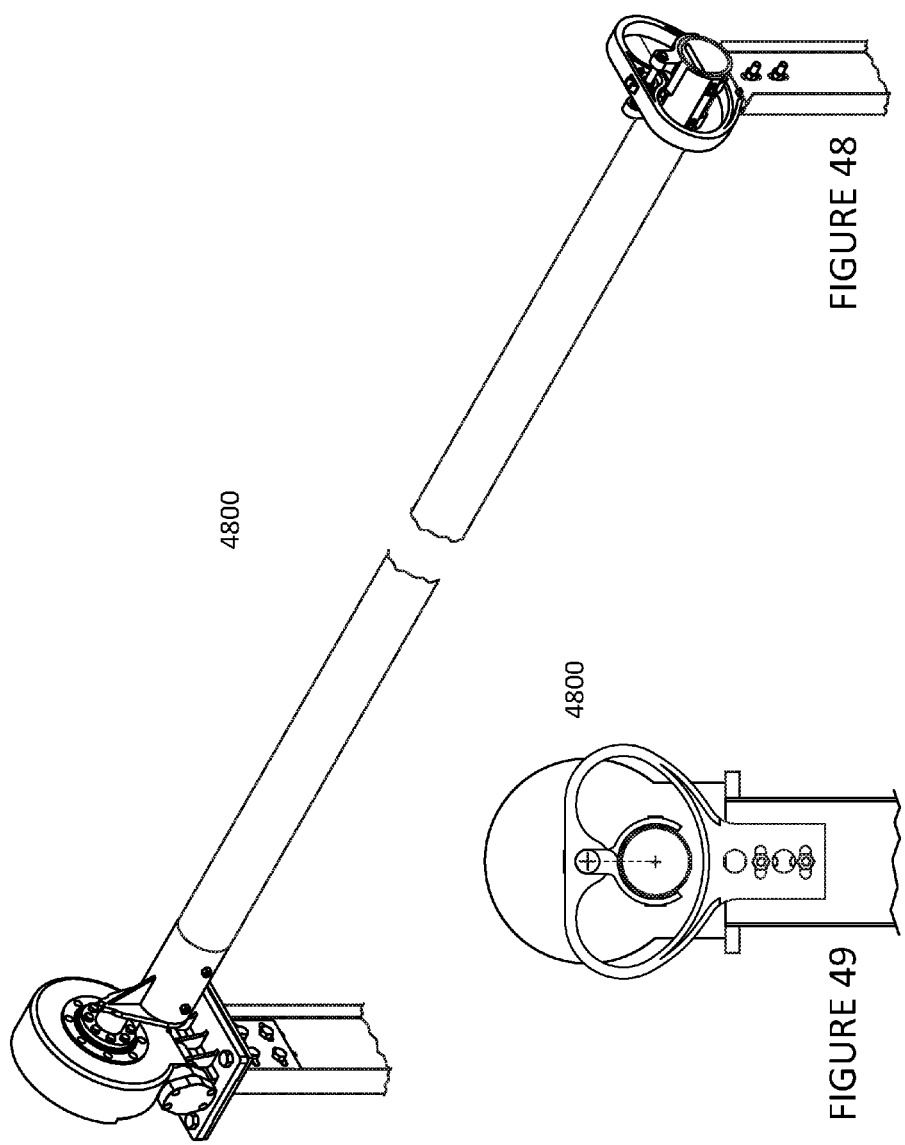

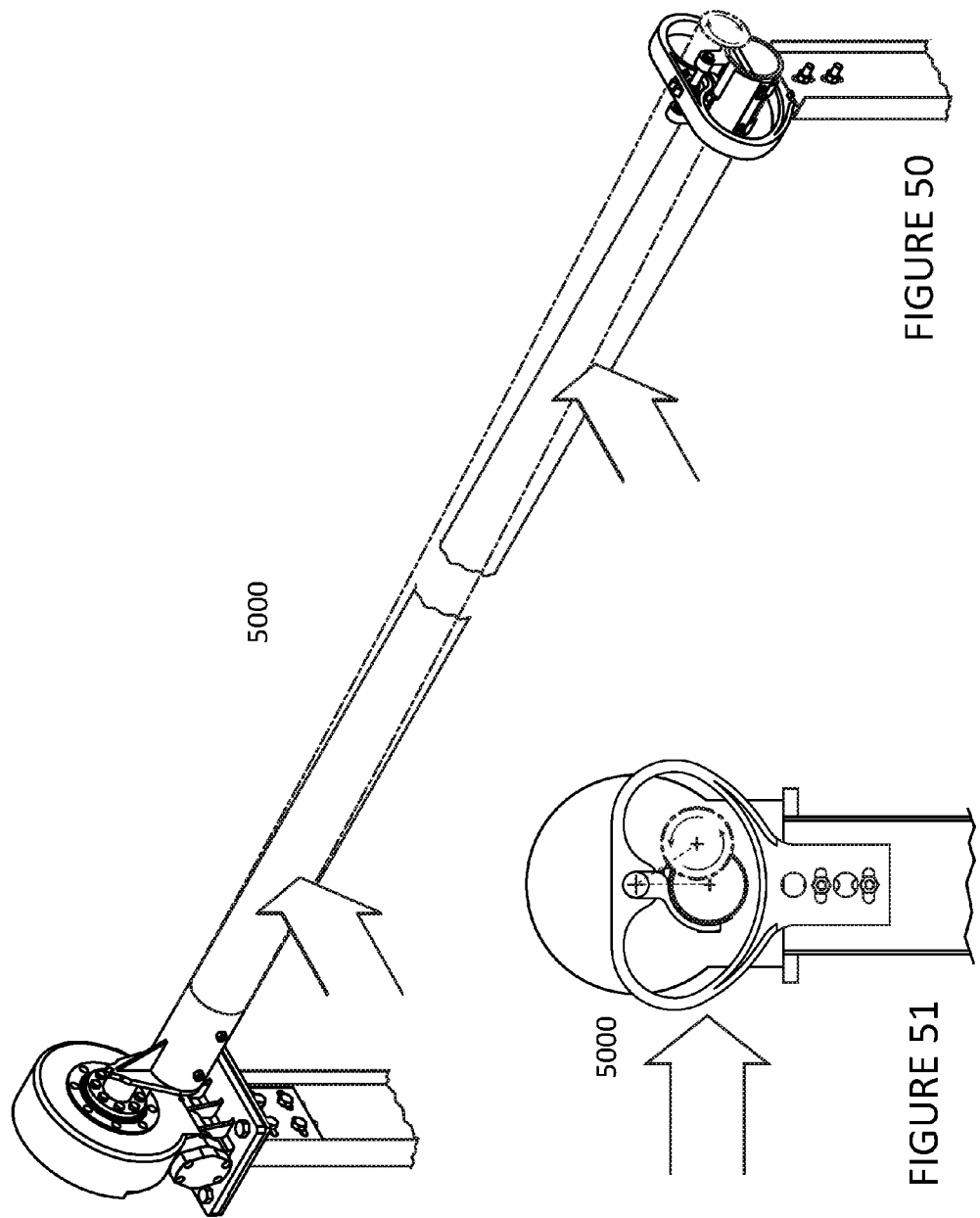

5420

OFF-SET DRIVE ASSEMBLY FOR SOLAR TRACKER

CROSS-REFERENCE TO RELATED APPLICATIONS

The present invention is a continuation in part of U.S. Ser. No. 14/101,273 filed Dec. 9, 2013, which claims priority to U.S. Provisional Application No. 61/735,537 filed Dec. 10, 2012, each of which is incorporated by reference herein for all purposes. The present application also incorporates by reference, for all purposes, the following concurrently filed patent applications, all commonly owned: Ser. No. 14/489,412 entitled OFF-SET SWIVEL DRIVE ASSEMBLY FOR SOLAR TRACKER, filed Sep. 17, 2014, and Ser. No. 14/489,416 entitled CLAMP ASSEMBLY FOR SOLAR TRACKER, filed Sep. 17, 2014.

BACKGROUND

The present application relates generally to a tracking system for solar panels. More specifically, embodiments of the present invention provide tracking systems that are suitable for solar panels. In a specific embodiment, a tracking system according to the present invention is fully adjustable in at each of the pillars, among other aspects. There are other embodiments as well.

As the population of the world increases, industrial expansion has lead to an equally large consumption of energy. Energy often comes from fossil fuels, including coal and oil, hydroelectric plants, nuclear sources, and others. As an example, the International Energy Agency projects further increases in oil consumption, with developing nations such as China and India accounting for most of the increase. Almost every element of our daily lives depends, in part, on oil, which is becoming increasingly scarce. As time further progresses, an era of "cheap" and plentiful oil is coming to an end. Accordingly, other and alternative sources of energy have been developed.

Concurrent with oil, we have also relied upon other very useful sources of energy such as hydroelectric, nuclear, and the like to provide our electricity needs. As an example, most of our conventional electricity requirements for home and business use come from turbines run on coal or other forms of fossil fuel, nuclear power generation plants, and hydro-electric plants, as well as other forms of renewable energy. Often times, home and business use of electrical power has been stable and widespread.

Most importantly, much if not all of the useful energy found on the Earth comes from our sun. Generally all common plant life on the Earth achieves life using photo-synthesis processes from sun light. Fossil fuels such as oil were also developed from biological materials derived from energy associated with the sun. For human beings including "sun worshipers," sunlight has been essential. For life on the planet Earth, the sun has been our most important energy source and fuel for modern day solar energy.

Solar energy possesses many characteristics that are very desirable! Solar energy is renewable, clean, abundant, and often widespread. Certain technologies have been developed to capture solar energy, concentrate it, store it, and convert it into other useful forms of energy.

Solar panels have been developed to convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels are unable to convert energy at their full potential due to the fact that the sun is often at an angle that is not optimum for the solar cells to receive solar energy. In the past, various types of conventional solar tracking mechanisms have been developed. Unfortunately, conventional solar tracking techniques are often inadequate. These and other limitations are described throughout the present specification, and may be described in more detail below.

From the above, it is seen that techniques for improving solar systems are highly desirable.

SUMMARY OF THE INVENTION

The present application relates generally to a tracking system for solar panels. More specifically, embodiments of the present invention provide tracking systems that are suitable for solar panels. In a specific embodiment, a tracking system according to the present invention is fully adjustable in at each of the pillars, among other aspects. There are other embodiments as well.

In an example, the present invention provides a solar tracker apparatus configured with an off-set drive assembly. In an example, the apparatus has an inner race structure, which has a cylindrical region coupled to a main body region, the main body comprising an off-set open region. The cylindrical region is an annular sleeve structure coupled to the main body region, which occupies the spatial region within the cylindrical region. In an example, the apparatus has an outer race structure coupled to enclose the inner race structure, and configured to couple the inner race structure to allow the inner race structure to move in a rotational manner about a spatial arc region; and configured to allow the inner race structure to pivot about a region normal to a direction of the spatial arc region. In an example, the apparatus has a torque tube sleeve configured in an off-set manner on a region between a center region and an outer region of the inter race structure, and configured to be inserted within the off-set open region; and a drive coupled to the inner race structure to cause the torque tube to move about an arc region In an example, the solar tracker has a clamp assembly that is configured to pivot a torque tube. In an example, the assembly has a support structure configured as a frame having configured by a first anchoring region and a second anchoring region. In an example, the support structure is configured from a thickness of metal material. In an example, the support structure is configured in an upright manner, and has a major plane region. In an example, the assembly has a pivot device configured on the support structure and a torque tube suspending on the pivot device and aligned within an opening of the support and configured to be normal to the plane region. In an example, the torque tube is configured on the pivot device to move about an arc in a first direction or in a second direction such that the first direction is in a direction opposite to the second direction.

In an example, the present invention provides a solar tracker apparatus. In an example, the apparatus comprises a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube. Further details of the present example, among others, can be found throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 36, 37, and 38 are simplified perspective-view, side view, and front view diagrams of a clamp member according to an embodiment of the present invention.

FIGS. 48 and 49 illustrate various views of a tracker apparatus according to an embodiment of the present invention.

FIGS. 50 and 51 illustrate views of a tracker apparatus according to an embodiment of the present invention.

DESCRIPTION OF THE SPECIFIC EMBODIMENTS

Figure 1:
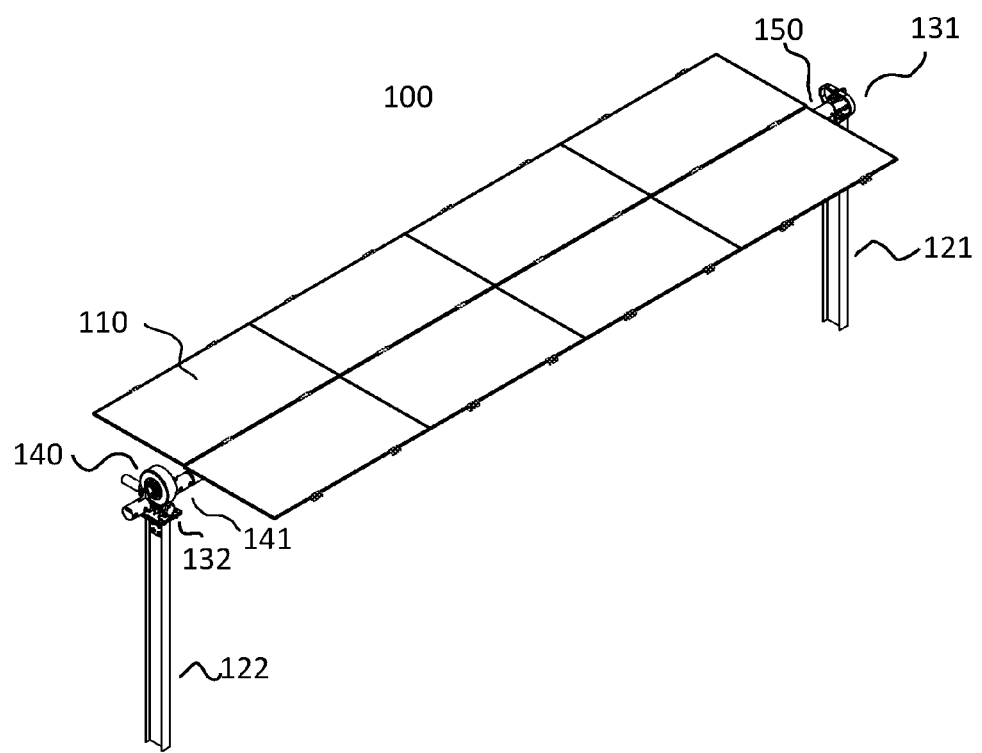
FIG. 1 is a simplified perspective view of a horizontal tracker apparatus configured with a plurality of solar modules according to an embodiment of the present invention.
Figure 2:
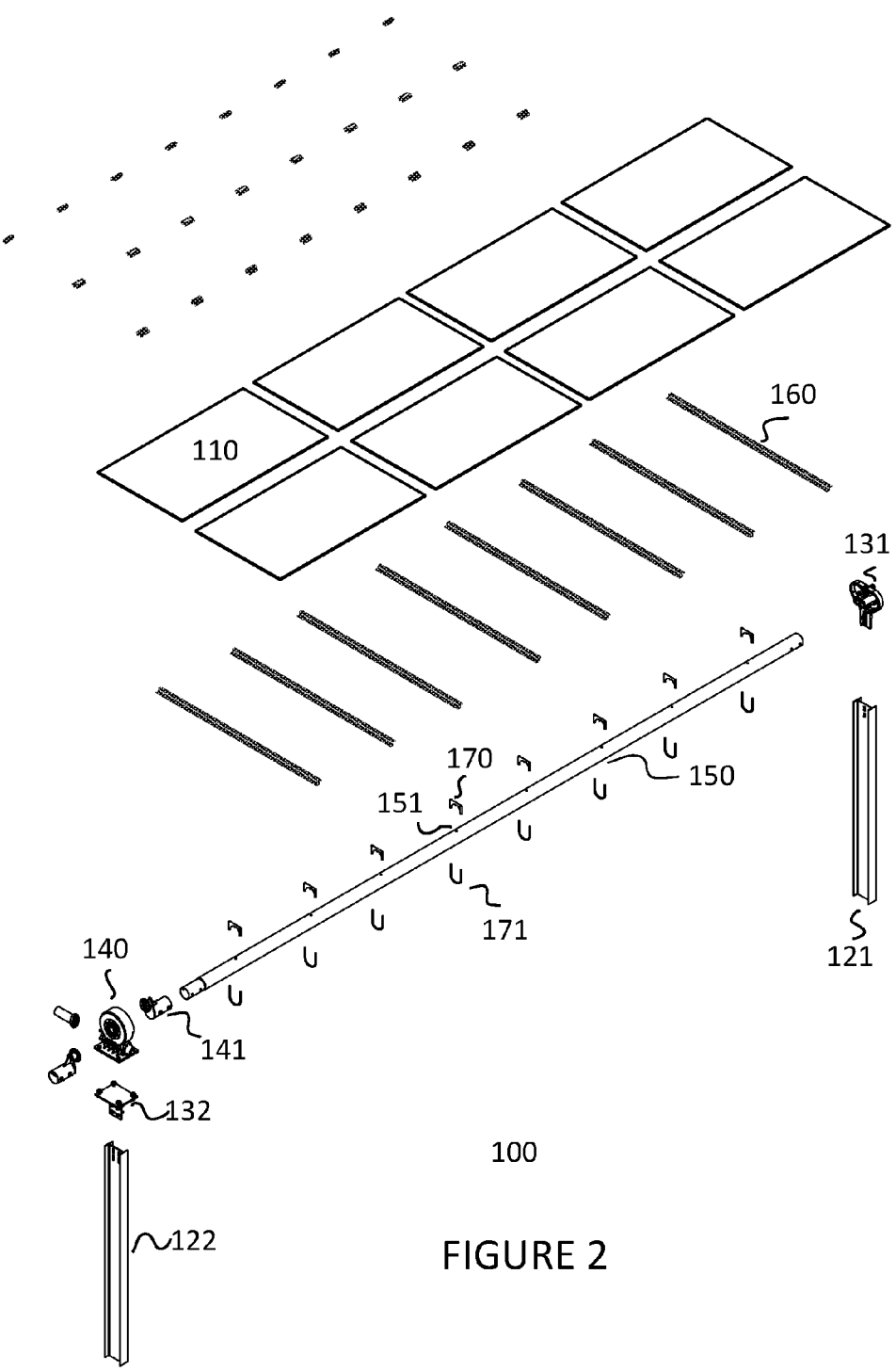
FIGS. 2 through 7 illustrate a method of assembling the horizontal tracker apparatus of FIG. 1.
Figure 3:
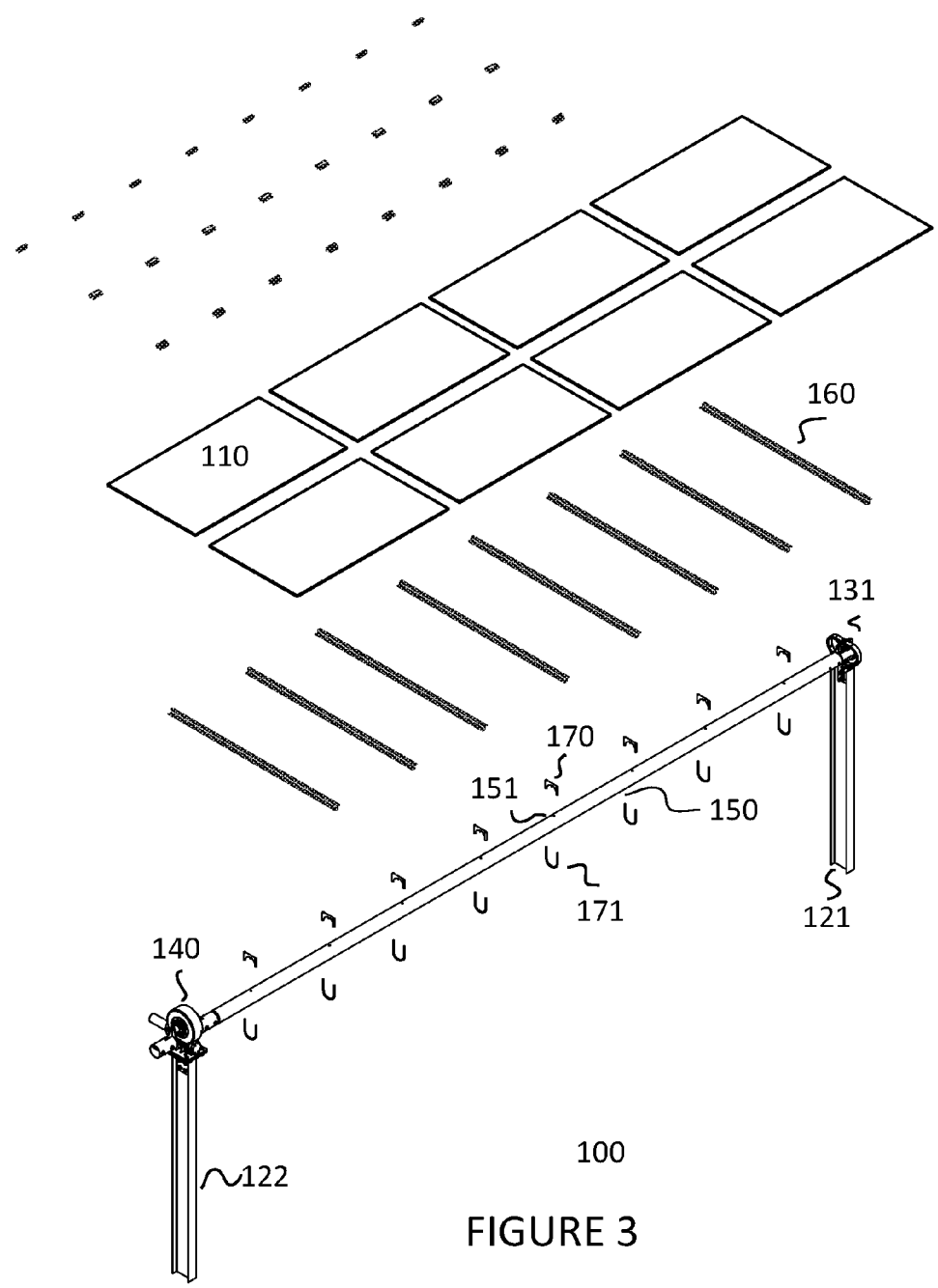
Figure 4:
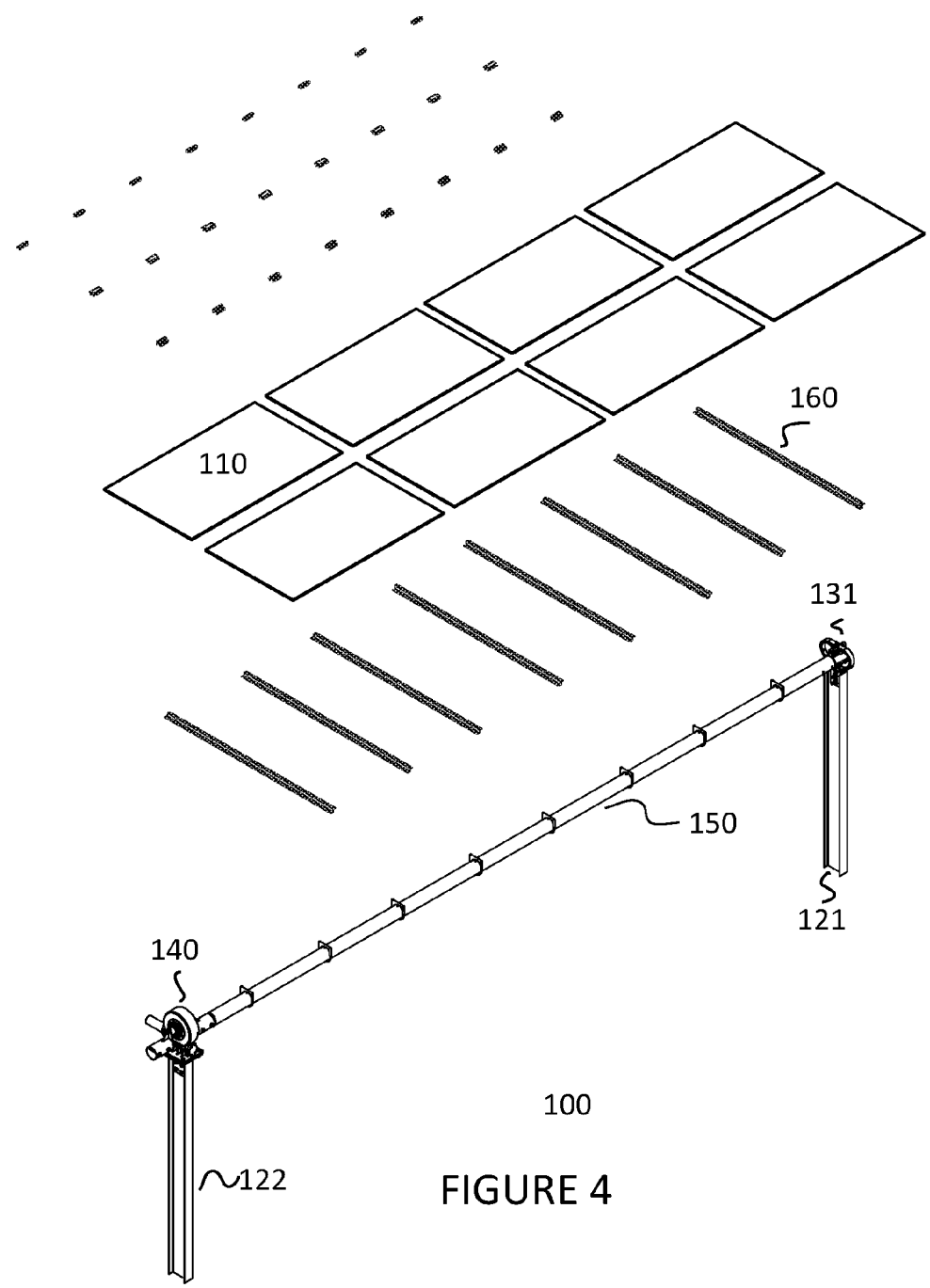
Figure 5:
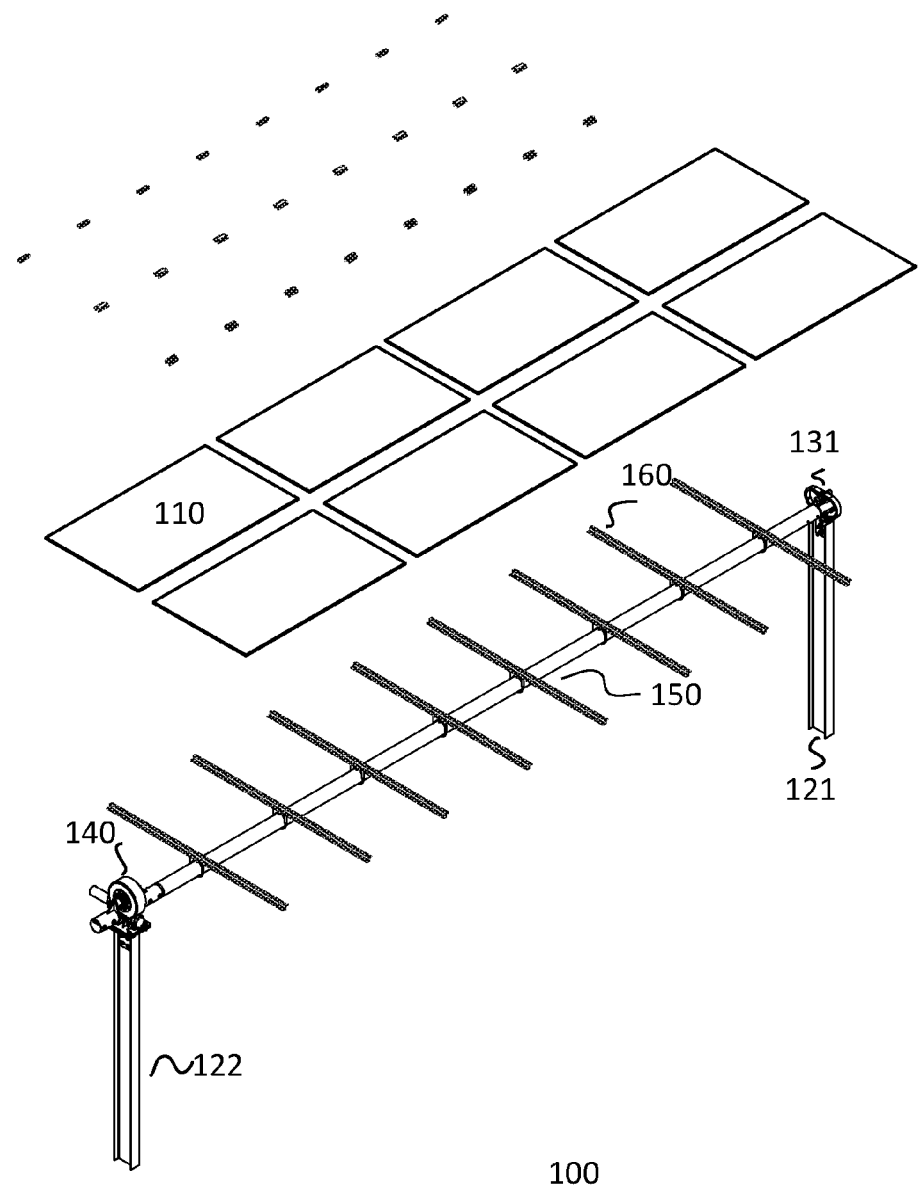
Figure 6:
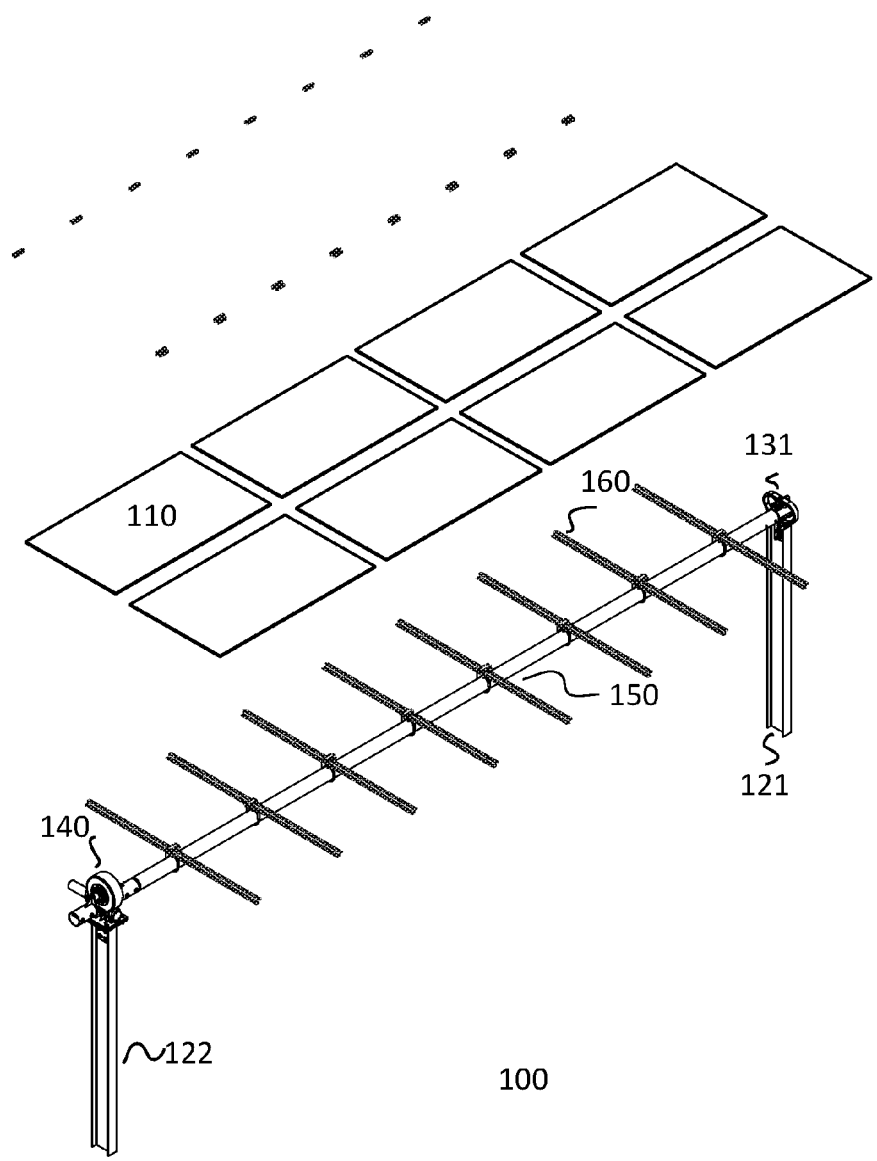
Figure 7:
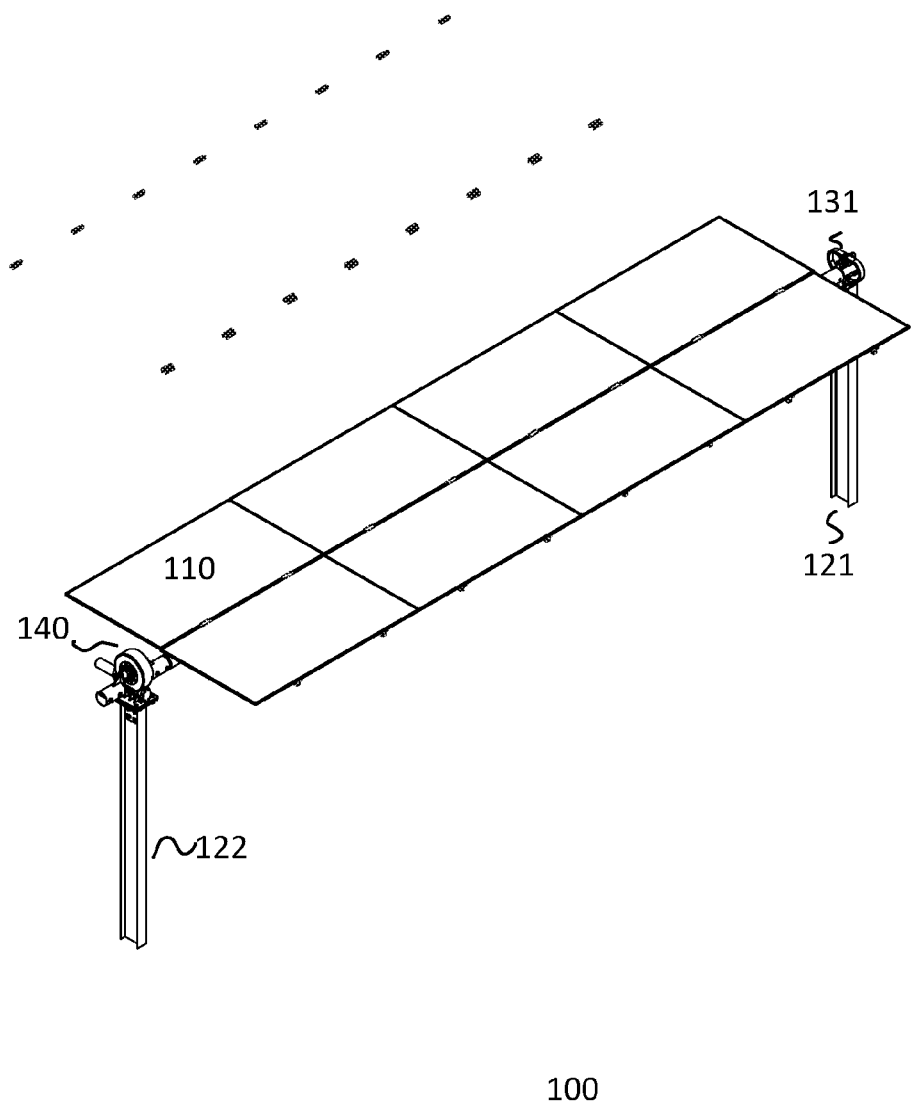

The present application relates generally to a tracking system for solar panels. More specifically, embodiments of the present invention provide tracking systems that are suitable for solar panels. In a specific embodiment, a tracking system according to the present invention is fully adjustable in at each of the pillars, among other aspects. There are other embodiments as well.

In a specific embodiment, the present invention provides a tracker apparatus for solar modules. The tracker apparatus has a first pier comprising a first pivot device and a second pier comprising a drive mount. The drive mount is capable for construction tolerances in at least three-axis, and is configured to a drive device. The drive device has an off-set clamp device coupled to a cylindrical bearing device coupled to a clamp member. The apparatus has a cylindrical torque tube operably disposed on the first pier and the second pier. The cylindrical torque tube comprises a first end and a second end, and a notch. The notch is one of a plurality of notches spatially disposed along a length of the cylindrical torque tube. The apparatus has a clamp configured around an annular portion of the cylindrical torque tube and mate with the notch to prevent movement of the clamp. The clamp comprises a support region configured to support a portion of a solar module.

In an alternative embodiment, the present invention provides an alternative solar tracker apparatus. The apparatus has a drive device, a crank coupled to the drive device and configured in an offset manner to a frame assembly. The frame assembly is coupled to a plurality of solar modules.

In an example, the apparatus has a continuous torque tube spatially disposed from a first region to a second region. The crank comprises a first crank coupled to a first side of the drive device and a second crank coupled to a second side of the drive device. The crank comprises a first crank coupled to a first side of the drive device and a second crank coupled to a second side of the drive device; and further comprises a first torque tube coupled to the first crank and a second torque tube coupled to the second crank. The crank comprises a first crank coupled to a first side of the drive device and a second crank coupled to a second side of the drive device; and further comprises a first torque tube coupled to the first crank and a second torque tube coupled to the second crank, and further comprises a first swage fitting coupling the first crank to the first torque tube and a second swage fitting coupling the second crank to the second torque tube. The apparatus also has a pier coupled to the drive device. In an example, the apparatus also has a drive mount coupled to a pier.

In an alternative embodiment, the present invention provides an alternative solar tracker apparatus. The apparatus has a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube.

In an example, the drive motor is operable to move the torque tube about the center of rotation and is substantially free from a load. The center of rotation is offset from a center of the cylindrical torque tube.

In an alternative embodiment, the present invention provides a solar tracker apparatus. The apparatus has a clamp housing member configured in an upright direction. The clamp housing member comprises a lower region and an upper region. The lower region is coupled to a pier structure, and the upper region comprises a spherical bearing device. The upright direction is away from a direction of gravity. The apparatus has a clam shell clamp member coupled to the cylindrical bearing and a torque tube coupled to the spherical bearing to support the torque tube from the upper region of the clamp housing member. The torque tube is configured from an off-set position from a center region of rotation.

In an example, the apparatus is configured substantially free from any welds during assembly. Reduced welding lowers cost, improves installation time, avoids errors in installation, improves manufacturability, and reduces component count through standardized parts. The torque tube is coupled to another torque tube via a swage device within a vicinity of the clam shall clamp member. In an example, the connection is low cost, and provides for strong axial and torsional loading. The apparatus is quick to install with the pokey-yoke design. The torque tube is coupled to an elastomeric damper in line to dampen torque movement to be substantially free from formation of a harmonic waveform along any portion of a plurality of solar panels configured to the torque tube. The apparatus also has a locking damper or rigid structure to configure a solar panel coupled to the torque tube in a fixed tilt position to prevent damage to stopper and lock into a foundation-in a position that is substantially free from fluttering in an environment with high movement of air. The apparatus further comprises a controller apparatus configured in an inserter box provided in an underground region to protect the controller apparatus. The apparatus has a drive device to linearly actuate the torque tube. In an example, the apparatus uses an electrical connection coupled to a drive device. In an example, the spherical bearing allows for a construction tolerance, tracker movement, and acts as a bonding path of least resistance taking an electrical current to ground. The apparatus can be one of a plurality of tracker apparatus configured in an array within a geographic region. Each of the plurality of tracker apparatus is driven independently of each other to cause each row to stow independently at a different or similar angle.

Still further, the present invention provides a tracker apparatus comprising a clam shell apparatus, which has a first member operably coupled to a second member to hold a torque tube in place.

In an example, the apparatus also has a clamp housing operably coupled to the clam shell apparatus via a spherical bearing device such that the spherical bearing comprises an axis of rotation. The axis of rotation is different from a center of the torque tube. The apparatus further comprises a solar module coupled to the torque tube.

In an example, the invention provides a tracker apparatus comprising a plurality of torque tubes comprising a first torque tube coupled to a second torque tube coupled to an Nth torque tube, whereupon N is an integer greater than 2. Each pair of torque tubes is coupled to each other free from any welds.

In an example, each pair of torque tubes is swaged fitted together. Each of the torque tubes is cylindrical in shape. Each of the plurality of torque tubes is characterized by a length greater than 80 meters. Each of the torque tubes comprises a plurality of notches. In an example, the apparatus also has a plurality of U-bolt devices coupled respectively to the plurality of notches. Each of the plurality of torque tubes are made of steel.

In an alternative embodiment, the present invention provides a tracker apparatus having a pier member comprising a lower region and an upper region. A clamp holding member is configured to the upper region and is capable of moving in at least a first direction, a second direction opposite to the first direction, a third direction normal to the first direction and the second direction, a fourth direction opposite of the third direction, a fifth direction normal to the first direction, the second direction, the third direction, and the fourth direction, and a sixth direction opposite of the fifth direction.

In yet an alternative embodiment, the present invention provides a solar tracker apparatus. The apparatus has a clamp housing member configured in an upright direction. The clamp housing member comprises a lower region and an upper region. The lower region is coupled to a pier structure. The upper region comprises a spherical bearing device. The upright direction is away from a direction of gravity. The apparatus has a clam shell clamp member coupled to the cylindrical bearing and the clam shell clamp being suspended from the cylindrical bearing. In an example, the apparatus has a torque tube comprising a first end and a second end. The first end is coupled to the spherical bearing to support the torque tube from the upper region of the clamp housing member. The torque tube is configured from an off-set position from a center region of rotation. The apparatus has a drive device coupled to the second end such that the drive device and the torque tube are configured to be substantially free from a twisting action while under a load, e.g., rotation, wind, other internal or external forces. Further details of the present examples can be found throughout the present specification and more particularly below.

FIG. 1 is a simplified perspective view of a horizontal tracker apparatus 100 configured with a plurality of solar modules according to an embodiment of the present invention. As shown, the present invention provides a tracker apparatus 100 for solar modules. In an example, the solar modules can be a silicon based solar module, a polysilicon based solar module, a concentrated solar module, or a thin film solar module, including cadmium telluride (CdTe), copper indium gallium selenide (CuIn1-xGaxSe2 or CIGS), which is a direct bandgap semiconductor useful for the manufacture of solar cells, among others. As shown, each of the solar panels can be arranged in pairs, which form an array. Of course, there can be other variations. In an example, the first pier 121 and the second pier 122 are provided on a sloped surface, an irregular surface, or a flat surface. The first pier 121 and the second pier 122 are two of a plurality of piers provided for the apparatus 100. In example, the apparatus 100 has a solar module 110 configured in a hanging position or a supporting position.

The tracker apparatus 100 has a first pier 121 comprising a first pivot device 131 and a second pier 122 comprising a drive mount 132. In an example, the first pier 121 is made of a solid or patterned metal structure, such as a wide beam flange or the like, as shown. In an example, each of the piers is inserted into the ground, and sealed, using cement or other attachment material. Each pier is provided in generally an upright position and in the direction of gravity, although there can be variations. In an example, each of the piers is spatially spaced along a region of the ground, which may be flat or along a hillside or other structure, according to an embodiment. In an example, the first pillar comprises a wide flange beam. In an example, the first pillar and the second pillar can be off-set and reconfigurable.

In an example, the drive mount 132 is capable for construction tolerances in at least three-axis, and is configured to a drive device 140. The drive device 140 has an off-set clamp device 141 coupled to a cylindrical bearing device coupled to a clamp member.

In an example, the apparatus has a cylindrical torque tube 150 operably disposed on the first pier 121 and the second pier 122. In an example, the cylindrical torque tube 150 comprises a one to ten inch diameter pipe made of Hollow Structure Steel (HSS) steel. The cylindrical torque tube 150 comprises a first end and a second end, and a notch 151. The notch 151 is one of a plurality of notches spatially disposed along a length of the cylindrical torque tube 150.

In an example, the apparatus 100 has a clamp 170 configured around an annular portion of the cylindrical torque tube 150 and mate with the notch 151 to prevent movement of the clamp 170. The clamp 170 comprises a support region configured to support a portion of a solar module 110. The clamp 170 comprises a pin configured with the notch 151. The apparatus also has a rail 160 configured to the clamp 170. The rail 160 comprises a thread region configured to hold a bolt 171, which is adapted to screw into the thread and bottom out against a portion of cylindrical torque tube 150 such that the clamp 170 is desirably torqued against the cylindrical torque tube 150. The apparatus has a solar module 110 attached to the rail 160 or other attachment device-shared module claim or other devices. The cylindrical torque tube 150 is one of a plurality of torque tubes configured in as a continuous structure and extends in length for 80 to 200 meters. Each pair of torque tubes is swage fitted together, and bolted for the configuration.

In an example, the apparatus also has a center of mass of along an axial direction is matched with a pivot point of the drive device 140. The pivot point of the drive device 140 is fixed in three dimensions while rotating along the center of mass. In an example, the off-set clamp 141 comprises a crank device. The first pivot device 131 comprises a spherical bearing configured a clam-shell clamp device to secure the first end to the cylindrical torque tube 150. In other examples, the drive device 140 comprises a slew gear. The apparatus also has an overrun device configured with the first pivot device 131. The overrun device comprises a mechanical stop to allow the cylindrical torque tube 150 to rotate about a desired range. Further details of the present tracker apparatus 100 can be found throughout the present specification and more particularly below.

FIGS. 2 through 7 illustrate a method of assembling the horizontal tracker apparatus 100 of FIG. 1. As shown, the method includes disposing a first pier 121 into a first ground structure. The method also includes disposing a second pier 122 into a second ground structure. Each of the piers is one of a plurality of piers to be spatially disposed along a ground structure for one row of solar modules configured to a tracker apparatus 100.

In an example, the method includes configuring a first pivot device 131 on the first pier 121.

In an example, the method includes configuring a drive mount 132 on the second pier 122. In an example, the drive mount 132 is capable for construction tolerances in at least three-axis. In an example, the drive mount 132 is configured to a drive device 140 having an off-set clamp device 141 coupled to a cylindrical bearing device coupled to a clamp member.

In an example, the method includes assembling a cylindrical torque tube 150 and operably disposing on the first pier 121 and the second pier 122 cylindrical torque tube 150. The cylindrical torque tube 150 comprises a first end and a second end, and a notch 151. In an example, the notch 151 is one of a plurality of notches spatially disposed along a length of the cylindrical torque tube 150.

In an example, the method includes assembling a plurality of clamps spatially disposed and configured around an annular portion of the cylindrical torque tube 150. Each of the plurality of clamps is configured to mate with the notch 151 to prevent movement of the clamp 170. In an example, the clamp 170 comprises a support region configured to support a portion of a solar module 110.

In an example, the method includes attaching a rail 160 configured to each of the clamps, the rail 160 comprising a thread region configured to hold a bolt 171. The bolt 171 is adapted to screw into the thread and bottom out against a portion of cylindrical torque tube 150 such that the clamp 170 is desirably torqued against the cylindrical torque tube 150.

In an example, the method includes attaching a solar module 110 to the rail 160 or other attachment device. Further details of other examples can be found throughout the present specification and more particularly below.

Figure 8:
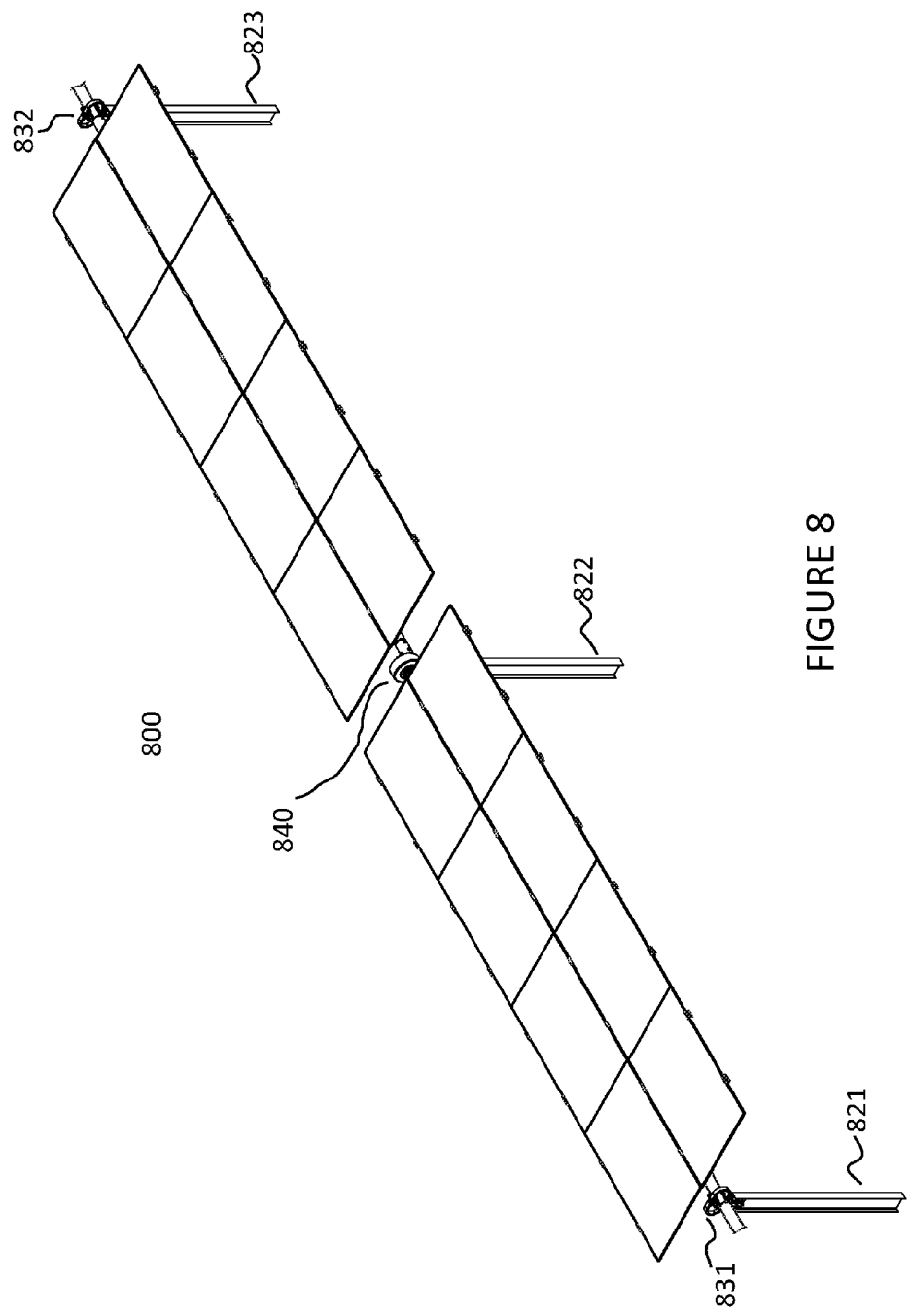
FIG. 8 is a simplified perspective view of a pair of horizontal tracker apparatus configured together with a plurality of solar panels according to an embodiment of the present invention.

FIG. 8 is a simplified perspective view of a pair of horizontal tracker apparatus 800 configured together with a plurality of solar panels according to an embodiment of the present invention. As shown is a tracker apparatus for solar modules. The tracker apparatus 800 has a first pier 821 comprising a first pivot device 831, a second pier 822 comprising a drive mount, and a third pier 823 comprising a second pivot device 832. The second pier 822 is between the first and third piers 821 and 823, as shown in an example. Of course, additional piers can be configured on each outer side of the first and third piers 821 and 823.

In an example, the drive mount is capable for construction tolerances in at least three-axis, and is configured to a drive device 840. The drive device 840 has an off-set clamp device coupled to a cylindrical bearing device coupled to a clamp member.

In an example, the apparatus has a cylindrical torque tube operably disposed on the first pier 821 and the second pier 822, and then on the third pier 823. In an example, the cylindrical torque tube comprises a first end and a second end, and a notch. The notch is one of a plurality of notches spatially disposed along a length of the cylindrical torque tube. The apparatus has a clamp configured around an annular portion of the cylindrical torque tube and mate with the notch to prevent movement of the clamp. The clamp comprises a support region configured to support a portion of a solar module. In an example, the cylindrical torque tube is configured to the drive device 840 to rotate the cylindrical torque tube while each of the clamp members holds the tube in place. Further details of the present apparatus 800 can be found throughout the present specification and more particularly below.

Figure 9:
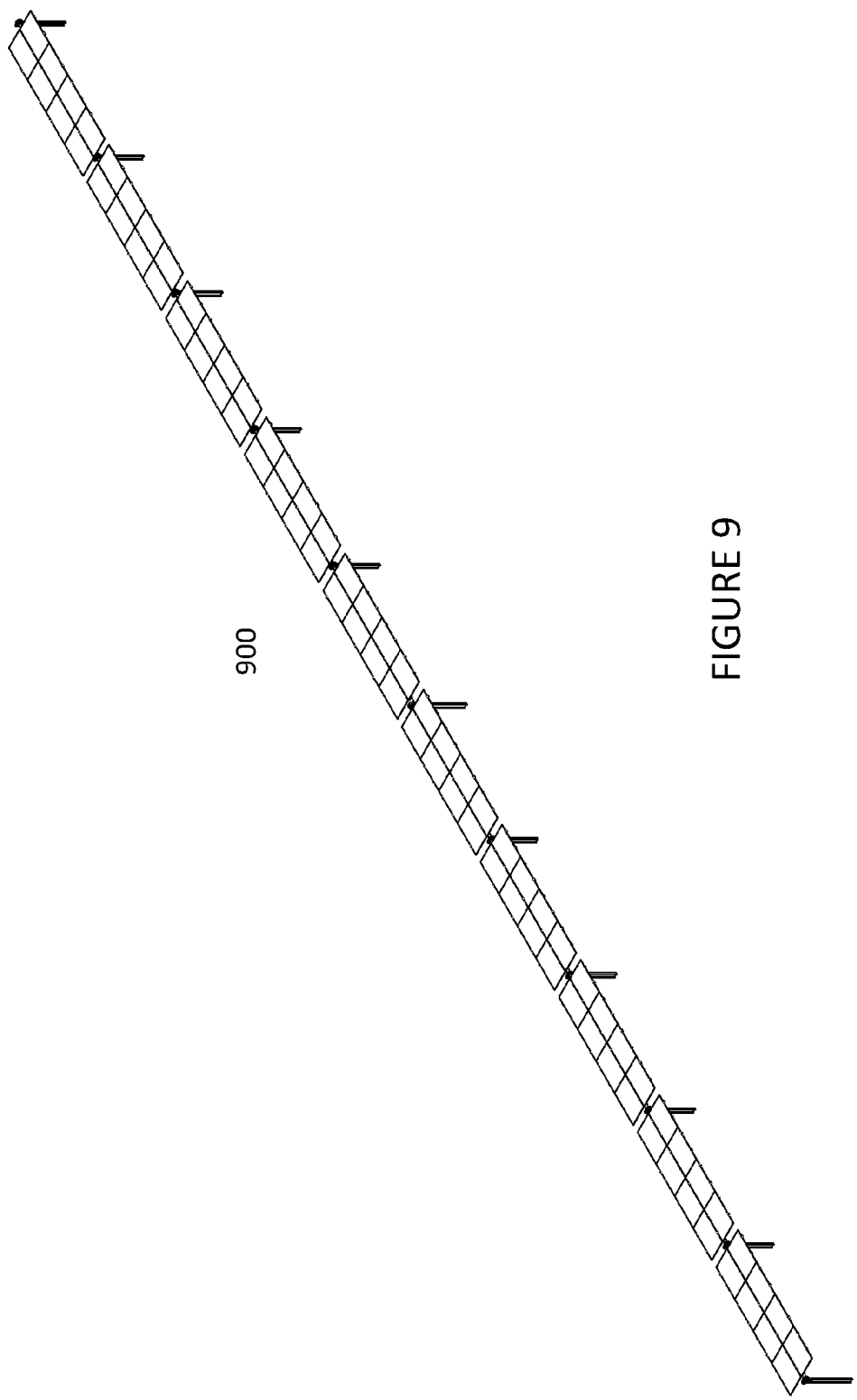
FIG. 9 is a simplified diagram of a plurality of horizontal tracker apparatus configured together according to an embodiment of the present invention.

FIG. 9 is a simplified diagram of a plurality of horizontal tracker apparatus 900 configured together according to an embodiment of the present invention. As shown is a solar tracker apparatus. The apparatus has a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube. In an example, the drive motor is operable to move the torque tube about the center of rotation and is substantially free from a load. The center of rotation is offset from a center of the cylindrical torque tube.

In an example, the invention provides a tracker apparatus comprising a plurality of torque tubes comprising a first torque tube coupled to a second torque tube coupled to an Nth torque tube, whereupon N is an integer greater than 2. Each pair of torque tubes is coupled to each other free from any welds.

In an example, a single drive motor can be coupled to a center region of the plurality of torque tubes to rotate the torque tube in a desirable manner to allow each of the solar modules to track a direction of electromagnetic radiation from the sun.

In an example, each tracker apparatus comprises a torque tube coupled to an array of solar panels, as shown. Each of the tracker apparatus is coupled to each other via the torque tube, and a pivot device. Each tracker has a corresponding pair of piers, a torque tube, and one or more pivot devices, as shown. Further details of each of these elements are described in detail throughout the present specification.

Figure 10:
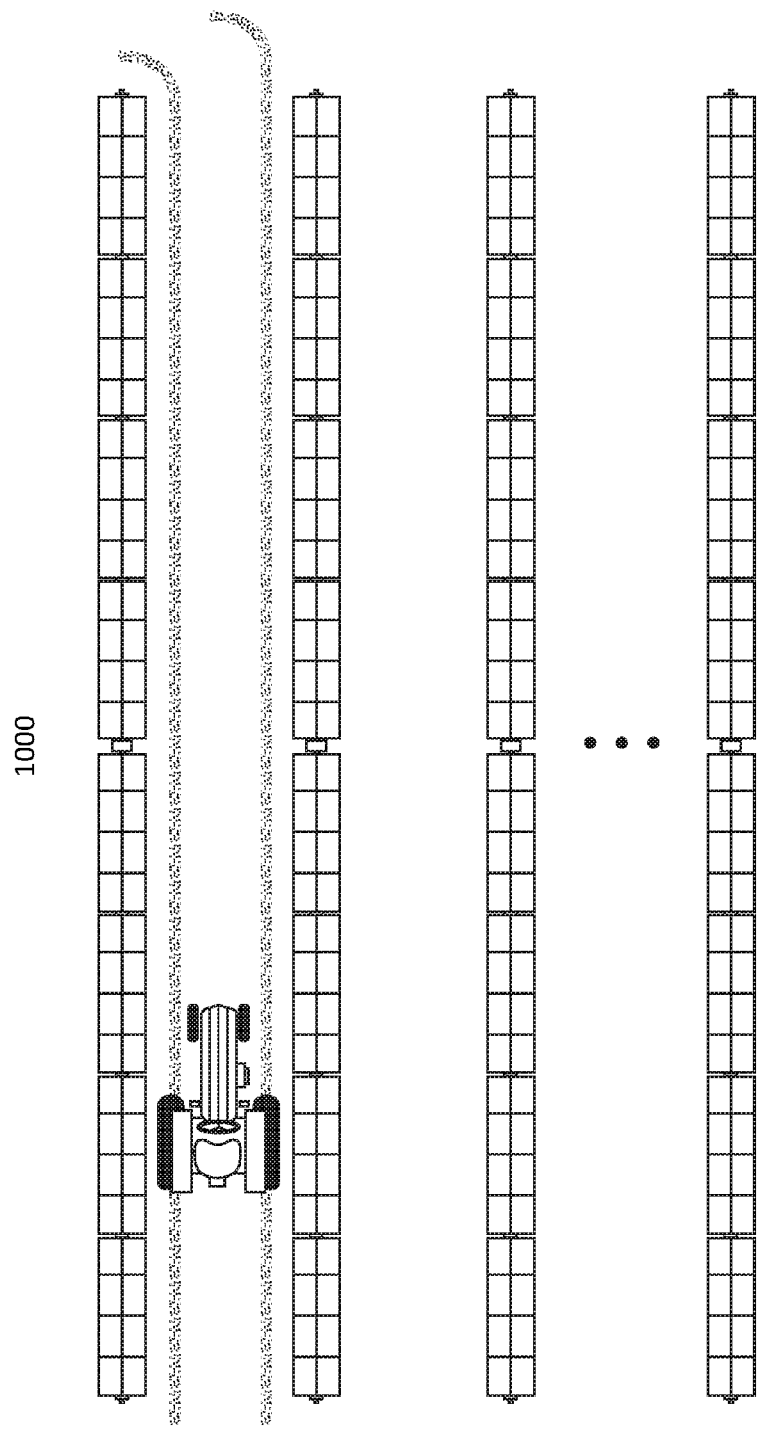
FIG. 10 is a simplified diagram of an array of a plurality of horizontal tracker apparatus configured together according to an embodiment of the present invention.

FIG. 10 is a simplified diagram of an array of a plurality of horizontal tracker apparatus configured together according to an embodiment of the present invention. As shown are an array of horizontally configured tracker devices to form a plurality of rows of tracker devices 1000 arranged in a parallel manner. Each pair of rows of trackers has an avenue, which allows for other applications. That is, row crops or other things can be provided in the avenue, which extends along an entirety of each horizontal tracker row. In an example, the plurality of tracker apparatus are configured in an array within a geographic region. Each of the plurality of tracker apparatus is driven independently of each other to cause each row to stow independently at a different or similar angle. Unlike conventional trackers, which often have mechanical device between the rows, each of the avenues is continuous from one end to the other end, as allows for a tractor or other vehicle to drive from one end to the other end in a preferred example. Of course, there can be other variations, modifications, and alternatives.

In an example, the apparatus is configured substantially free from any welds during assembly, and can be assembled using conventional tools. In an example, the torque tube is coupled to another torque tube via a swage device within a vicinity of the clam shell clamp member. In an example, the torque tube is coupled to an elastomeric damper in line to dampen torque movement to be substantially free from formation of a harmonic waveform along any portion of a plurality of solar panels configured to the torque tube.

In an example, the apparatus further comprising a locking damper or rigid structure to configure a solar panel coupled to the torque tube in a fixed tilt position to prevent damage to stopper and lock into a foundation-in a position that is substantially free from fluttering in an environment with high movement of air. In an example, the locking damper fixes each of the plurality of solar modules in a desirable angle relative to the direction of air or wind.

In an example, the apparatus has a controller apparatus configured in an inserter box provided in an underground region to protect the controller apparatus. In an example, the inserter box is made of a suitable material, which is sealed and/or environmentally suitable to protect the controller apparatus.

In operation, the apparatus has a drive device to linearly actuate the torque tube to allow for desirable positions of each of the solar modules relative to incident electromagnetic radiation. In an example, an electrical connection and source (e.g., 120V, 60 Hz, 240V) is coupled to a drive device. Of course, there can be variations.

Figure 11:
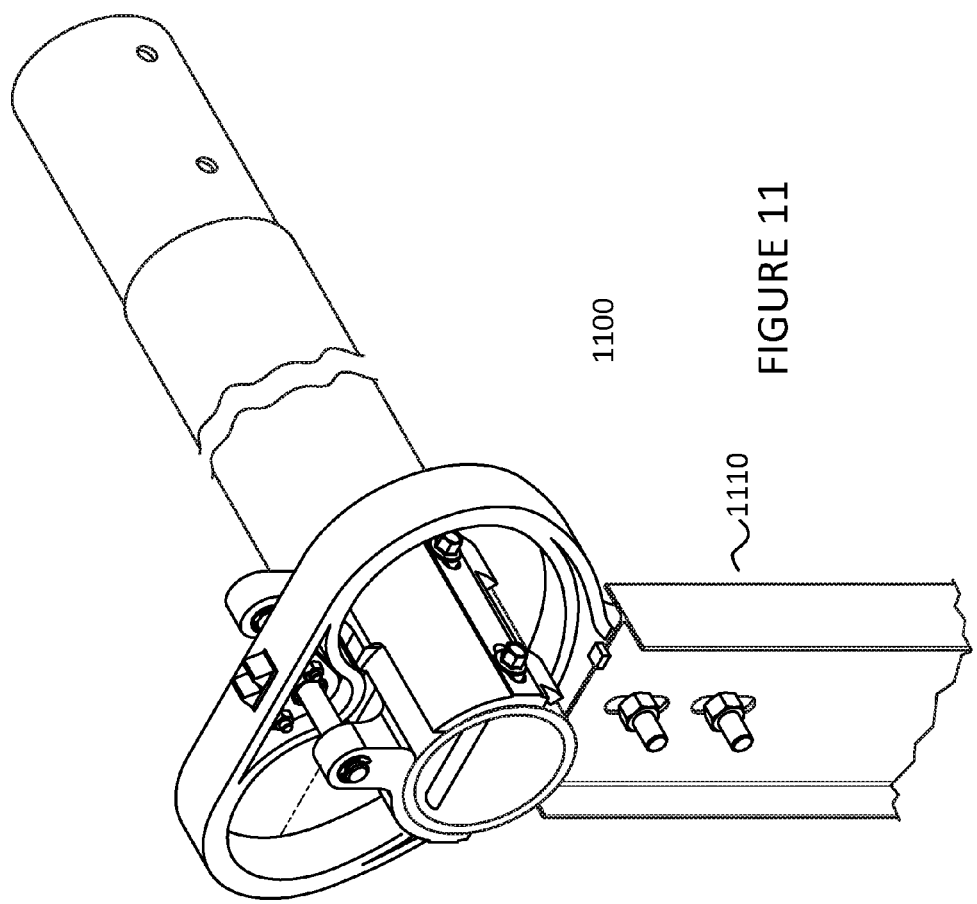
FIG. 11 is a simplified diagram of a clamp assembly for the horizontal tracker of FIG. 1 according to an embodiment of the present invention.

FIG. 11 is a simplified diagram of a clamp assembly 1100 for the horizontal tracker of FIG. 1 according to an embodiment of the present invention. As shown, the clamp assembly 1100 has a clamp housing member 1120 configured in an upright direction, which is a direction away from a direction of gravity. In an example, the clamp housing member 1120 comprises a lower region and an upper region. The lower region is coupled to a pier structure 1110. The lower region has a thickness of material comprising bolt openings, which align to openings on an upper portion of the pier structure 1110. Locking nuts and bolts are configured to hold the lower region of the clamp housing to the pier structure 1110 in an upright manner. At least a pair of openings are provided in each of the lower region of the clamp housing and the pier structure 1110, as shown.

In an example, the upper region comprises a spherical bearing device. The upper region has a tongue structure, which has an opening that houses the spherical bearing 1130 between a pair of plates 1141 and 1142, which hold the bearing 1130 in place. In an example, the spherical bearing 1130 allows for rotational, and movement in each of the three axis directions within a desirable range. Each of the plates is disposed within a recessed region on each side of the tongue structure. Each of the plates may include a fastener to hold such plate in place within the recessed region.

In an example, clamp assembly 1100 has a clam shell clamp member coupled to the spherical bearing 1130 and the clam shell clamp being suspended from the spherical bearing 1130. That is, the clam shell clamp has a first side and a second side. Each side has an upper region comprising an opening. A pin is inserted through each of the openings, while an opening of the spherical bearing 1130 is provided as a third suspension region between each of the openings, as shown.

Each side of the clam shell is shaped to conform or couple to at least one side of a portion of the torque tube 1160, as shown. Each side has one or more opens, which align to one or more openings on the portion of the torque tube 1160. A pin or bolt is inserted through each of the openings to clamp the clam shell clamp to the portion of the torque tube 1160 and surround substantially an entirety of a peripheral region of the torque tube 1160. The pin or bolt or pins or bolts also holds the torque tube 1160 in a fixed position relative to the clam shell clamp to prevent the torque tube 1160 from slipping and/or twisting within the clam shell clamp. Of course, there can be variations.

In an example, the spherical bearing 1130 allows for a construction tolerance, tracker movement, and acts as a bonding path of least resistance taking an electrical current to ground. The bonding path occurs from any of the modules, through the frame, to each of the clamp assembly 1100, to one or more piers, and then to ground.

In an example, a torque tube 1160 comprising a first end and a second end is coupled to the spherical bearing 1130 to support the torque tube 1160 from the upper region of the clamp housing member 1120. In an example, the torque tube 1160 is configured from an off-set position from a center region of rotation.

In an example, a drive device, which will be described in more detail below, is coupled to the second end such that the drive device and the torque tube 1160 are configured to be substantially free from a twisting action while under a load.

In an example, the clam shell apparatus comprising a first member 1151 operably coupled to a second member 1152 to hold a torque tube 1160 in place. In an example, the apparatus has a clamp housing operably coupled to the clam shell apparatus via a spherical bearing device 1130 such that the spherical bearing 1130 comprises an axis of rotation, which is different from a center of the torque tube 1160.

Figure 12:
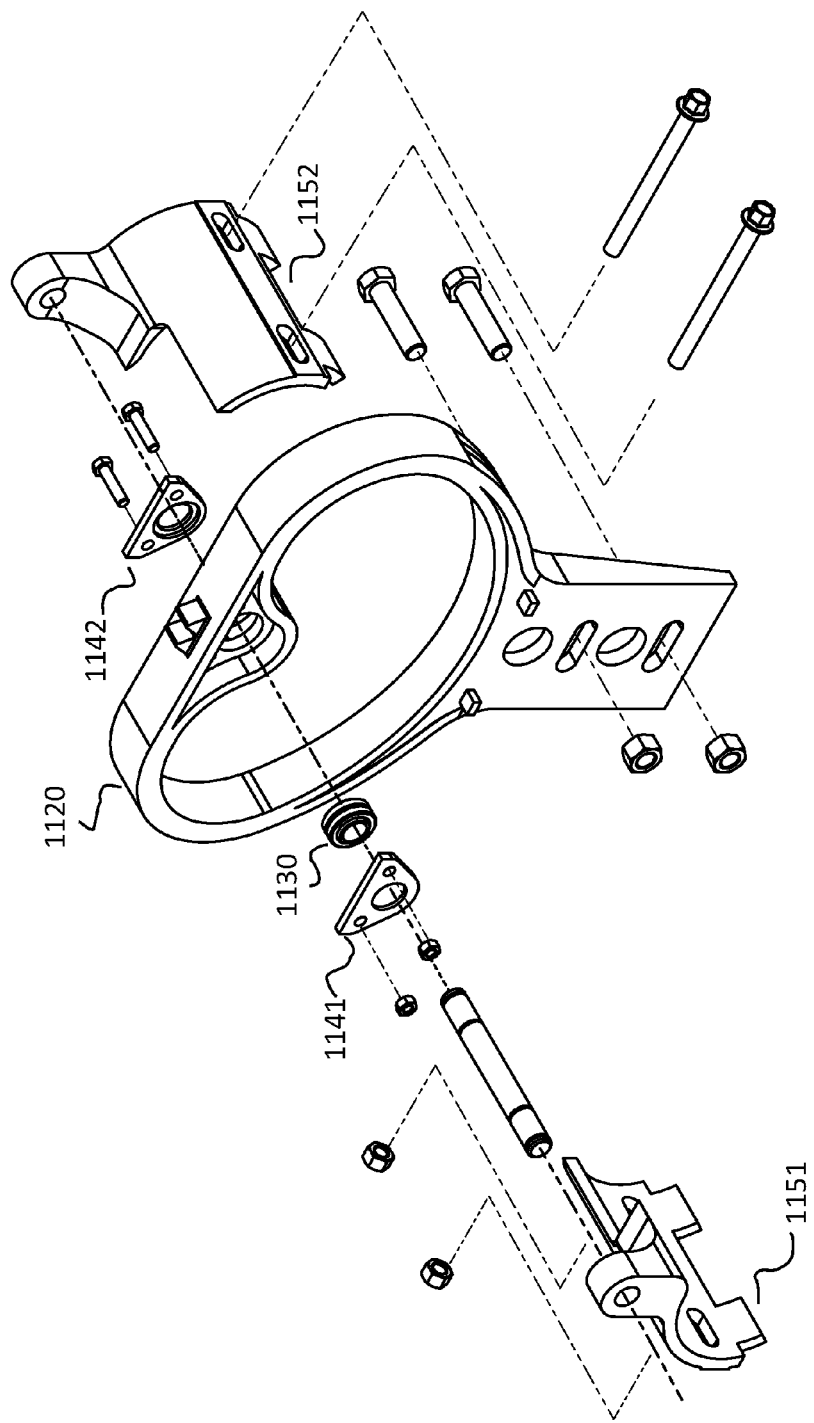
FIGS. 12 through 14 are simplified diagrams illustrating a method for assembling the clamp assembly of FIG. 11.
Figure 13:
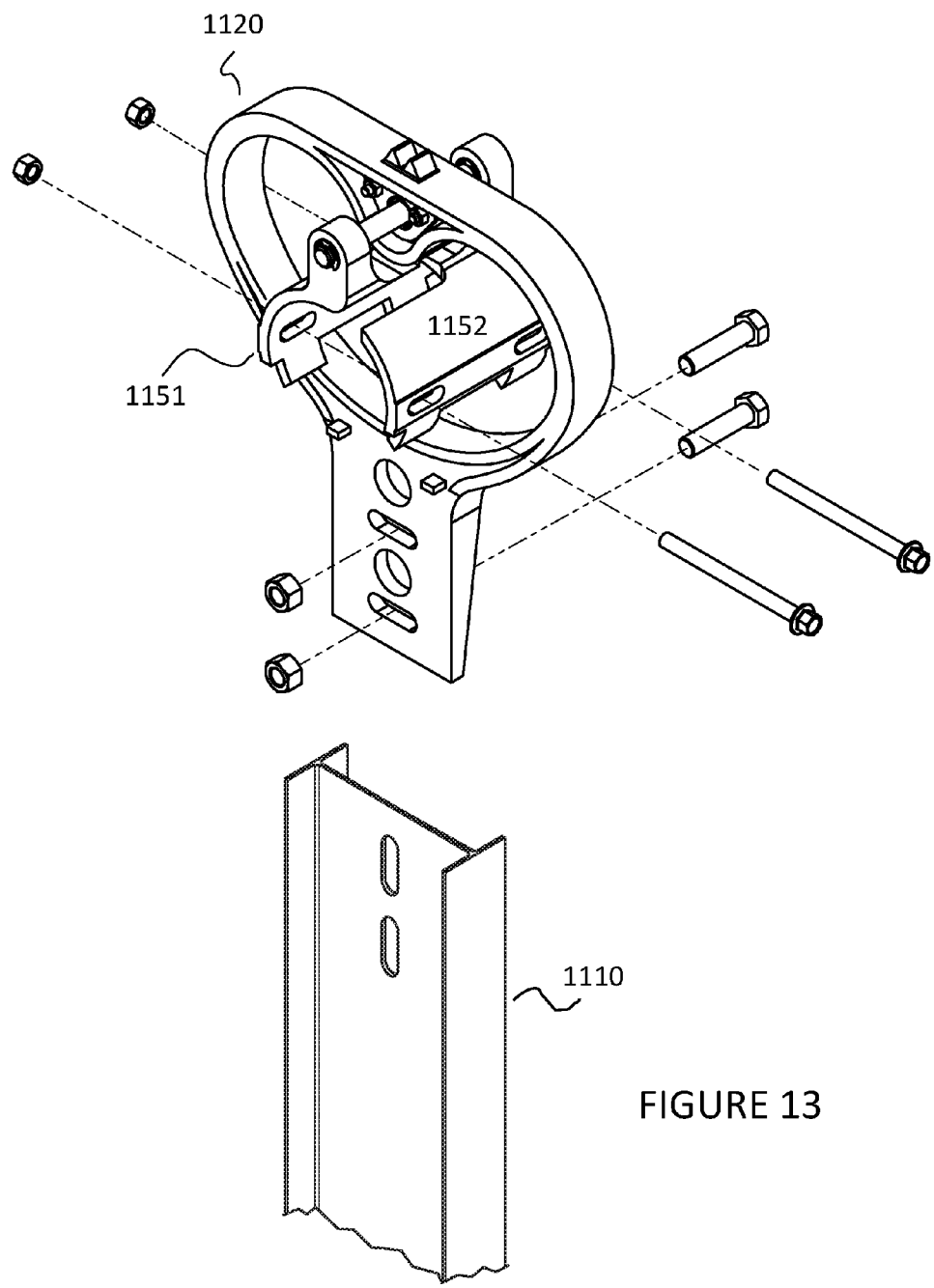
Figure 14:
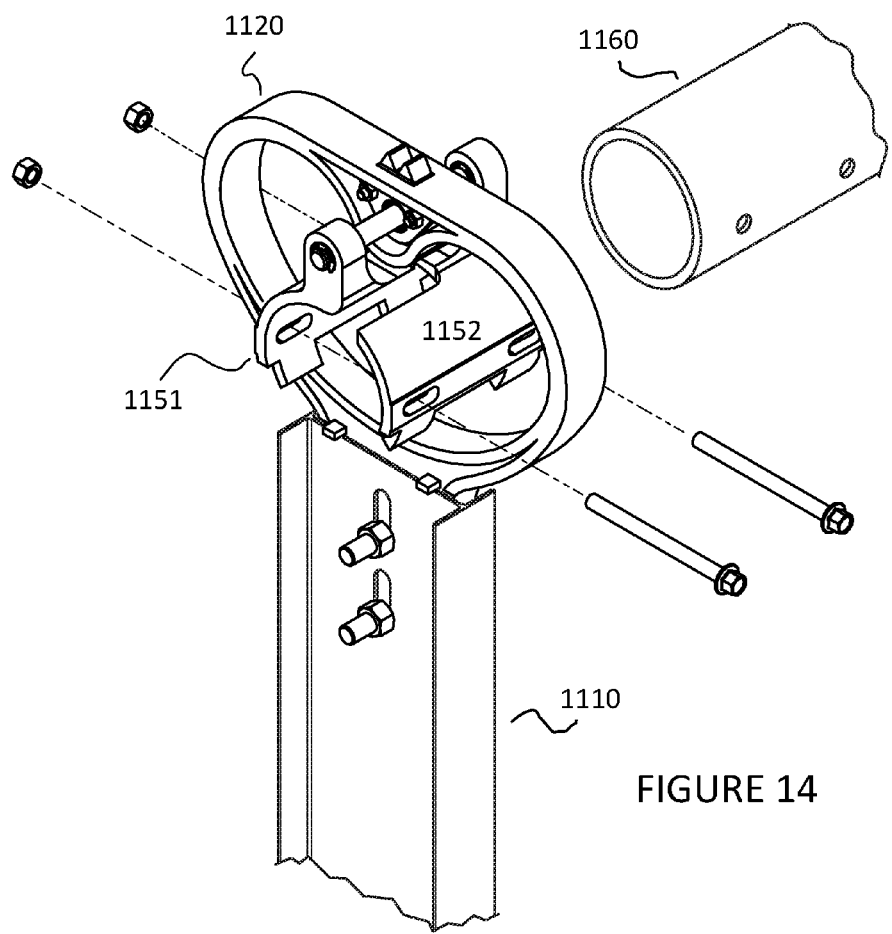

FIGS. 12 through 14 are simplified diagrams illustrating a method for assembling the clamp assembly 1100 of FIG. 11. In an example, the present method is for assembling a solar tracker apparatus. The method includes providing a clamp housing member 1120 configured in an upright direction. The clamp housing member 1120 comprises a lower region and an upper region. In an example, the lower region is coupled to a pier structure 1110. The upper region comprises a spherical bearing device. In an example, the upright direction is away from a direction of gravity. In an example, the method includes coupling a first half clam shell clamp member 1151 and a second half clam shell clamp member 1152 (collectively a clam shell clamp member) to the cylindrical bearing. The method also includes supporting a torque tube 1160 between the first half clam shell clamp 1151 and the second half clam shell clamp 1152, each of which is coupled to the spherical bearing 1130 to support the torque tube 1160 from the upper region of the clamp housing member 1120, the torque tube 1160 being configured from an off-set position from a center region of rotation.

In an example, the apparatus is configured substantially free from any welds during assembly. In an example, the torque tube 1160 is coupled to another torque tube via a swage device within a vicinity of the clam shell clamp member. In an example, the torque tube 1160 is coupled to an elastomeric damper in line to dampen torque movement to be substantially free from formation of a harmonic waveform along any portion of a plurality of solar panels configured to the torque tube 1160.

In an example, the method includes coupling a pin member to the first half clam shell clamp member 1151, the second half clam shell clamp member 1152, and the spherical bearing 1130. In an example, the method includes coupling a first member 1151 and a second member 1152 to sandwich the spherical bearing 1130 to a tongue region of the upper region of the clamp housing member 1120. In an example, the spherical bearing 1130 is configured for rotation, and movement of the pin to pivot along a solid angle region. In an example, the housing clamp member 1120 is a continuous structure made of cast or stamped or machined metal material. In an example, each of the first half clam shell member 1151 and the second half claim shell member 1152 is made of a solid continuous structure that is cast or stamped or machined metal material. In an example, the spherical bearing 1130 allows for a construction tolerance, tracker movement, and acting as a bonding path of least resistance taking an electrical current to ground. Further details of the present method and apparatus can be found throughout the present specification and more particularly below.

Figure 15:
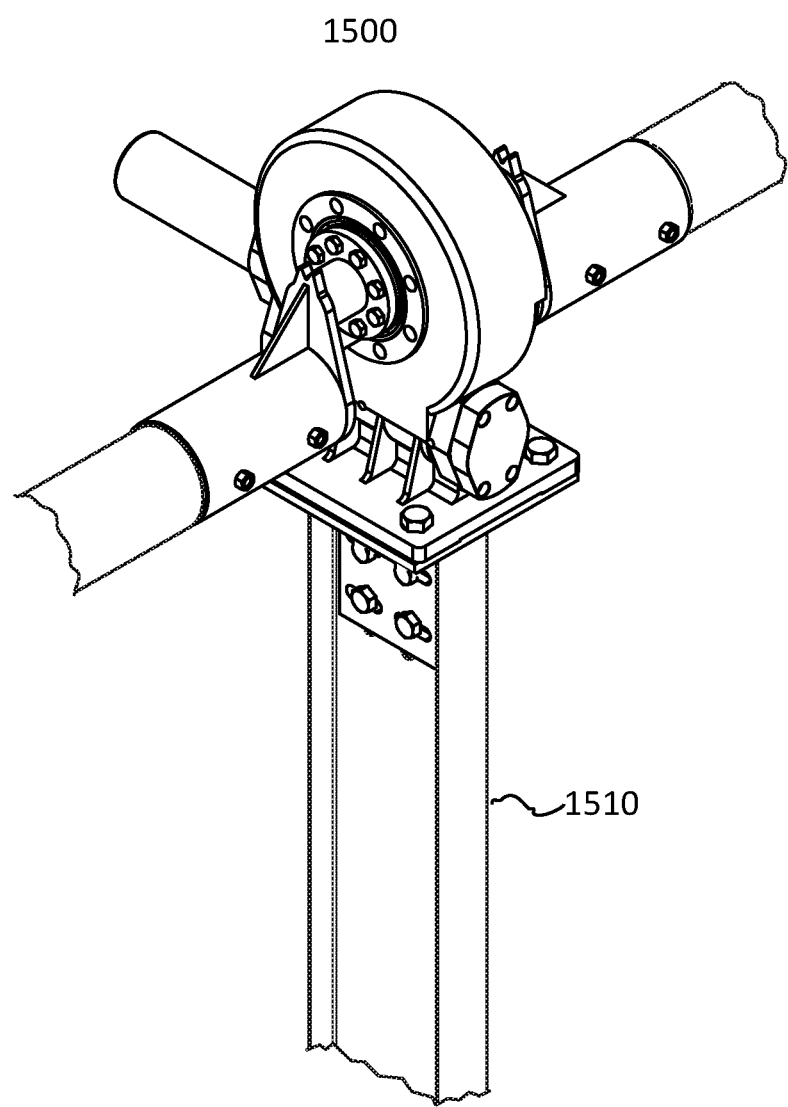
FIG. 15 is a simplified perspective diagram of a drive assembly configured on a pier member according to an embodiment of the present invention.
Figure 16:
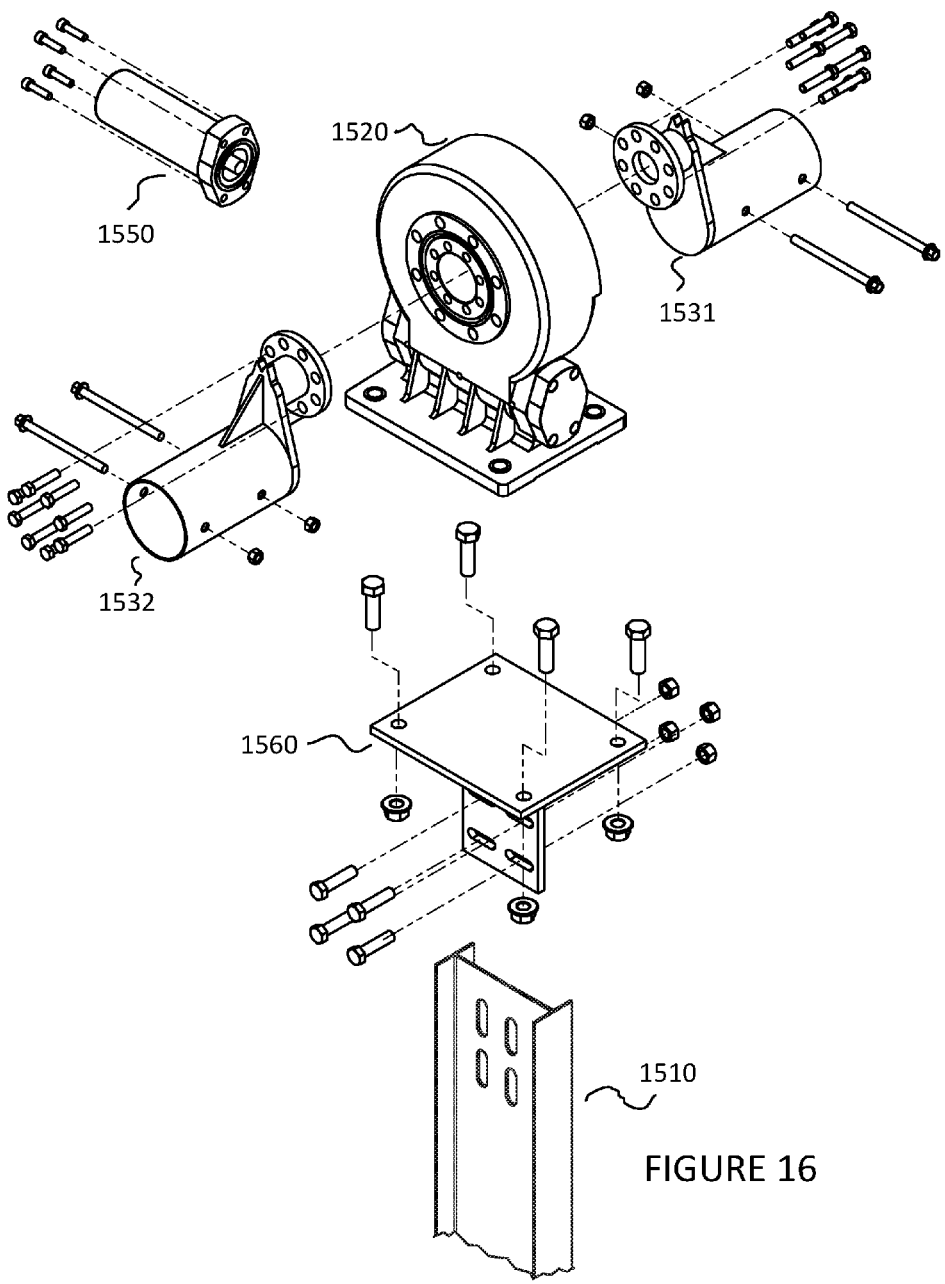
FIGS. 16 through 19 are simplified diagrams illustrating a method for assembling the drive assembly of FIG. 15.
Figure 17:
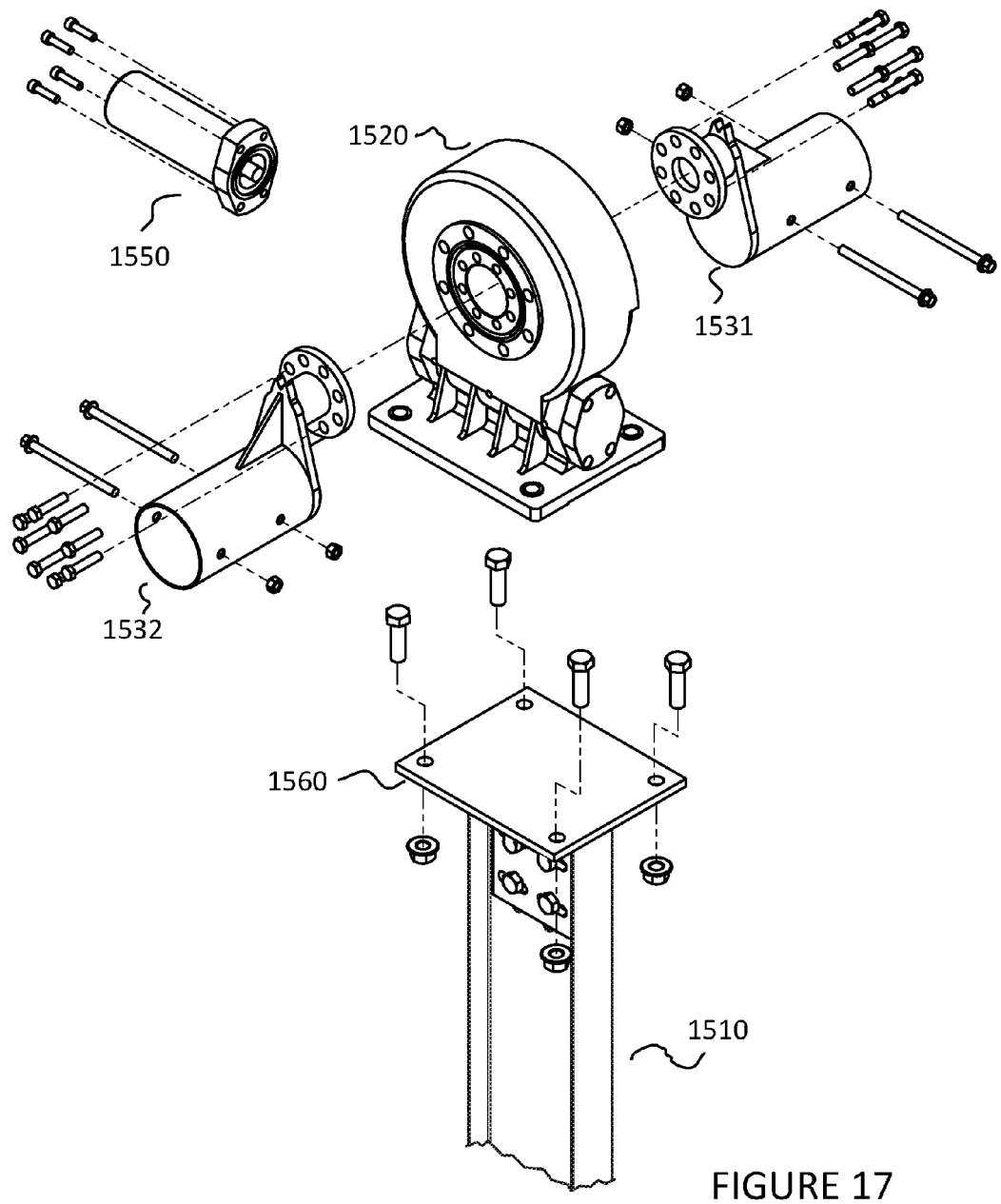
Figure 18:
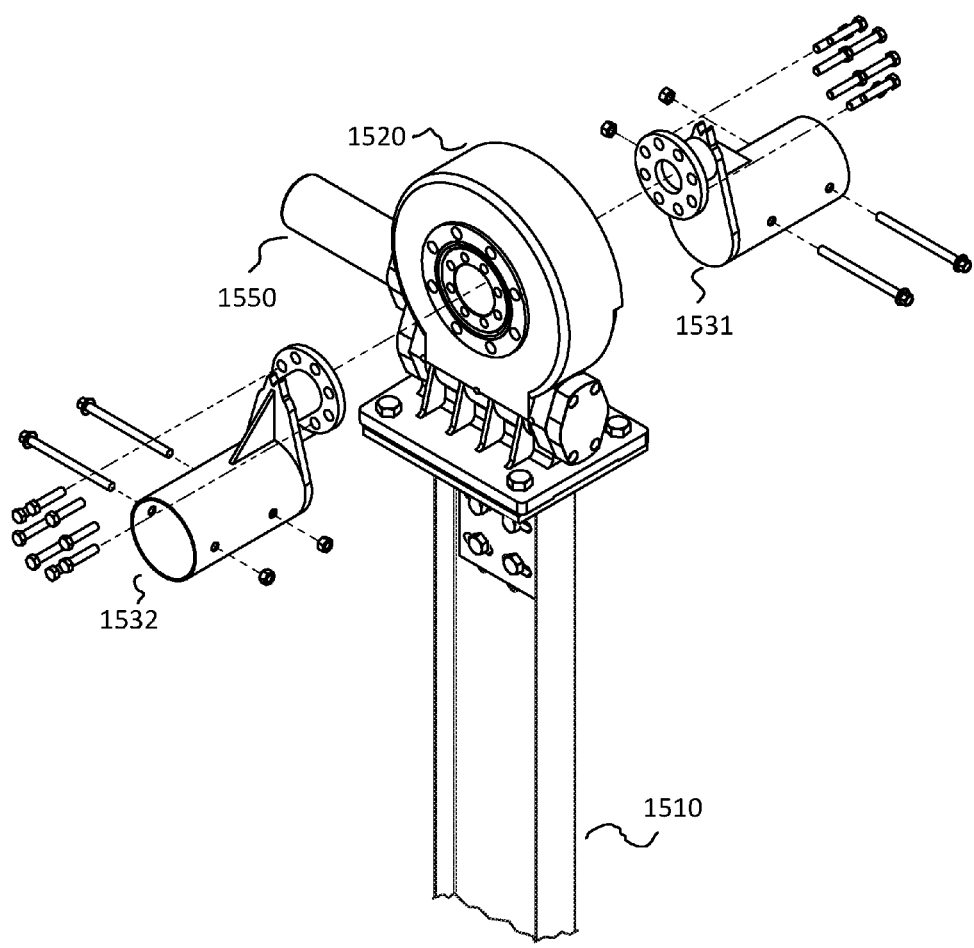
Figure 19:
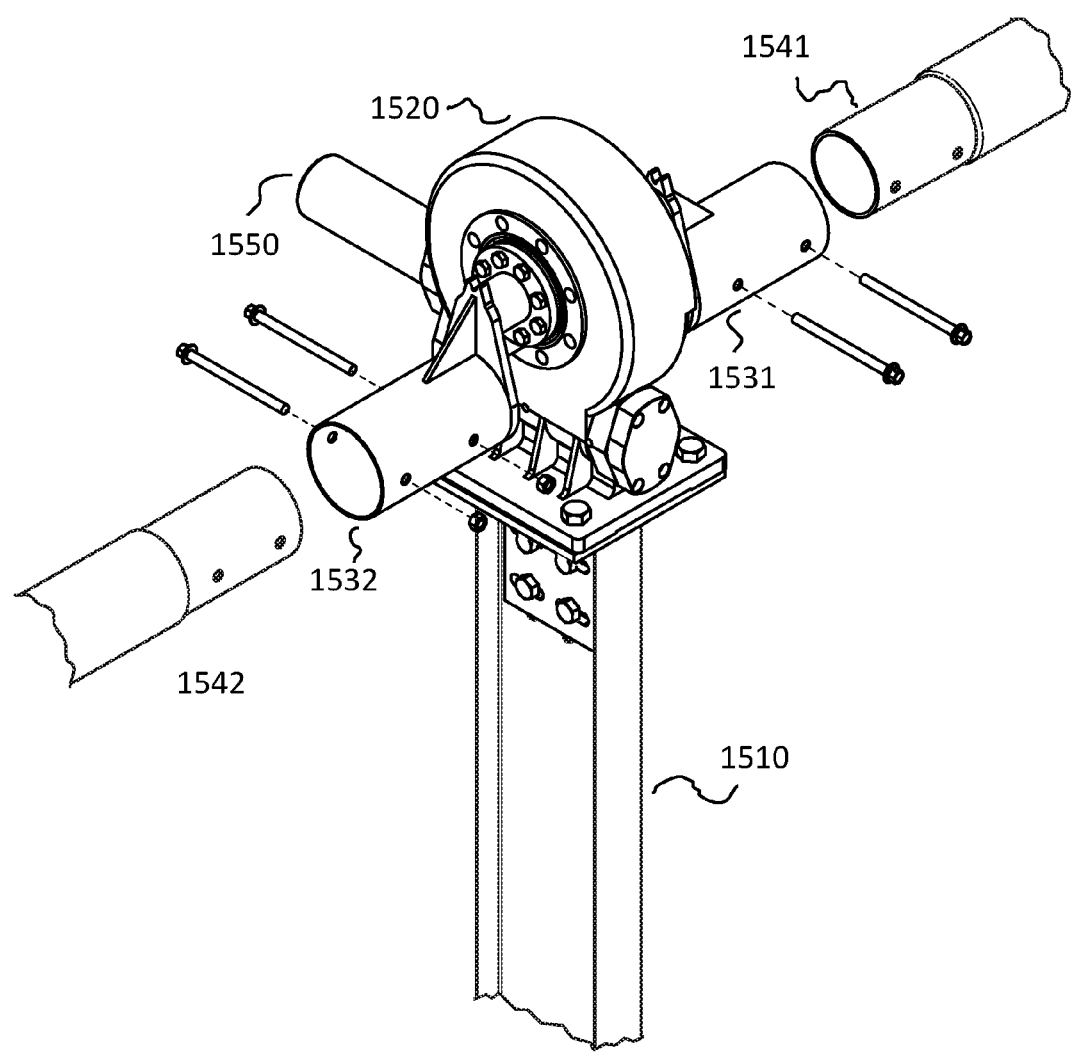

FIG. 15 is a simplified perspective diagram of a drive assembly 1500 configured on a pier member 1510 according to an embodiment of the present invention. In an example, as shown, the solar tracker apparatus comprises a drive device 1520. The drive device 1520 is coupled to an electric motor 1550, which can be DC or AC. The drive device 1520 has a shaft, which rotates around a rotational point, and drives each crank, which is described below. The drive device 1520 is provided on a support or drive mount 1560, which is configured on an upper region of a pier, which has been described. The drive device 1520 is coupled to a crank coupled to the drive device 1520 and configured in an offset manner to a frame assembly, which has a plurality of solar modules.

In an example, the drive device 1520 provides rotation to a continuous torque tube spatially disposed from a first region to a second region. The drive device 1520 has a drive line, which couples via a gear box to drive a pair of cranks. Each crank is coupled to each side of the drive device 1520, which causes rotational movement of each crank.

In an example, the crank comprises a first crank 1531 coupled to a first side of the drive device 1520 and a second crank 1532 coupled to a second side of the drive device 1520. In an example, the crank comprises a first crank 1531 coupled to a first side of the drive device 1520 and a second crank 1532 coupled to a second side of the drive device 1520. In an example, each crank has a flange having a plurality of bolt openings to couple to one side of the drive device 1520. Each crank has an arm, which is normal to each flange, and couples to cylindrical member that has one or more bolt openings. The apparatus has a first torque tube 1541 coupled to the first crank 1531 via the cylindrical member and a second torque tube 1542 coupled to the second crank 1532 via another cylindrical member. In an example, a first swage fitting is coupling the first crank 1531 to the first torque tube 1541 and a second swage fitting is coupling the second crank 1532 to the second torque tube 1542. One or more bolts are inserted through the cylindrical members to secure a portion of the torque tube in place, and keep it free from rotation or twisting within the cylindrical member, and lock it into place, as shown.

In an example, each of the cranks is made of a suitable metal material that may be cast, machined, or stamped. Each cylindrical member is made of a suitable metal material to coupled to an end of the torque tube, as shown. A swage fitting can be provided to couple or connect the end of the torque tube to each cylindrical member as shown. Of course, there can be variations. Further details of assembling the drive device can be found throughout the present specification, and more particularly below.

FIGS. 16 through 19 are simplified diagrams illustrating a method for assembling the drive assembly 1500 of FIG. 15. In an example, the method includes providing a drive device 1520, as shown. In an example, the method includes coupling the drive device 1520 via a drive line or shaft to an electric motor 1550, which can be DC or AC. The method includes coupling the drive device 1520 to a support or drive mount 1560, which is configured on an upper region of a pier, which has been described. In an example, the pier comprising a plurality of support structures coupled to a drive device support. The drive device support having a first member coupled to the plurality of support structures, and a second member coupled to the drive device 1520.

In an example, the method includes coupling the drive device 1520 a crank coupled to the drive device 1520 and configured in an offset manner to a frame assembly, which has a plurality of solar modules. In an example, the drive device 1520 has the drive line, which couples via a gear box to drive a pair of cranks. Each crank is coupled to each side of the drive device, which causes rotational movement of each crank. In an example, the crank comprises a first crank 1531 coupled to a first side of the drive device 1520 and a second crank 1532 coupled to a second side of the drive device 1520. In an example, the crank comprises a first crank 1531 coupled to a first side of the drive device 1520 and a second crank 1532 coupled to a second side of the drive device 1520. In an example, each crank has a flange having a plurality of bolt openings to couple to one side of the drive device 1520. Each crank has an arm, which is normal to each flange, and couples to cylindrical member that has one or more bolt openings. The apparatus has a first torque tube 1541 coupled to the first crank 1531 via the cylindrical member and a second torque tube 1542 coupled to the second crank 1532 via another cylindrical member. In an example, a first swage fitting is coupling the first crank 1531 to the first torque tube 1541 and a second swage fitting is coupling the second crank 1532 to the second torque tube 1542. One or more bolts are inserted through the cylindrical members to secure a portion of the torque tube in place, and keep it free from rotation or twisting within the cylindrical member, and lock it into place, as shown.

Figure 20:
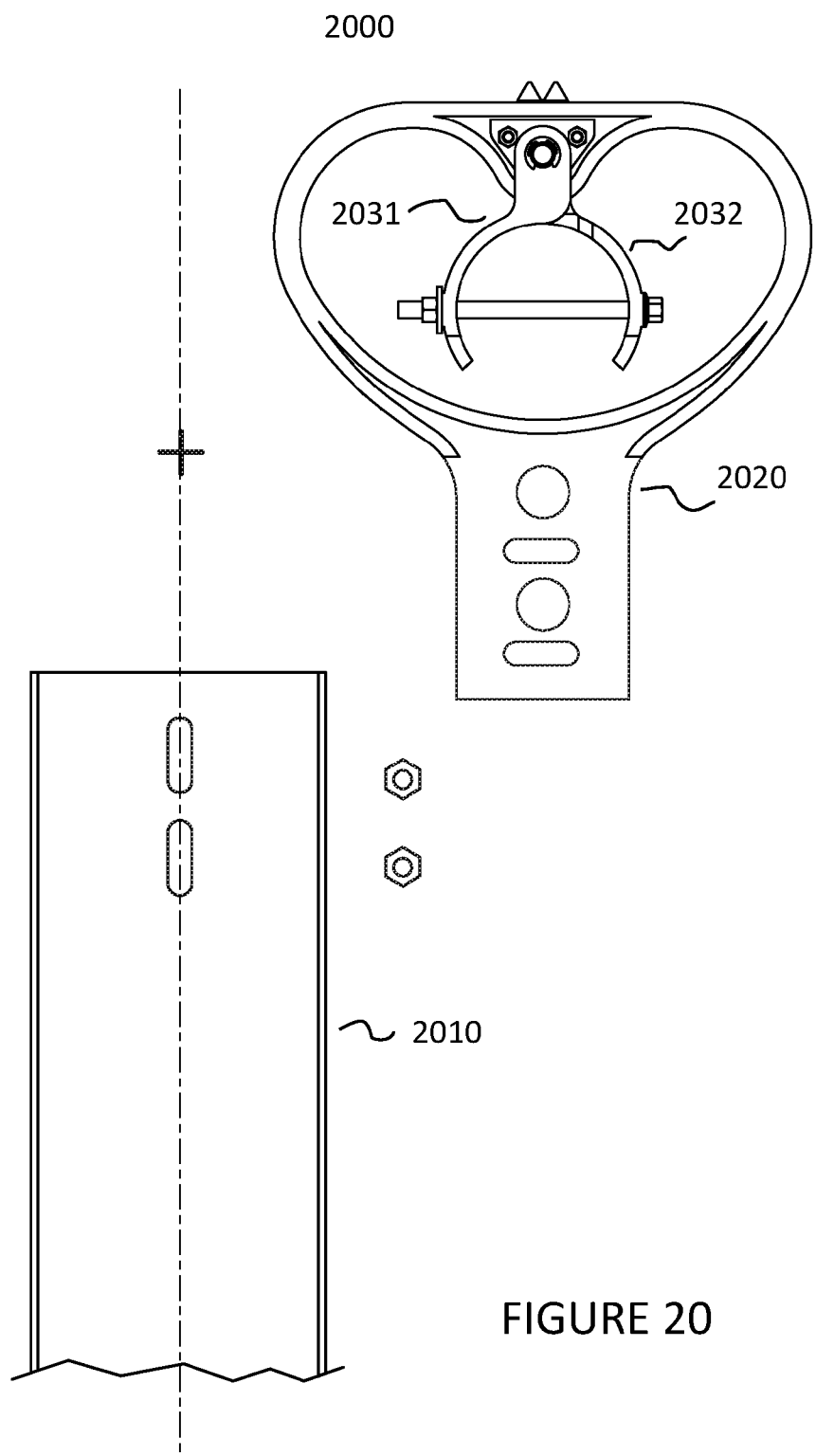
FIG. 20 is a simplified in-line view diagram illustrating a clamp assembly separate and apart from a pier member according to an embodiment of the present invention.

FIG. 20 is a simplified in-line view diagram illustrating a clamp assembly 2000 separate and apart from a pier member 2010 according to an embodiment of the present invention. As shown, the clamp assembly 2000 has a clamp housing member 2020 configured in an upright direction, which is a direction away from a direction of gravity. In an example, the clamp housing member 2020 comprises a lower region and an upper region. The lower region is coupled to a pier structure. The lower region has a thickness of material comprising bolt openings, which align to openings on an upper portion of the pier structure. Locking nuts and bolts are configured to hold the lower region of the clamp housing to the pier structure in an upright manner. At least a pair of openings are provided in each of the lower region of the clamp housing and the pier structure, as shown. Each of the openings in the lower region of the clamp housing is configured as a slot to allow for adjustment in a direction normal to the direction of the length of the pier structure. Each of the openings in the pier structure is configured as an elongated slot in the direction of the length of the pier structure to allow for adjustment in the same direction. Of course, there can be variations, where the directions of the slots are exchanged and/or combined.

In an example, the upper region comprises a spherical bearing device. The upper region has a tongue structure, which has an opening that houses the spherical bearing between a pair of plates, which hold the bearing in place. In an example, the spherical bearing allows for rotational, and movement in each of the three axis directions within a desirable range. Each of the plates is disposed within a recessed region on each side of the tongue structure. Each of the plates may include a fastener to hold such plate in place within the recessed region.

In an example, the clamp housing has a pair of openings and lower region that is designed like a heart like shape and a tongue region, which supports the spherical bearing assembly, as shown. Each lobe of the heart like shape acts as a stop for movement of the torque tube in a lateral rotational movement in either direction depending upon the spatial orientation of the lobe. Further details of the clamp housing can be found further below.

In an example, clamp assembly 2000 has a clam shell clamp member coupled to the spherical bearing and the clam shell clamp being suspended from the spherical bearing. That is, the clam shell clamp has a first side and a second side. Each side has an upper region comprising an opening. A pin is inserted through each of the openings, while an opening of the spherical bearing is provided as a third suspension region between each of the openings, as shown.

Each side of the clam shell is shaped to conform or couple to at least one side of a portion of the torque tube, as shown. Each side has one or more opens, which align to one or more openings on the portion of the torque tube. A pin or bolt is inserted through each of the openings to clamp the clam shell clamp to the portion of the torque tube and surround substantially an entirety of a peripheral region of the torque tube. The pin or bolt or pins or bolts also holds the torque tube in a fixed position relative to the clam shell clamp to prevent the torque tube from slipping and/or twisting within the clam shell clamp. Of course, there can be variations.

In an example, the spherical bearing allows for a construction tolerance, tracker movement, and acts as a bonding path of least resistance taking an electrical current to ground. The bonding path occurs from any of the modules, through the frame, to each of the clamp assembly, to one or more piers, and then to ground.

In an example, the clam shell apparatus comprising a first member 2031 operably coupled to a second member 2032 to hold a torque tube in place. In an example, the apparatus has a clamp housing operably coupled to the clam shell apparatus via a spherical bearing device such that the spherical bearing comprises an axis of rotation, which is different from a center of the torque tube.

Figure 21:
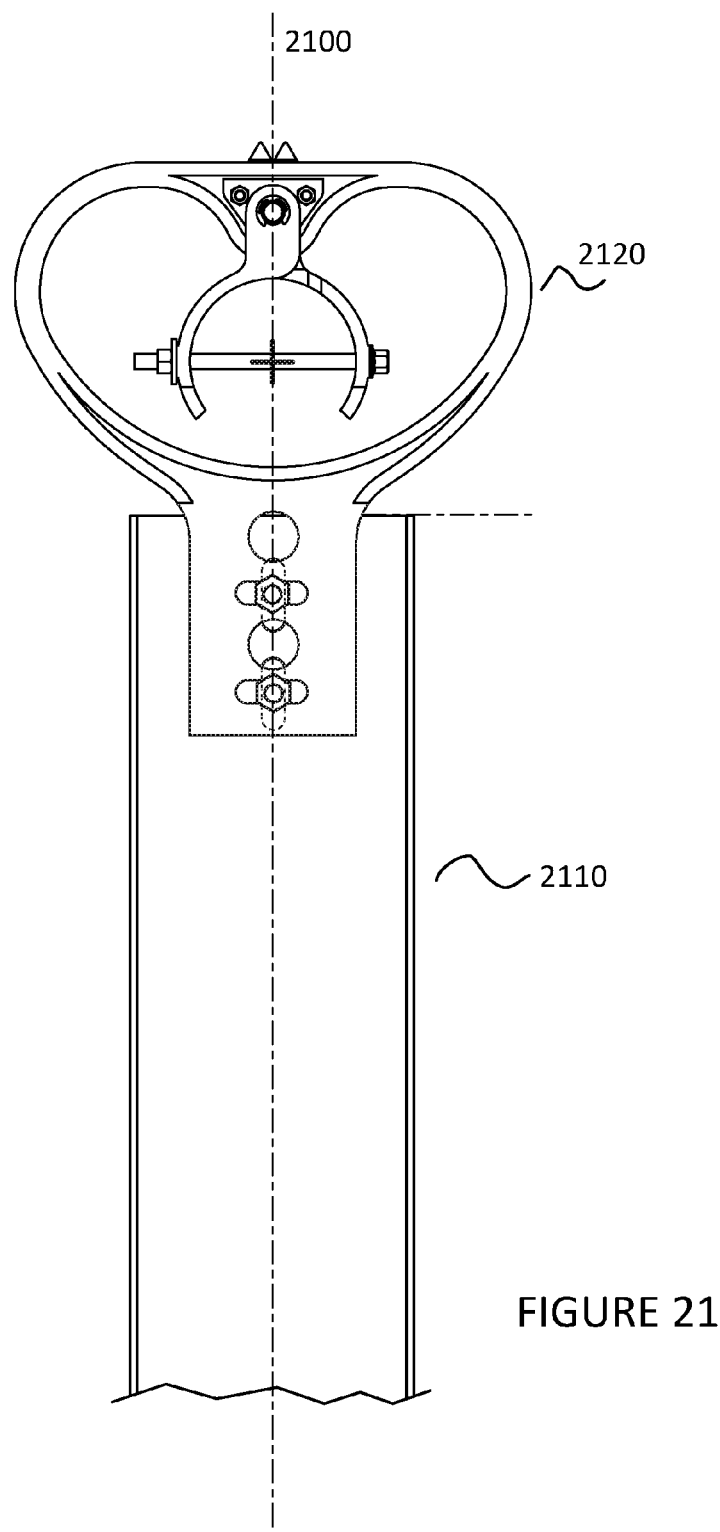
FIG. 21 is a simplified in-line view diagram illustrating a clamp assembly coupled to a pier member according to an embodiment of the present invention.

FIG. 21 is a simplified in-line view diagram illustrating a clamp assembly 2100 coupled to a pier member 2110 according to an embodiment of the present invention. As shown, a pair of nuts and bolts holds the pier structure to the clamp housing 2120 along the dotted line.

Figure 22:
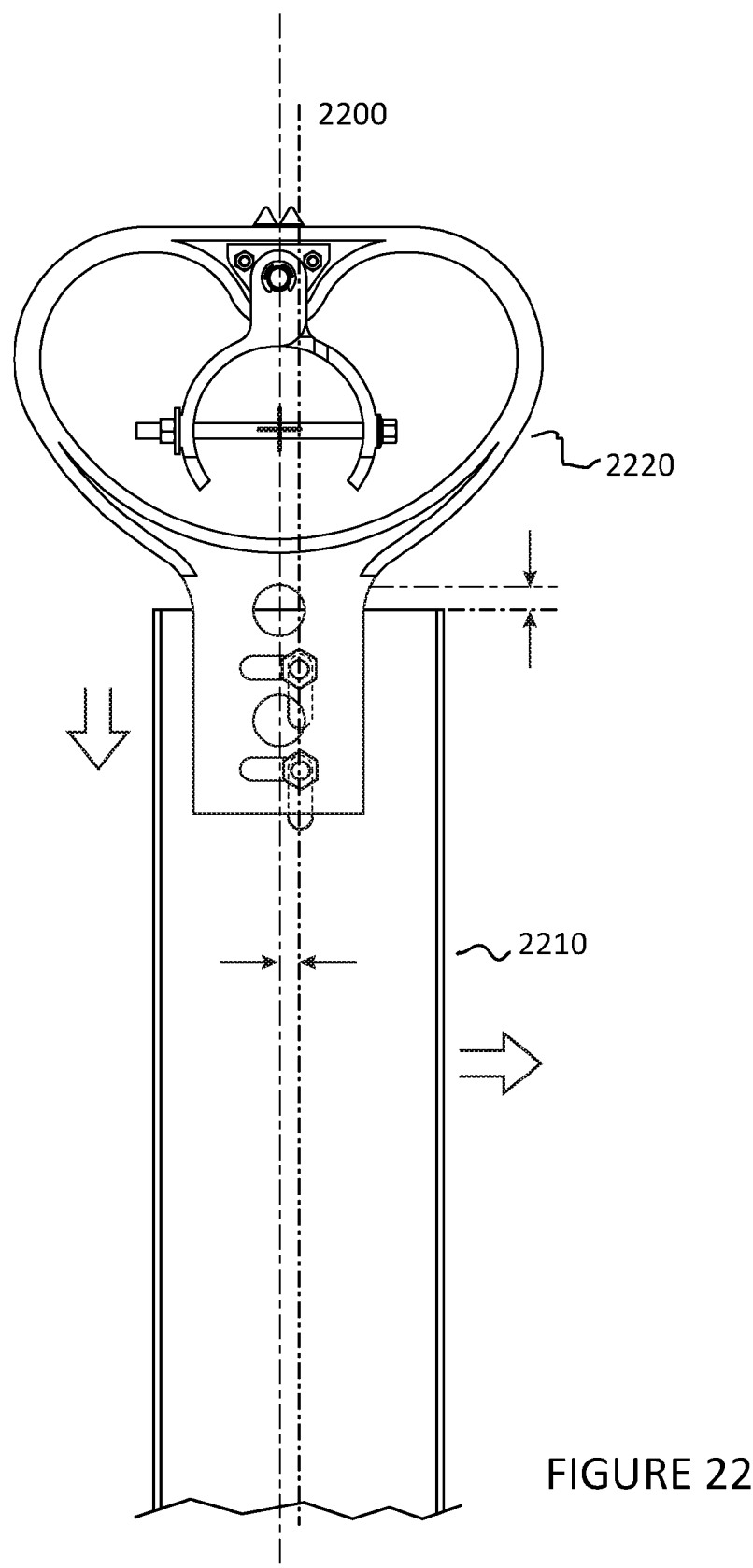
FIG. 22 is a simplified in-line view diagram illustrating a clamp assembly coupled to a pier member in a first orientation according to an embodiment of the present invention.

FIG. 22 is a simplified in-line view diagram illustrating a clamp assembly 2200 coupled to a pier member 2210 in a first orientation according to an embodiment of the present invention. As shown, the clamp housing 2220 can be off-set in a vertical and lateral manner using the slots in each of the pier and housing structure 2220 facing the in-line view of the torque tube.

Figure 23:
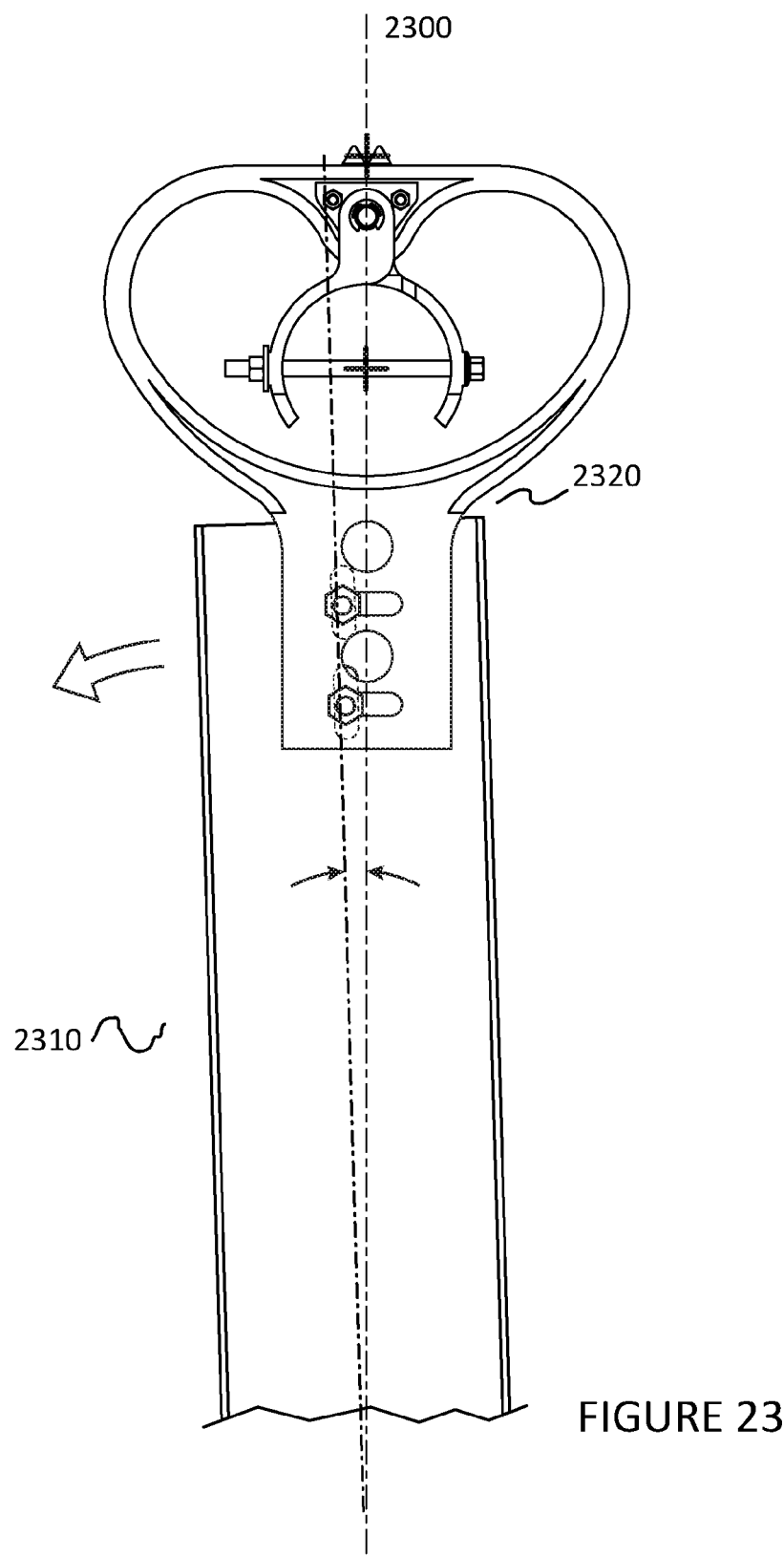
FIG. 23 is a simplified in-line view diagram illustrating a clamp assembly coupled to a pier member in a second orientation according to an embodiment of the present invention.

FIG. 23 is a simplified in-line view diagram illustrating a clamp assembly 2300 coupled to a pier member 2310 in a second orientation according to an embodiment of the present invention. As shown, the clamp housing 2320 can be adjusted in a rotational manner (in either direction) using the same slots in each of the pier and housing structures facing the in-line view of the torque tube.

Figure 24:
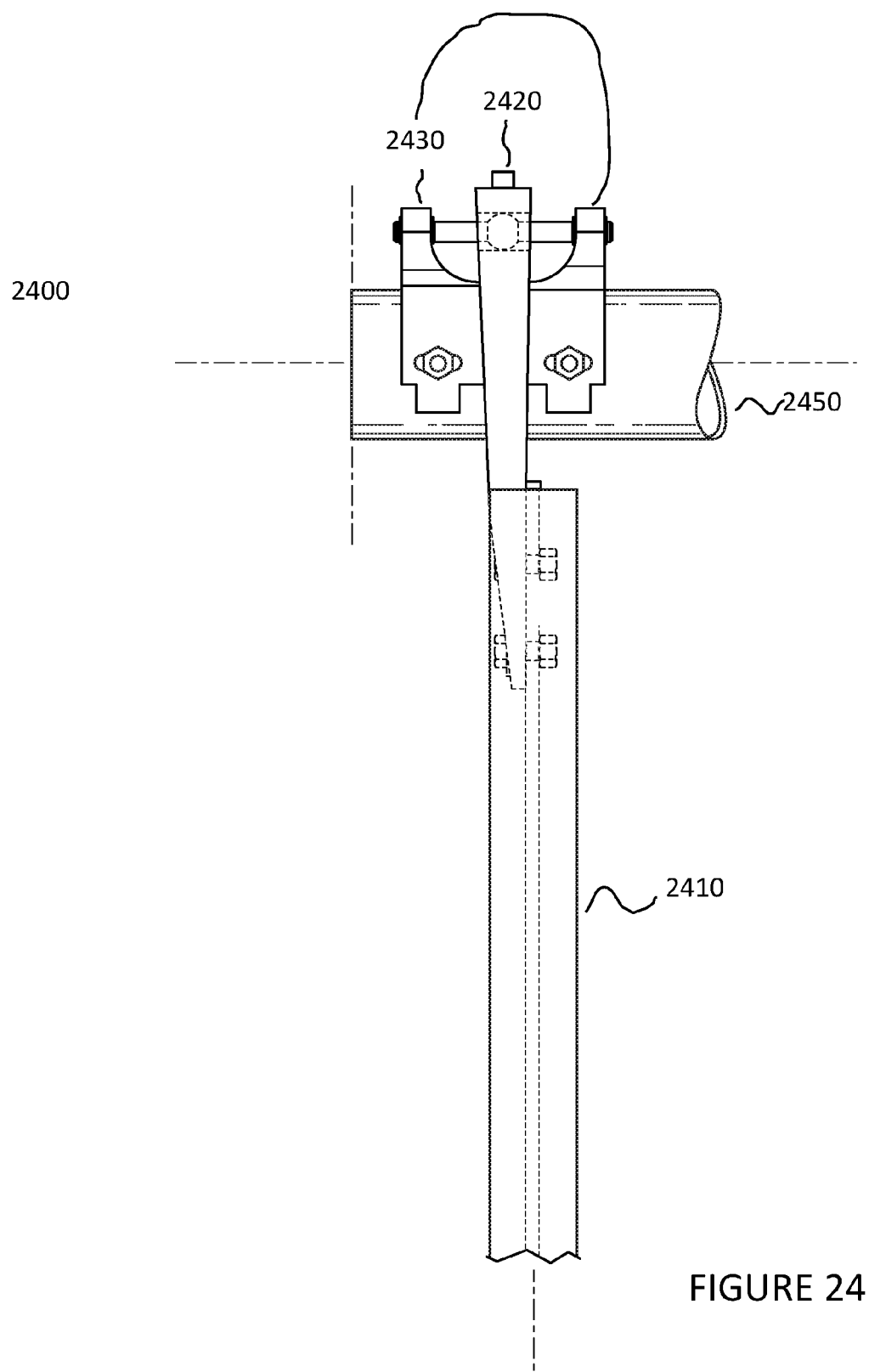
FIG. 24 is a simplified side view diagram illustrating a clamp assembly coupled to a pier member in a first orientation according to an embodiment of the present invention.

FIG. 24 is a simplified side view diagram illustrating a clamp assembly 2400 coupled to a pier member 2410 in a first orientation according to an embodiment of the present invention. As shown, the housing 2420 and pier structure, along with the torque tube 2450, are arranged in a normal orientation using the pins configuring the torque tube 2450 to the clam shell clamp member 2430. As shown, the clamp member 2430 has an elongated opening to allow each of the pins to be adjusted in place, which allows the relationship of the clamp and torque tube 2450 to be adjusted.

Figure 25:
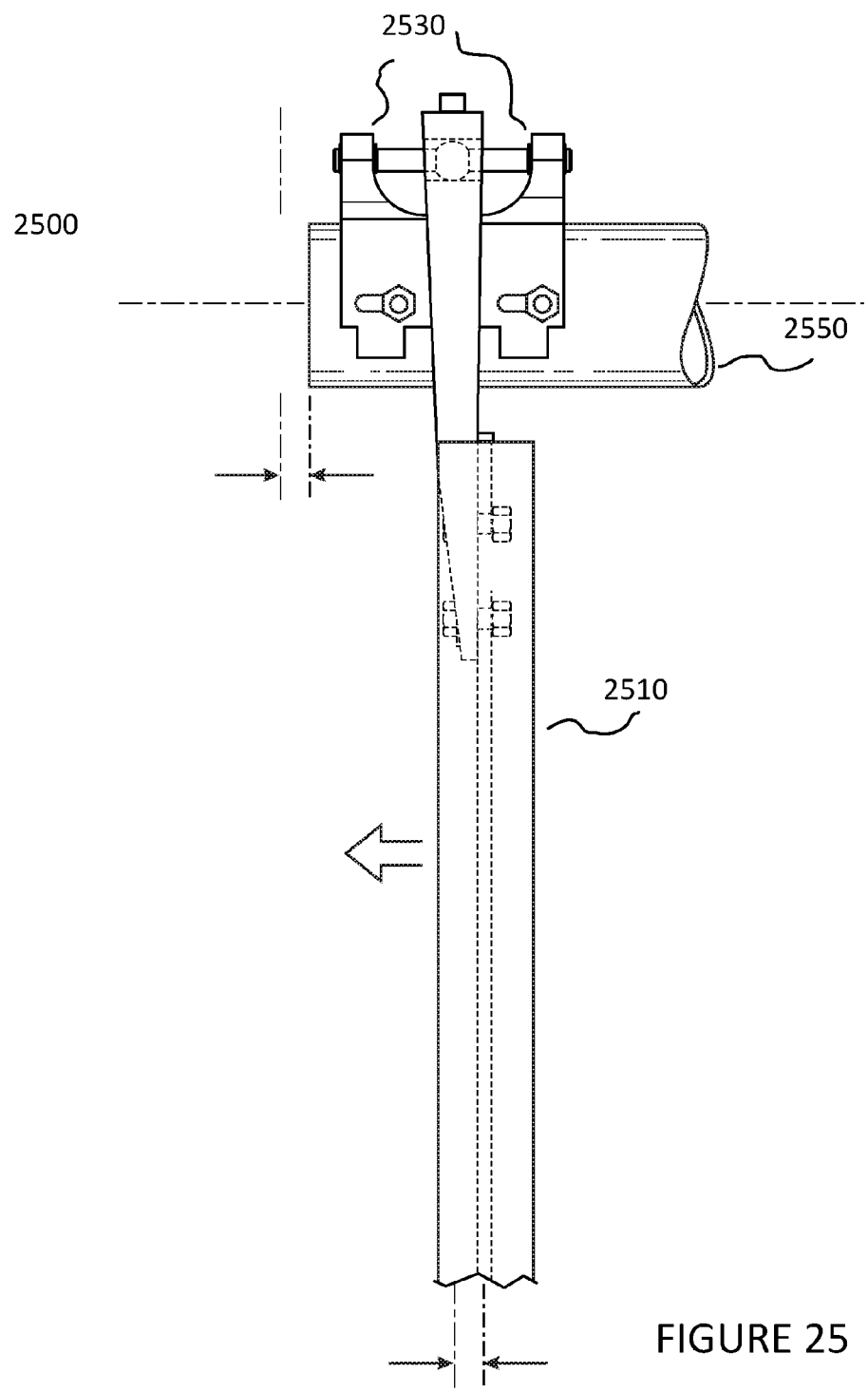
FIG. 25 is a simplified side view diagram illustrating a clamp assembly coupled to a pier member in a second orientation according to an embodiment of the present invention.

FIG. 25 is a simplified side view diagram illustrating a clamp assembly 2500 coupled to a pier member 2510 in a second orientation according to an embodiment of the present invention. As shown, the torque tube 2550 is shifted in an in-line direction (either way) using the slots in the clamp, while the torque tube 2550 has a smaller opening for the pin, which does not allow for any adjustment, in an example.

Figure 26:
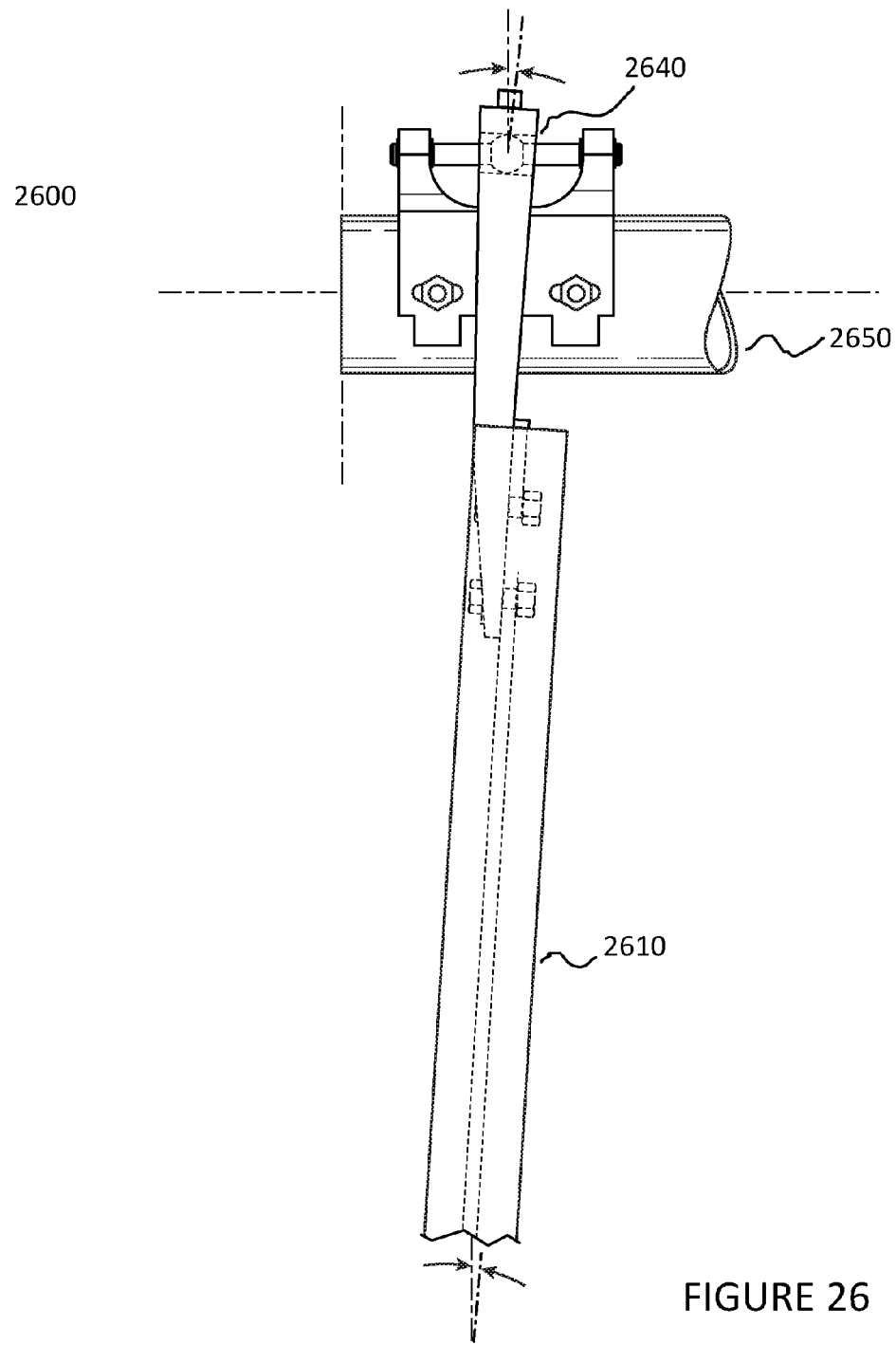
FIG. 26 is a simplified side view diagram illustrating a clamp assembly coupled to a pier member in a third orientation according to an embodiment of the present invention.

FIG. 26 is a simplified side view diagram illustrating a clamp assembly 2600 coupled to a pier member 2610 in a third orientation according to an embodiment of the present invention. As shown, the torque tube 2650 can be rotated or adjusted relative to the direction of the length of the pier using the movement of the spherical bearing assembly 2640, explained and shown. As shown, the torque tube 2650 is parallel to the direction of gravity in an example.

Figure 27:
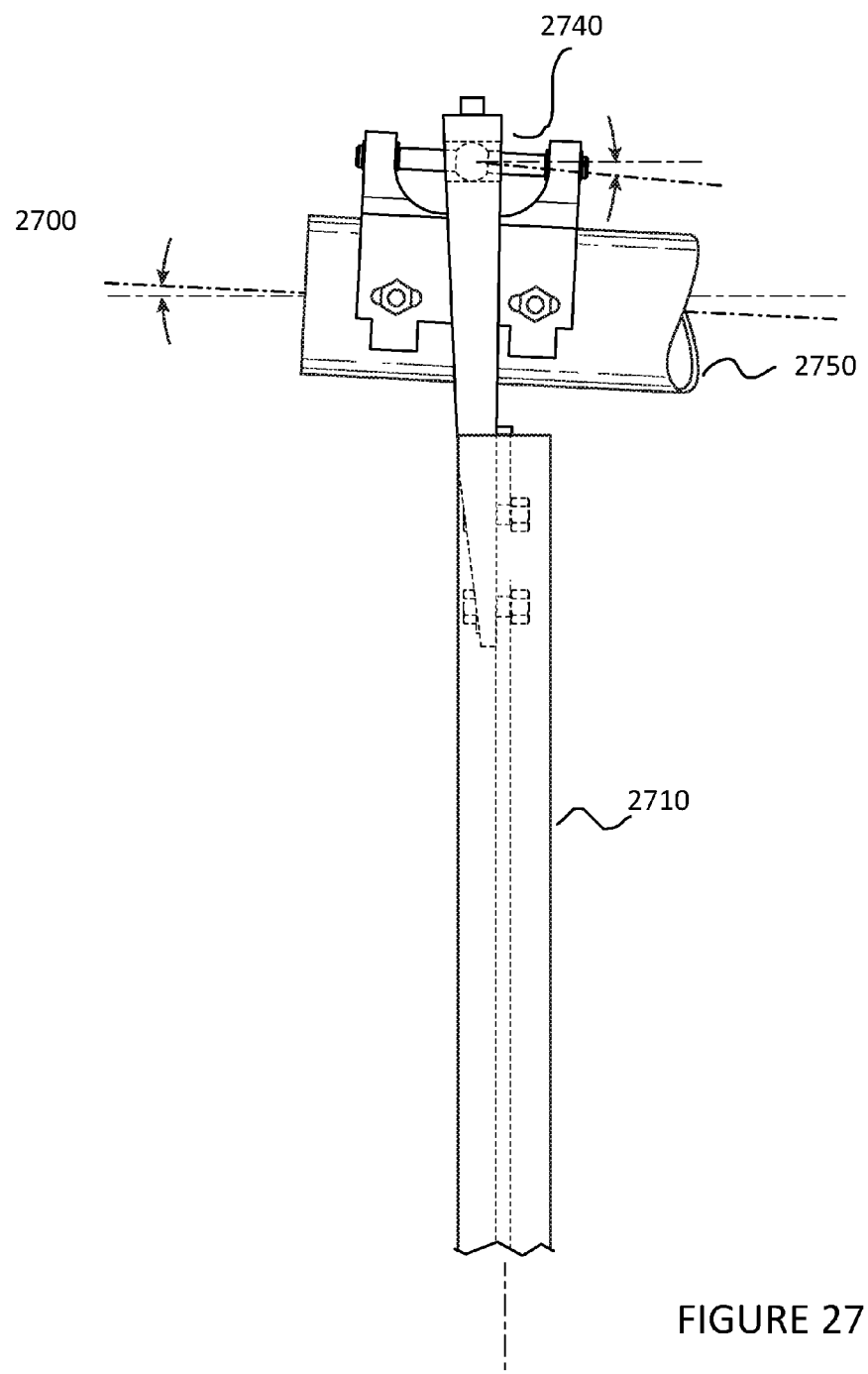
FIG. 27 is a simplified side view diagram illustrating a clamp assembly coupled to a pier member in a fourth orientation according to an embodiment of the present invention.

FIG. 27 is a simplified side view diagram illustrating a clamp assembly 2700 coupled to a pier member 2710 in a fourth orientation according to an embodiment of the present invention. As shown, the torque tube 2750 can be rotated or adjusted relative to the direction of the length of the pier using the movement of the spherical bearing assembly 2740, explained and shown. As shown, the torque tube 2750 is not parallel to the direction of gravity in an example.

Figure 28:
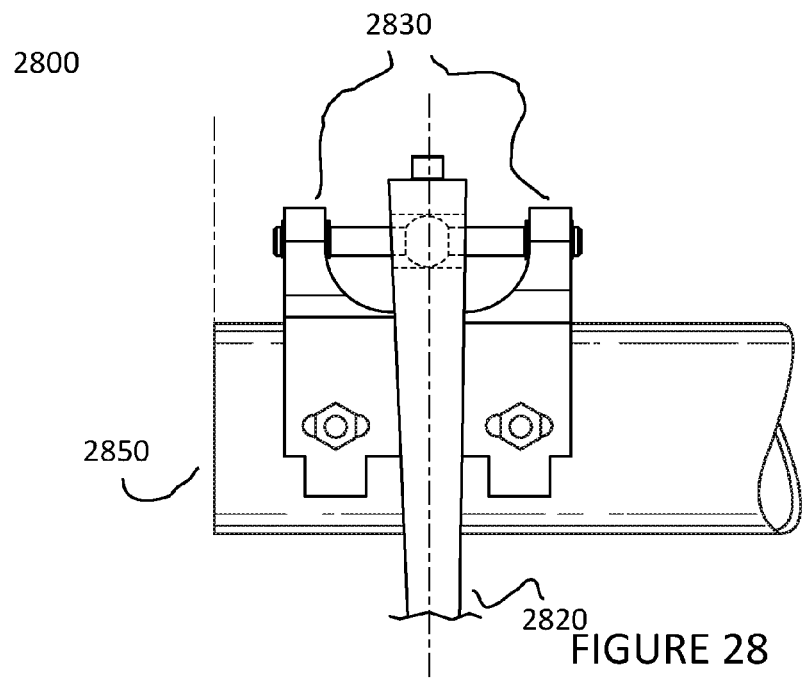
FIG. 28 is a simplified side view diagram illustrating a clamp assembly coupled to a pier member in a fifth orientation according to an embodiment of the present invention.

FIG. 28 is a simplified side view diagram illustrating a clamp assembly 2800 coupled to a pier member 2810 in a fifth orientation according to an embodiment of the present invention. As shown, the torque tube 2850, housing 2820, and clamp 2830 are aligned in this example.

Figure 29:
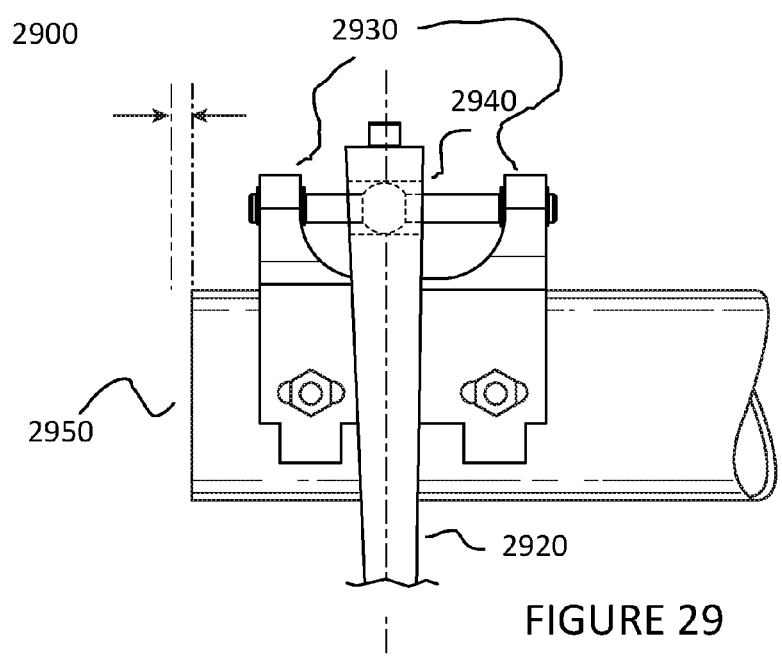
FIG. 29 is a simplified side view diagram illustrating a clamp assembly coupled to a pier member in a sixth orientation according to an embodiment of the present invention.

FIG. 29 is a simplified side view diagram illustrating a clamp assembly 2900 coupled to a pier member 2910 in a sixth orientation according to an embodiment of the present invention. As shown, the torque tube 2950, housing 2920, and clamp 2930 are aligned in this example. However, the position of the spherical bearing 2940 to pin has shifted in one direction by sliding the pin in the same direction, although the pin can be slid in the other opposite direction in other examples. In this example, pin to clamp arrangement can be moved along the pin from one spatial region to another spatial region.

Figure 30:
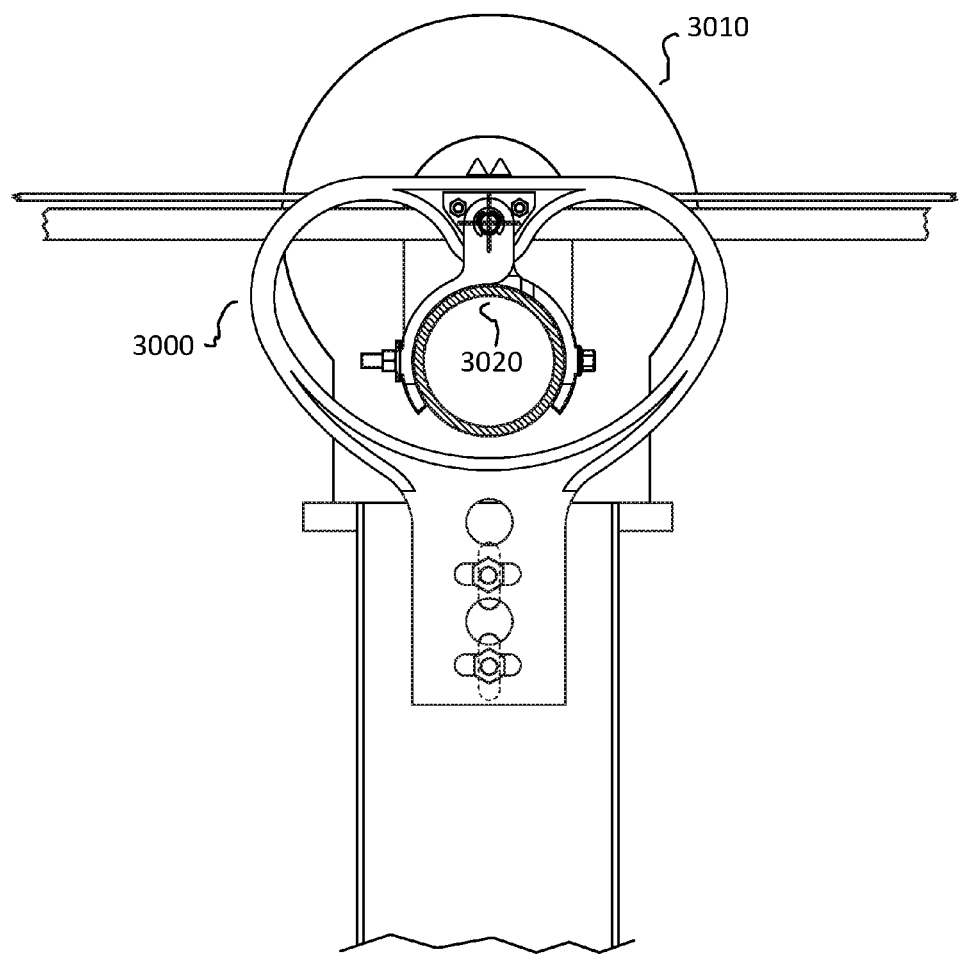
FIGS. 30 through 32 illustrate an in-line view of the clamp assembly and the drive assembly in multiple configurations according to embodiments of the present invention.
Figure 31:
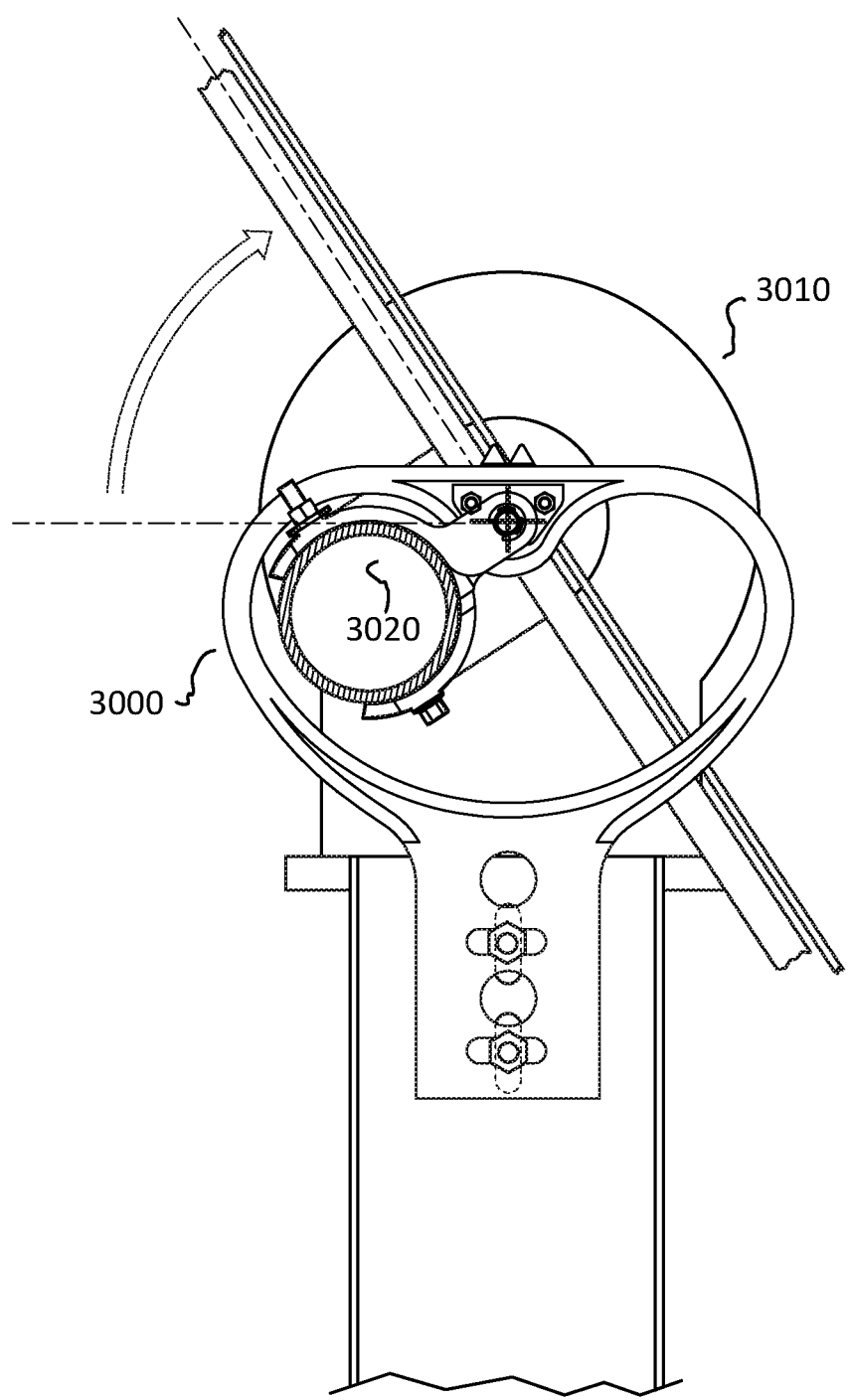
Figure 32:
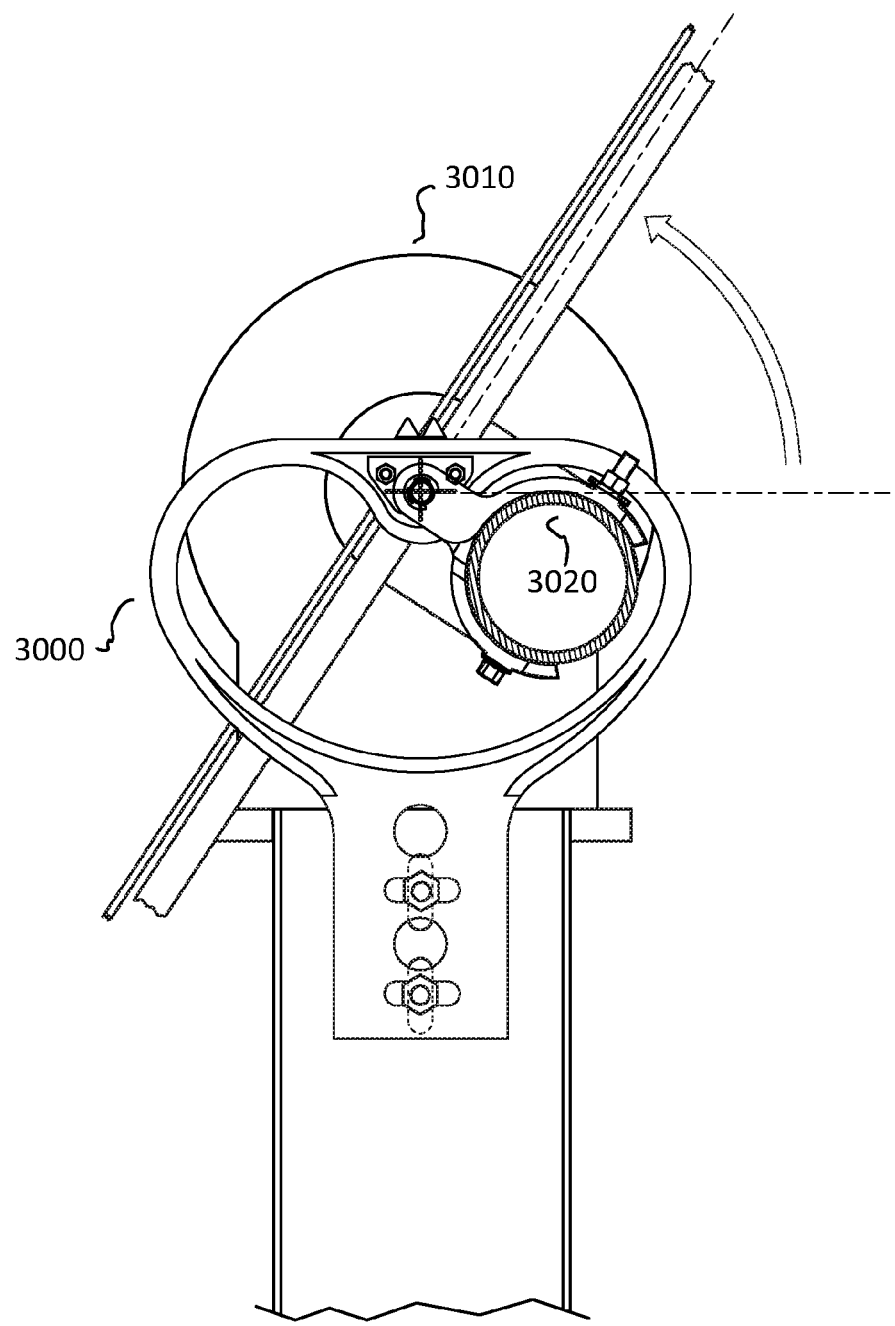

FIGS. 30 through 32 illustrate an in-line view of the clamp assembly 3000 and the drive assembly 3010 in multiple configurations according to embodiments of the present invention. As shown, the crank is in a lower position, which allows for the torque tube 3020 to be at its lowest position in an example. As the drive device moves the crank, the torque tube 3020 swings from the lowest position to an elevated position in a radial manner along a first direction or an elevated position in a radial manner along a second direction, as shown. As the torque tube 3020 rotates, the plurality of solar panels fixed to the torque tube also rotate along a path from a first spatial region to a second spatial region. As shown, each of the inner regions of the lobes acts as a stop for the torque tube 3020 or an override for the torque tube 3020. Of course, there can be other variations.

Figure 33:
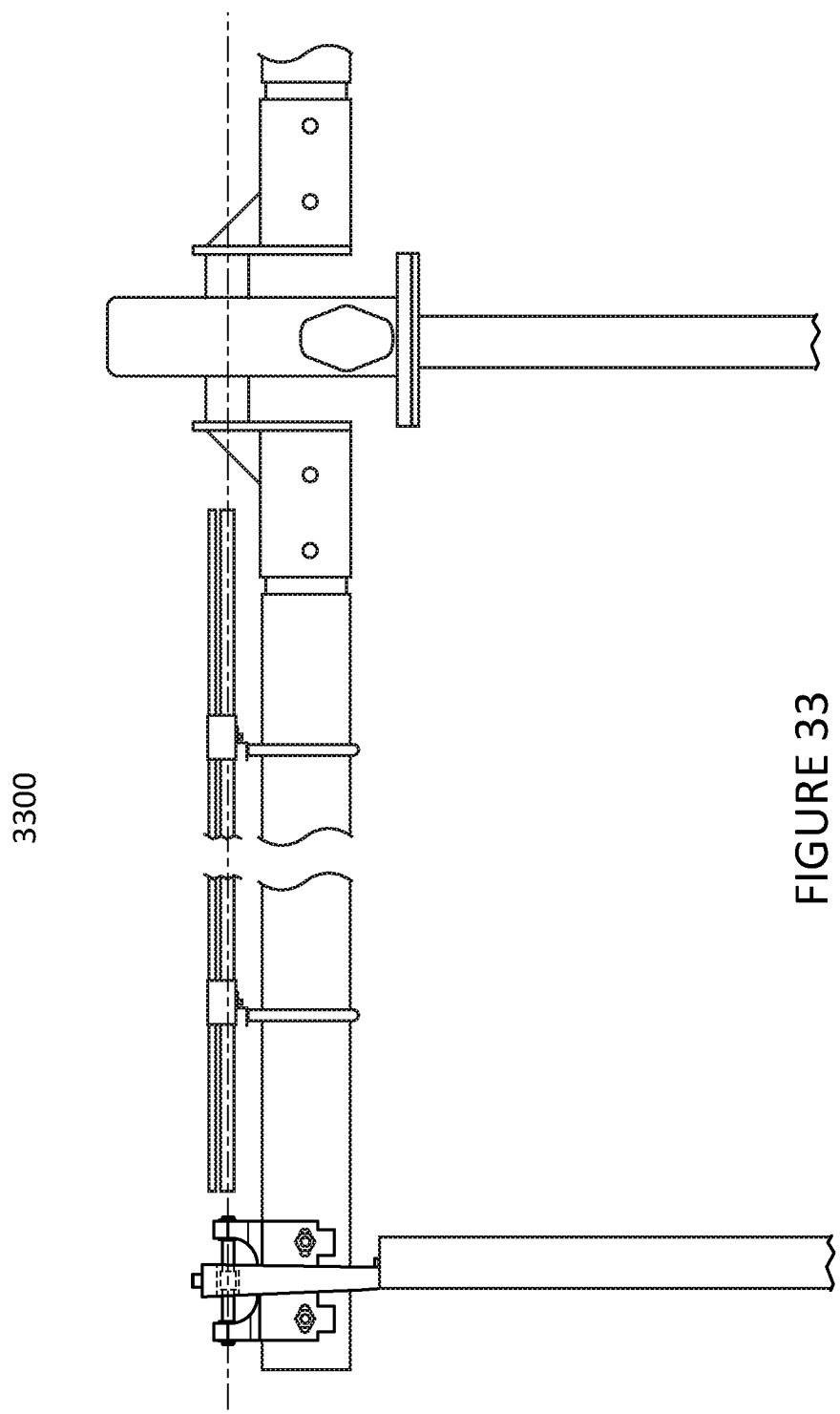
FIG. 33 is a side view diagram of the tracker apparatus according to an embodiment of the present invention.

FIG. 33 is a side view diagram of the tracker apparatus 3300 according to an embodiment of the present invention. As shown is a side view diagram of the torque tube, solar panels with frames, and clamp housing and structure.

Figure 34:
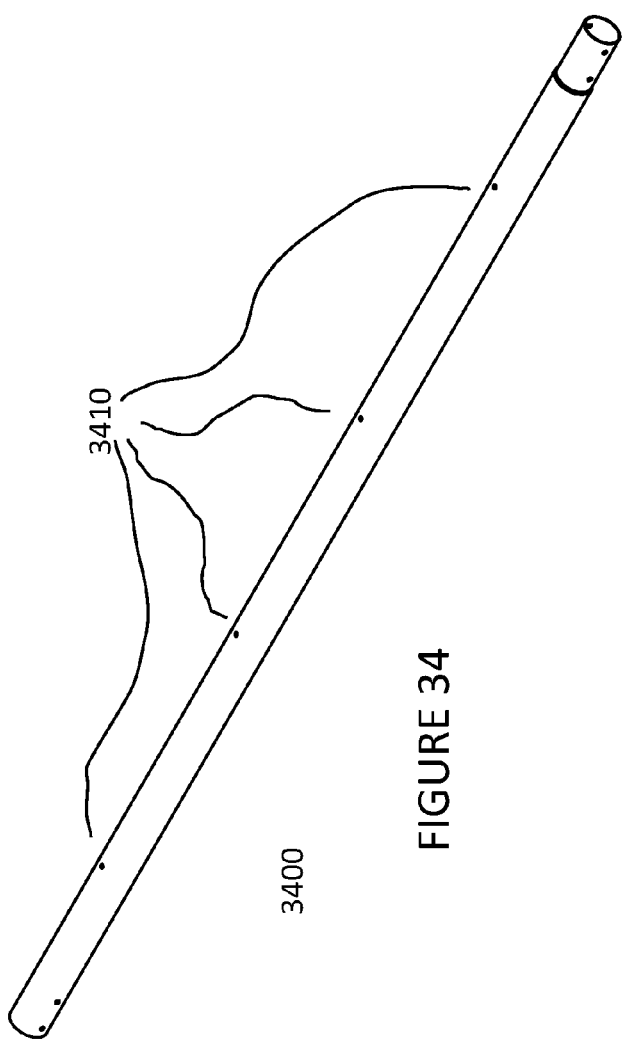
FIGS. 34 and 35 are simplified side view diagrams of a torque tube according to an embodiment of the present invention.
Figure 35:
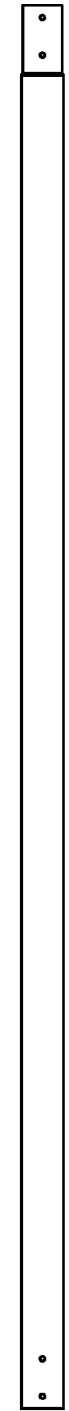

FIGS. 34 and 35 are simplified side view diagrams of a torque tube 3400 according to an embodiment of the present invention. As shown, each of the torque tubes has a plurality of openings 3410 on each end for affixing to either the clamp or drive device cylinder. Each of the torque tubes also has a plurality of openings 3410 for clamps configured to hold the tube to a frame coupled to the plurality of solar modules.

FIGS. 36, 37, and 38 are simplified perspective-view, side view, and front view diagrams of a clamp member or half clam shell member 3600 according to an embodiment of the present invention. As shown are the clam shell members, including pin opening to be coupled to the spherical bearing, and a plurality of slots for bolts to hold the torque tube in place and for adjustment.

Figure 39:
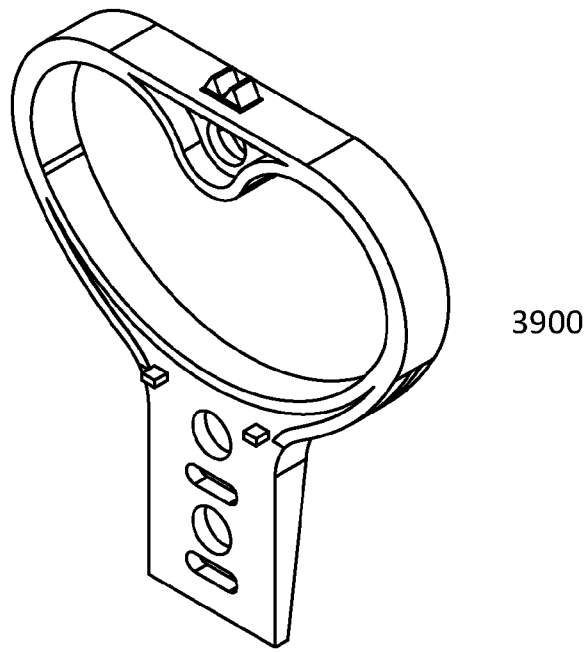
FIGS. 39 and 40 are simplified perspective-view and side view diagrams of a clamp housing according to an embodiment of the present invention.
Figure 40:
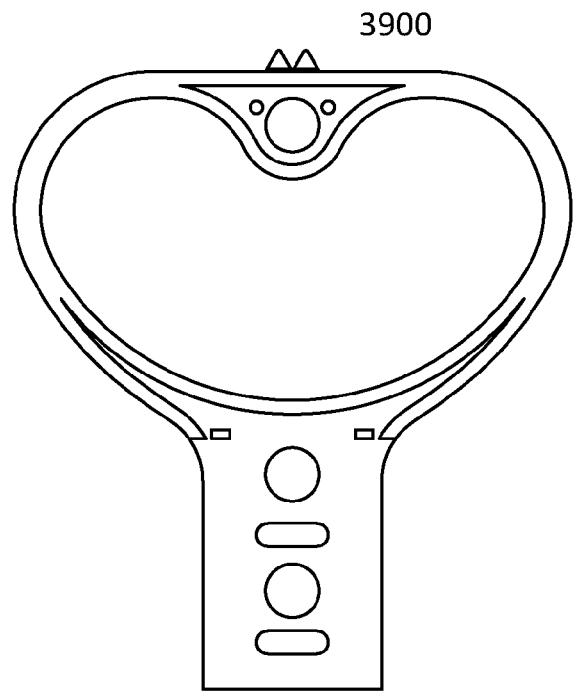
Figure 41:
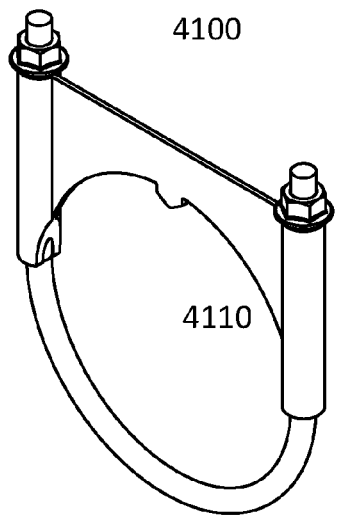
FIGS. 41, 42, 43, and 44 are simplified diagrams of component(s) for a U-bolt member according to an embodiment of the present invention.
Figure 42:
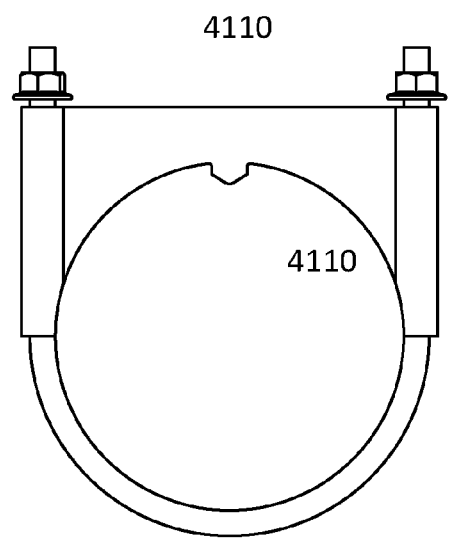
Figure 43:
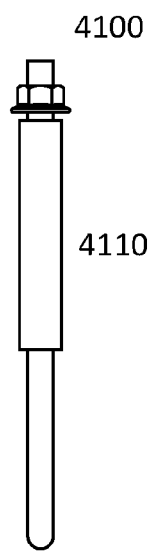
Figure 44:
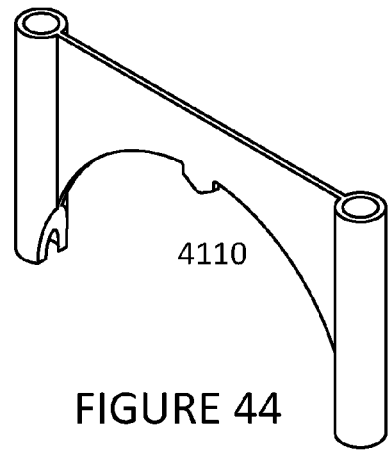

FIGS. 39 and 40 are simplified perspective-view and side view diagrams of a clamp housing 3900 according to an embodiment of the present invention. As shown is the clamp housing 3900 configured as a heart like shape, with tongue. The tongue has a recessed region, and an opening or slot for the spherical bearing. The housing 3900 also has a member to be coupled to the pier structure.

FIGS. 41, 42, 43, and 44 are simplified diagrams of component(s) for a U-bolt member 4100 according to an embodiment of the present invention. As shown is a U-bolt member 4100 and a pair of nuts to secure the U-bolt. The components also includes an upper clamp 4110 with a protrusion to be coupled to a notch or opening in the torque tube to prevent any movement between the torque tube and U-bolt member 4100. That is, the protrusion acts as a stop to hold the U-bolt in place.

Figure 45:
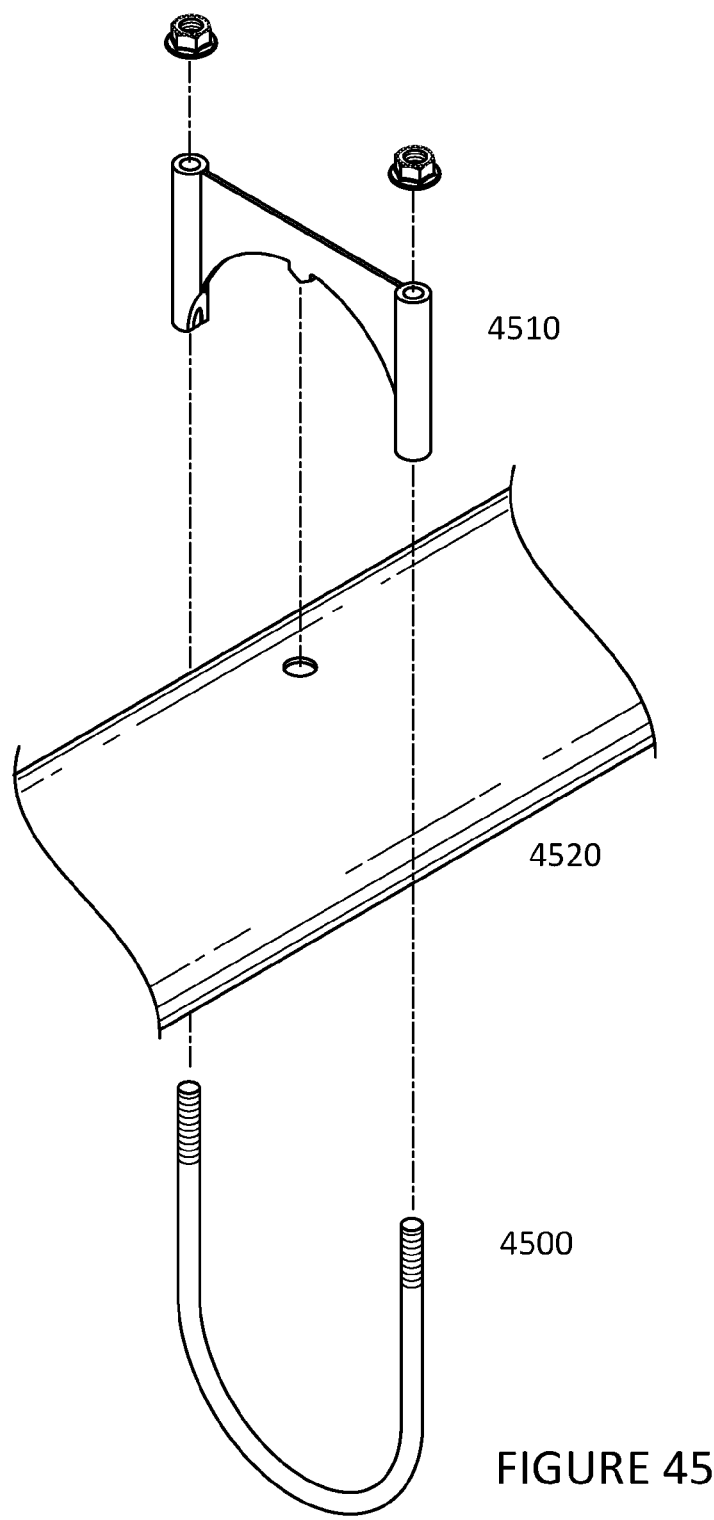
FIGS. 45, 46, and 47 are simplified diagrams illustrating a method of configuring a U-bolt member to a torque tube according to an embodiment of the present invention.
Figure 46:
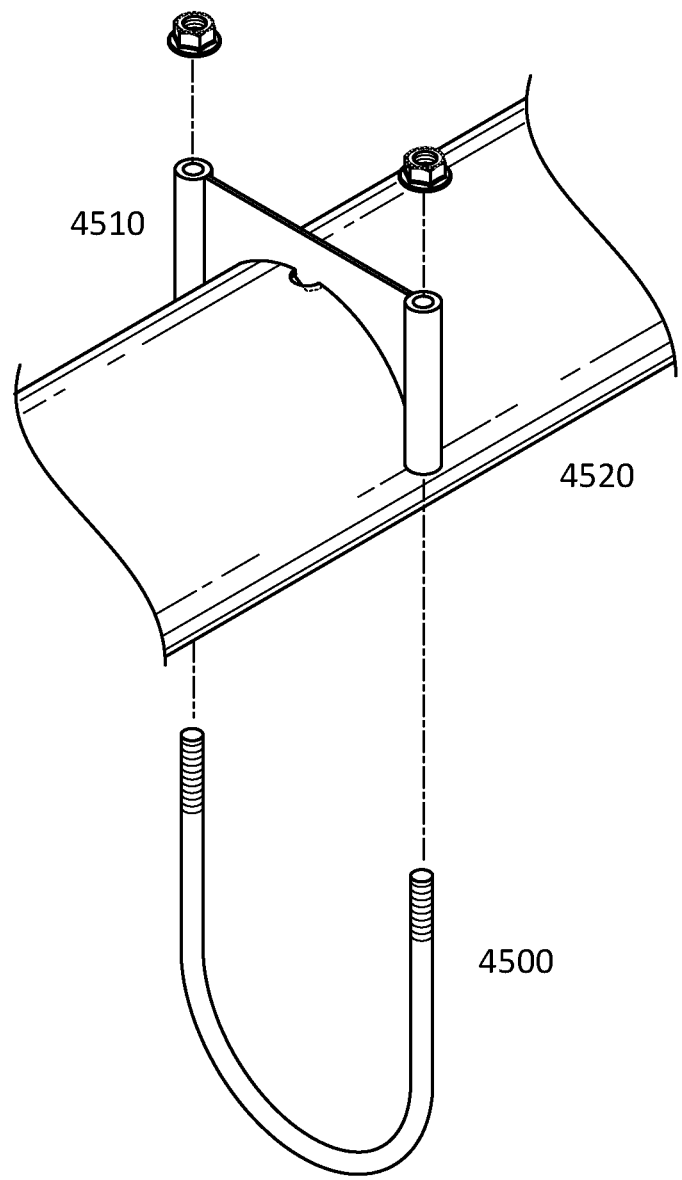
Figure 47:
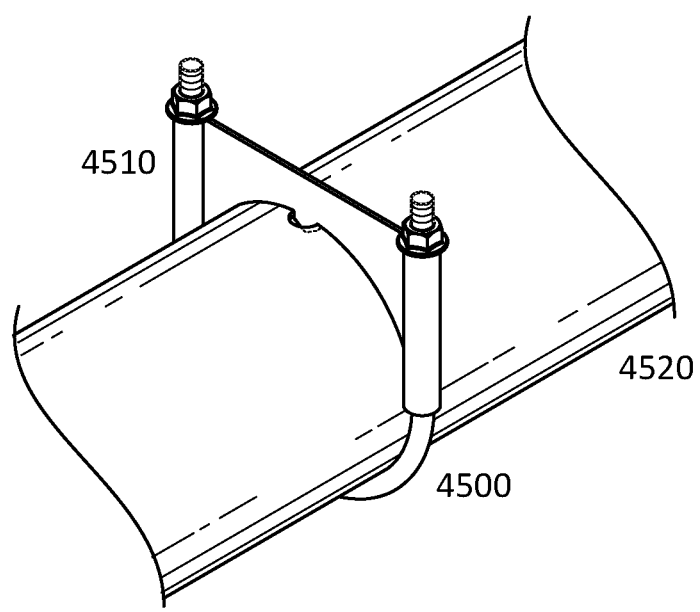

FIGS. 45, 46, and 47 are simplified diagrams illustrating a method of configuring a U-bolt member to a torque tube 4520 according to an embodiment of the present invention. As shown are U-bolt coupled to a periphery of the torque tube 4520. The clamp member 4510 including protrusion, which has a thinner portion and thicker portion, coupled to a notch in the torque tube. A pair of bolts fastens and secures the clamp member 4510 and U-bolt 4500 in place to hold the frame structure, which couples to the plurality of solar modules.

FIGS. 48 and 49 illustrate various views of a tracker apparatus 4800 according to an embodiment of the present invention. As shown, the torque tube and tracker apparatus 4800 are in a normal rest position.

FIGS. 50 and 51 illustrate views of a tracker apparatus 5000 according to an embodiment of the present invention. As shown, a lateral force is provided against a direction normal to the length of the torque tube, which causes one end of the torque tube to move in the lateral direction, while the other end remains fixed in an example.

Figure 52:
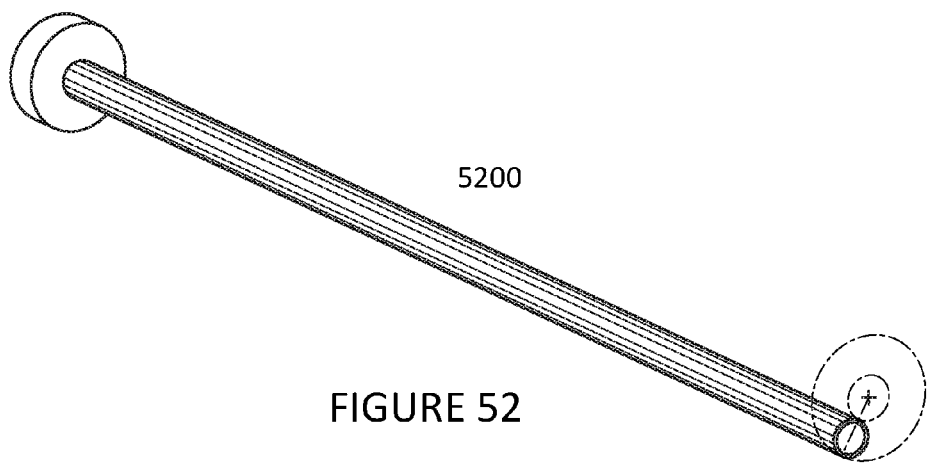
FIGS. 52 and 53 illustrate an illustration of a torque tube according to an embodiment of the present invention.
Figure 53:
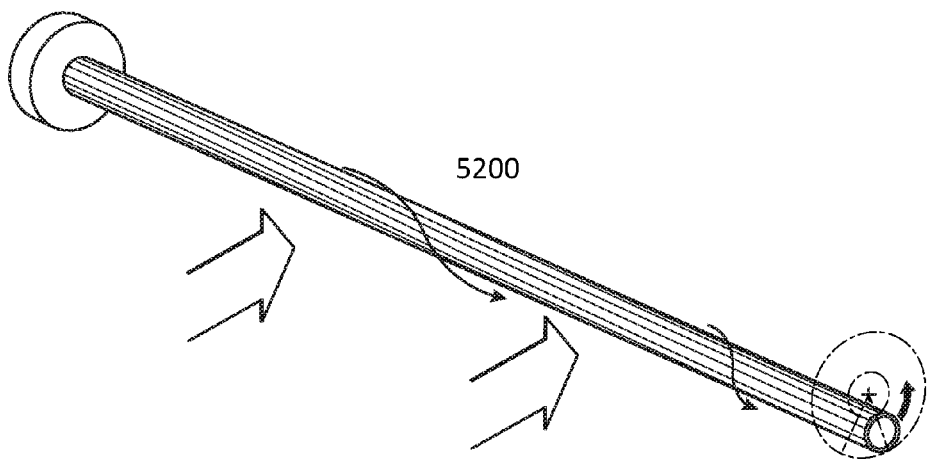

FIGS. 52 and 53 illustrate an illustration of a torque tube 5200 according to an embodiment of the present invention. As shown, the torque tube 5200 rotates and swings in a radial manner upon being subjected to the lateral force, in an example. The torque tube 5200 stops against an inner side of one of the lobes of the clamp housing.

Figure 54:
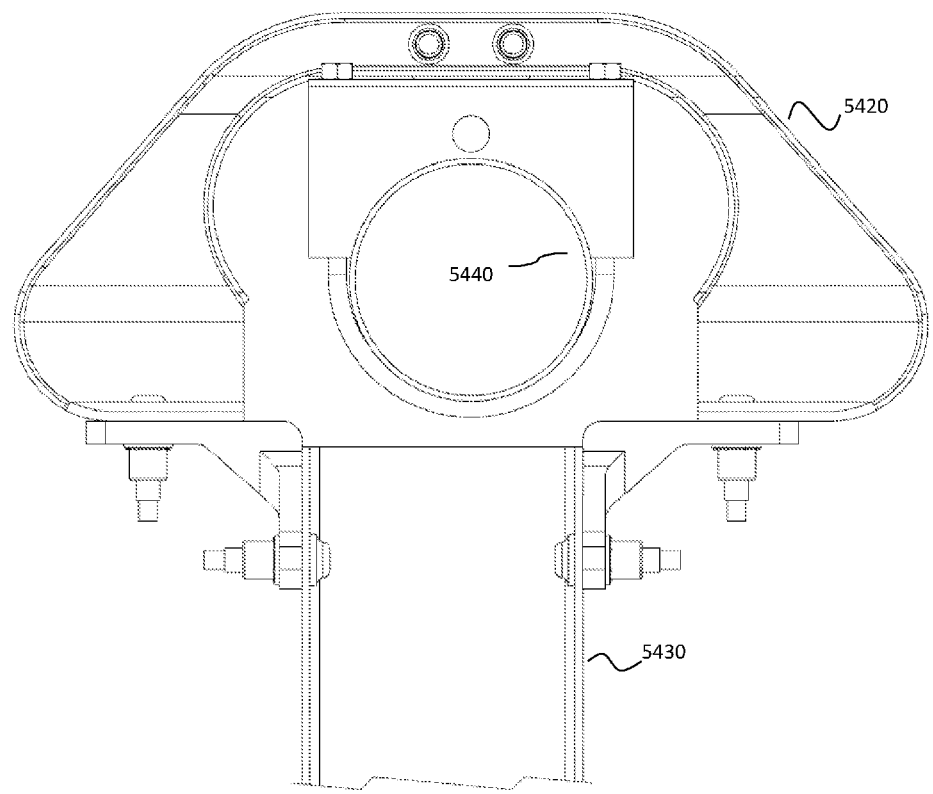
FIG. 54 is a front view diagram of a clamp assembly according to an example of the present invention.

FIG. 54 is a front view diagram of a clamp assembly 5400 according to an example of the present invention. As shown is a front view of a solar tracker apparatus, and in particular a clamp assembly 5400 configured for a torque tube 5440. In an example, the clamp assembly has a support structure configured as a frame 5420 having configured by a first anchoring region and a second anchoring region. As shown, the first anchoring region is coupled to a pier support 5430 using a nut and bolt fastener. The second anchoring region is coupled to a pier support 5430 using a nut and bolt fastener. In an example, the frame structure is shaped as a loop that is symmetric and can also be non-symmetric in other examples. As shown, the support structure being configured from a thickness of metal material, such as high grade steel or other metal material with sufficient strength. In an example, the support structure is stamped from the thickness of metal material. In an example, the support structure is configured from a stamped steel comprising a Q345 steel or other suitable material. In an example, the support structure being configured in an upright manner, and has a major plane region configured within the frame structure. As shown, the major plane region has an opening to allow the torque tube 5440 and related support members to move within the opening.

In an example, the torque tube 5440 is coupled to a pivot device configured on the support structure. In an example, the torque tube 5440 suspending on the pivot device and aligned within the opening of the support and configured to be normal to the plane region. In an example, the torque tube 5440 is configured on the pivot device to move about an arc in a first direction or in a second direction such that the first direction is in a direction opposite to the second direction. As mentioned, the support structure comprises the frame 5420 configured with the opening. As shown, the frame 5420 has a first stop region within a first inner region of the frame 5420 and a second stop region within a second inner region of the frame 5420 and configured to allow the torque tube 5440 to swing in a first direction within the opening and stop against the first stop region and swing in a second direction within the opening and stop against the second stop region.

In an example, (not shown), the assembly is coupled to a drive device configured to cause the torque tube 5440 to swing in the first direction and swing in the second direction. In an example, the pivot device is configured to allow the torque tube 5440 to move about an arc direction, while being fixed in other spatial domains. In an example, the pivot device comprises a pin structure configured in a sleeve or bearing assembly that is coupled to the frame structure.

Figure 55:
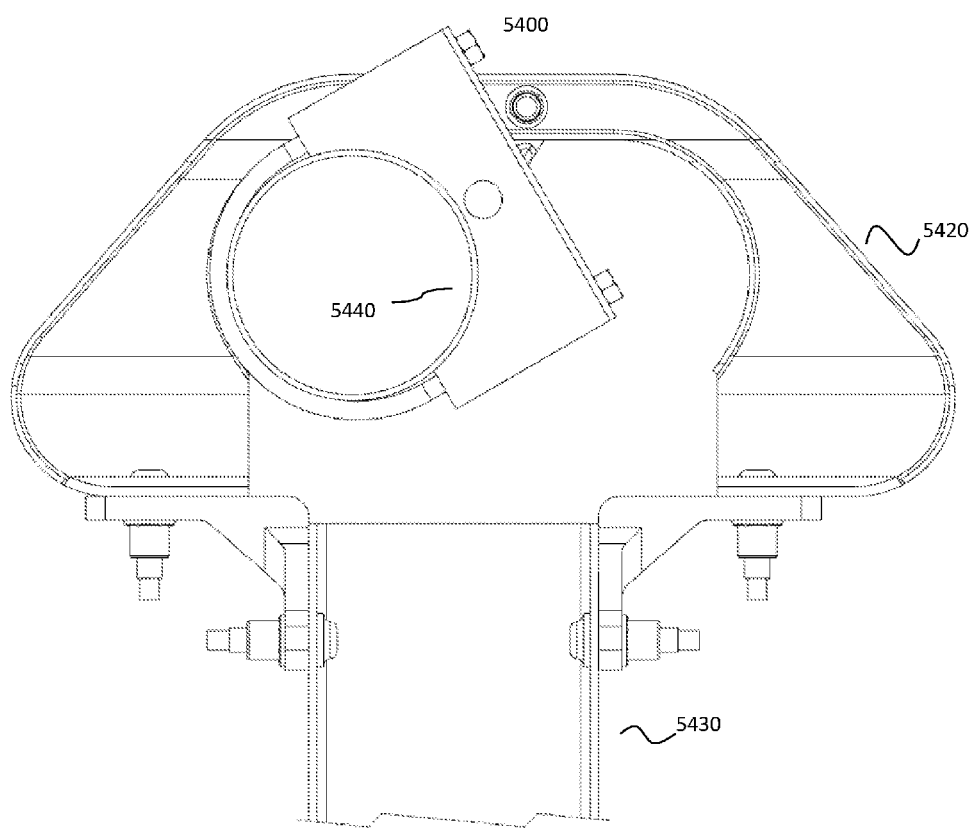
FIG. 55 is a front view diagram of a clamp assembly in a stop position according to an example of the present invention.

FIG. 55 is a front view diagram of a clamp assembly 5400 in a stop position according to an example of the present invention. As shown, the frame 5420 having a first stop region within a first inner region of the frame 5420 and a second stop region within a second inner region of the frame 5420 and configured to allow the torque tube 5440 to swing in a first direction within the opening and stop against the first stop region and swing in a second direction within the opening and stop against the second stop region; and further comprising a drive device configured to cause the torque tube 5440 to swing in the first direction and swing in the second direction.

Figure 56:
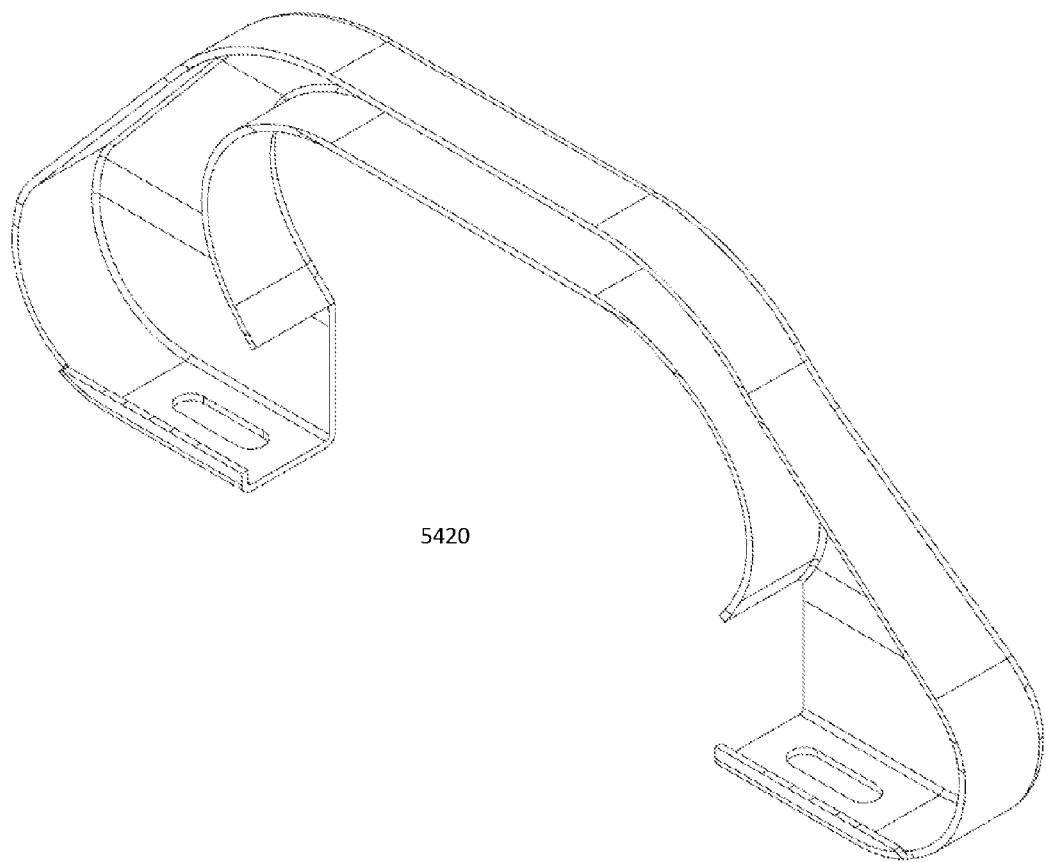
FIG. 56 is a perspective view of a frame structure to be configured for the clamp assembly according to an example of the present invention.

FIG. 56 is a perspective view of a frame structure to be configured for the clamp assembly 5400 according to an example of the present invention. As shown, the frame structure is configured as the loop with an open region. As shown, the open region is symmetric in shape. Two anchor regions, including flats each of which is fitted with a slot to allow the frame structure to be moved either way for adjustment purposes.

Figure 57:
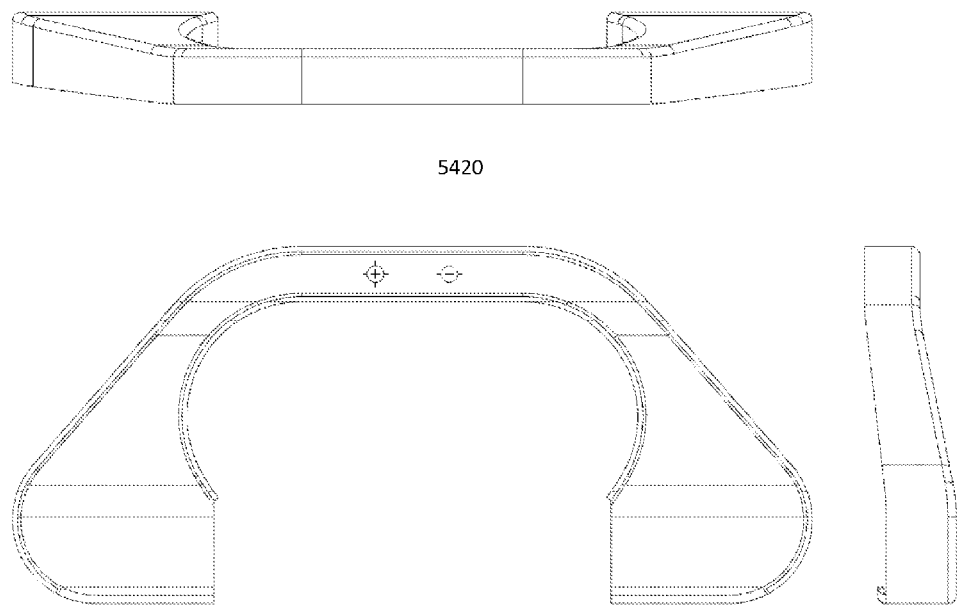
FIG. 57 illustrates a top view diagram, a front view diagram, and a side view diagram of the frame structure to be configured for the clamp assembly according to an example of the present invention.

FIG. 57 illustrates a top view diagram, a front view diagram, and a side view diagram of the frame structure to be configured for the clamp assembly according to an example of the present invention. As shown, the top view (as shown on the upper portion of the drawings) illustrates a member with constant width, while there can be variations. The front view shows the open region configured within the loop structure or frame 5420, and anchor regions, which have flats. The side view is also shown (along right hand side of drawings). Further details of the present structures can be found throughout the present specification and more particularly below.

Figure 58:
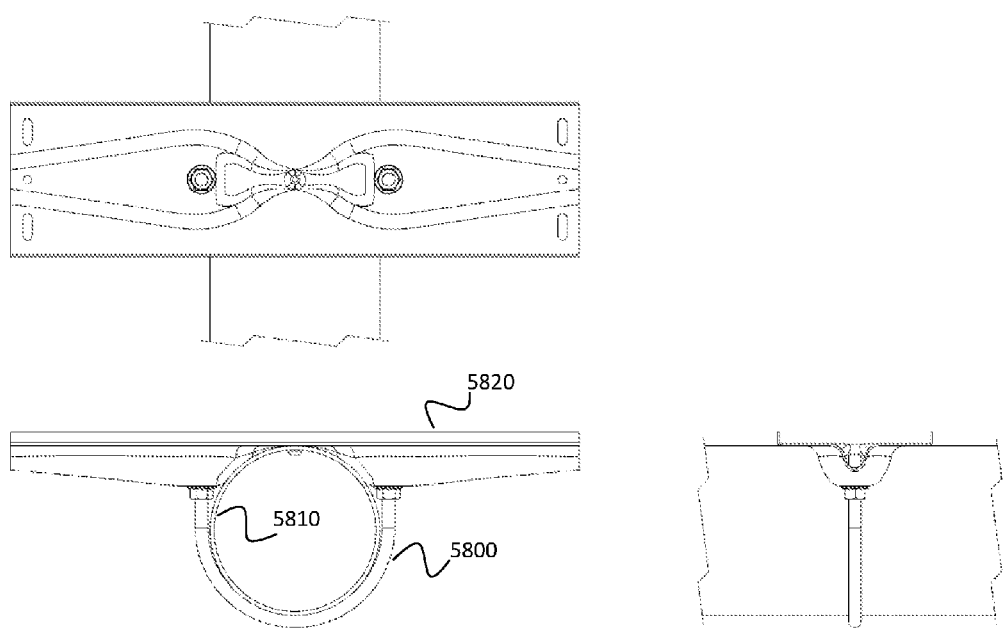
FIG. 58 illustrates a top view diagram, a front-view diagram, and a side view diagram of a U-bolt configured on a torque tube according to an example of the present invention.

FIG. 58 illustrates a top view diagram, a front-view diagram, and a side view diagram of a U-bolt 5800 configured on a torque tube 5810 for a solar panel bracket (or frame structure) according to an example of the present invention. As shown, the top view (top portion of drawings) shows a clamp support 5820 with saddle region configured to the outer portion (not shown) of a portion of the torque tube 5810. As shown, the saddle region is coupled intimately with the portion of the torque tube 5810. A flat region including a pair of openings on each end serve as a bracket for attachment of a solar panel or panels in an example. As shown in the bottom left hand side, the front view has a clamping U-bolt coupling a portion of the torque tube 5810 and is configured to the clamp support 5820. As shown on the right hand side, the side view shows a leg or bolt of a U-bolt 5800 configured on one side of the torque tube 5810 and coupled to the clamp support 5820. The other side has a similar configuration, including leg or bolt of the U-bolt 5800 and torque tube 5810.

Figure 59:
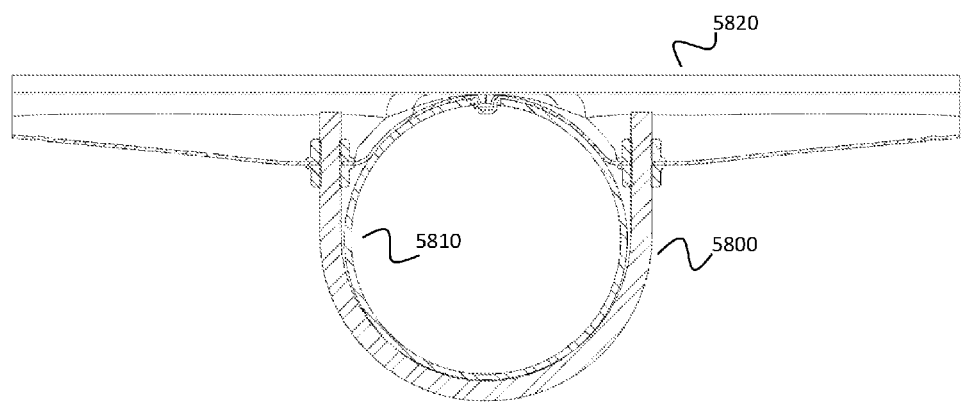
FIG. 59 illustrates a front view diagram of the U-bolt configured to a torque tube according to an example of the present invention.

FIG. 59 illustrates a front view diagram of the U-bolt 5800 configured to a torque tube 5810 for a solar panel bracket according to an example of the present invention. In an example, the clamp support member comprising a first end and a second end and has a length in between the first end and the second end. A width is also included. In an example, the clamp support member being configured a saddle region having a first opening and a second opening and an inner opening such that a first leg of a U-bolt 5800 is inserted into the first opening and a second leg of the U-bolt 5800 is inserted into the second opening while a clamp member is positioned to hold the U-bolt 5800 in place to secure a portion of the torque tube 5810 to an opposite side of the saddle region while the clamp member is in intimate contact with the inner opening using a male portion provided within the inner opening to fit the male portion within the inner opening.

Figure 60:
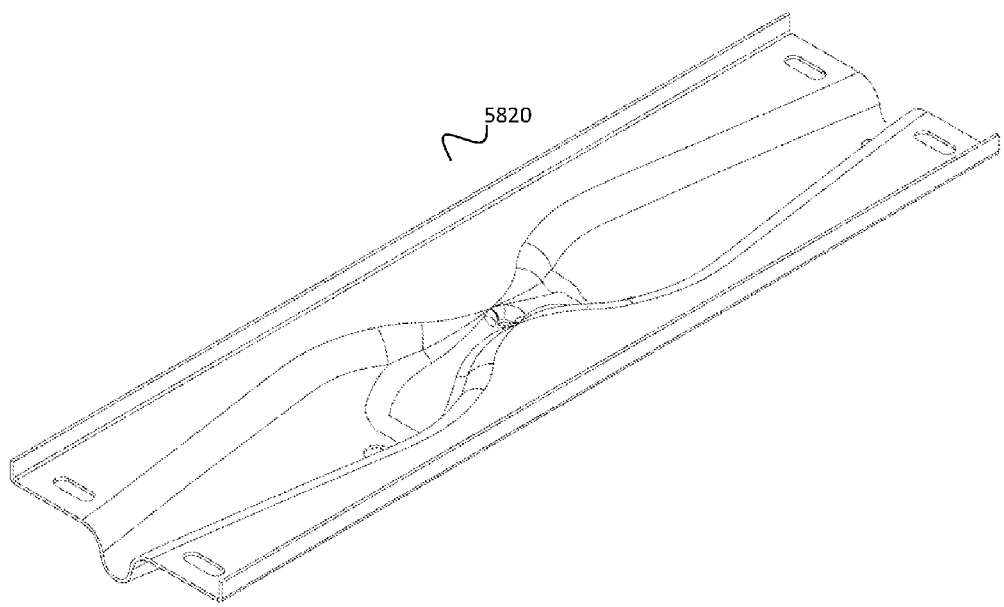
FIG. 60 illustrate a perspective view of a support member for the U-bolt configured to a torque tube according to an example of the present invention.

FIG. 60 illustrate a perspective view of a support member for the U-bolt 5800 configured to a torque tube 5810 for a solar panel bracket according to an example of the present invention. In an example as shown, the support member the first end and the second end and has the length in between the first end and the second end. The width is also included. In an example, the clamp support member 5820 has a saddle region having a first opening and a second opening and an inner opening such that a first leg of a U-bolt 5800 is inserted into the first opening and a second leg of the U-bolt 5800 is inserted into the second opening while a clamp member is positioned to hold the U-bolt 5800 in place to secure a portion of the torque tube 5810 to an opposite side of the saddle region while the clamp member is in intimate contact with the inner opening using a male portion provided within the inner opening to fit the male portion within the inner opening.

In an example, the present parts and elements can be made of suitable material, such as steel, aluminum, or other alloys. Additionally, such steel and/or alloys and/or aluminum can be cast, stamped, or welded, or combinations thereof. Of course, there can be other variations, modifications, and alternatives. In an example, the drive motor is operable to move the torque tube 5810 about the center of rotation and is substantially free from a load and move the torque tube 5810 about the center of rotation at substantially a same force from a first radial position to a second radial position.

Figure 61:
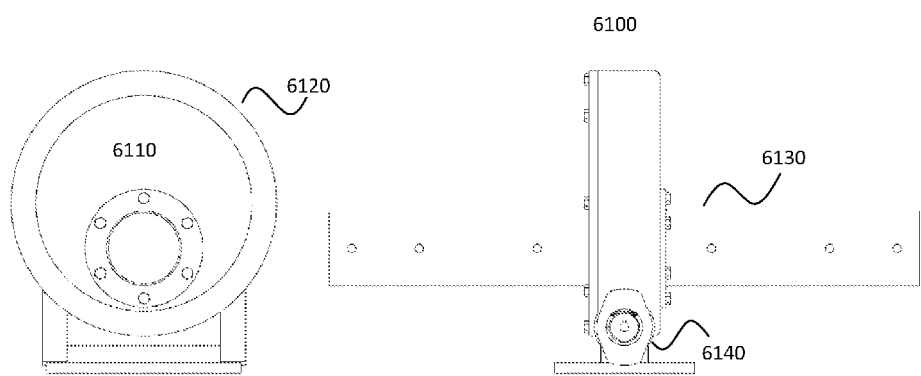
FIG. 61 illustrates a front view diagram and a side view diagram of an off-set slew gear drive according to an example of the present invention.

FIG. 61 illustrates a front view diagram and a side view diagram of an off-set slew gear drive 6100 according to an example of the present invention. In an example, a solar tracker apparatus is shown. The left side diagram illustrates a front view diagram, while the right side diagram is a side view diagram. In an example, the apparatus has an inner race structure 6110. The inner race structure 6110 comprising a cylindrical region coupled to a main body region. The main body comprising an off-set open region (which is fitted with the torque tube sleeve).

In an example, the apparatus has an outer race structure 6120 coupled to enclose the inner race structure 6110, and configured to couple the inner race structure 6110 to allow the inner race structure 6110 to move in a rotational manner about a spatial arc region. The outer race structure 6120 is also configured to allow the inner race structure 6110 to pivot about a region normal to a direction of the spatial arc region, as will be further described. In an example, the outer race structure 6120 is configured from a rigid steel structure and shaped as an annular sleeve having a main hub region for a slew gear device and a support structure comprising a flat region for a pier structure.

As shown, a torque tube sleeve 6130 is configured in an off-set manner on a region between a center region and an outer region of the inter race structure 6110. The torque tube sleeve 6130 is also configured to be inserted within the off-set open region. As shown, the torque tube sleeve 6130 has a plurality of openings for fasteners.

As shown, the outer race structure has a main hub configured with a drive 6140 coupled to the inner race structure 6110 to cause the torque tube to move about an arc region. In an example, the drive 6140 comprises a slew gear device. The slew gear device comprising a worm gear operably coupled to a portion of the inner race structure 6110 comprising a plurality of gears, while other portions of the inner race structure 6110 are smooth. In an example, the drive 6140 comprises a slew gear device that transfers torque for rotating the inter race structure from a first spatial region to a second spatial region and then from the first spatial region to the second spatial region in a rocking motion to track movement of a solar source. That is, the first spatial region to the second spatial region comprises 360 degrees, or can range up to 120 degrees or up to 140 degrees, although there can be variations.

Figure 62:
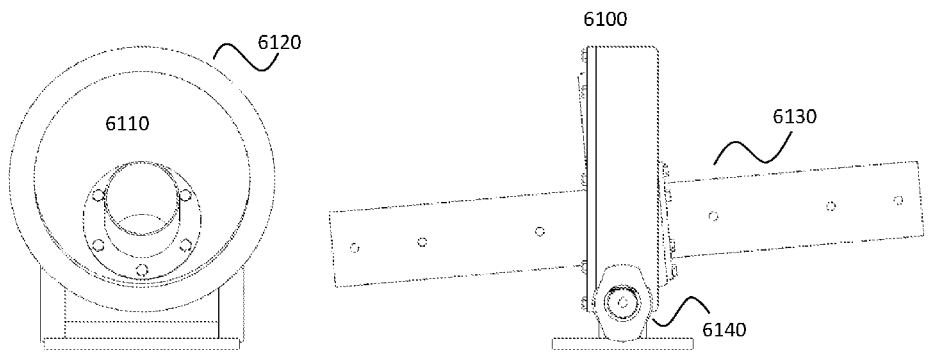
FIG. 62 illustrates a front view diagram and a side view diagram of an off-set slew gear drive in a pivot position according to an example of the present invention.

FIG. 62 illustrates a front view diagram and a side view diagram of an off-set slew gear drive 6100 in a pivot position according to an example of the present invention. As shown, the inner race structure 6110 is coupled to the outer race structure 6120 using a bearing or a bushing device to couple the inner race structure 6110 to the outer race structure 6120 for the radial movement about a direction substantially parallel to a length of the torque tube. In an example, the inner race comprises a plurality of gear structures; and further comprises a bearing assembly or a bushing assembly configured within an inner region of the gear structure (not shown).

In an example, the torque tube sleeve 6130 is configured with the region using a cylindrical bearing assembly to facilitate movement of the about of the spatial arc and facilitate movement normal to the spatial arc to pivot the inner race structure 6110. As shown, the torque tube pivots and can also move about the radial movement in an arc, while accommodating changes in height on either end of the torque tube, among other variations. Of course, there can be other variations, modifications, and alternatives.

Figure 63:
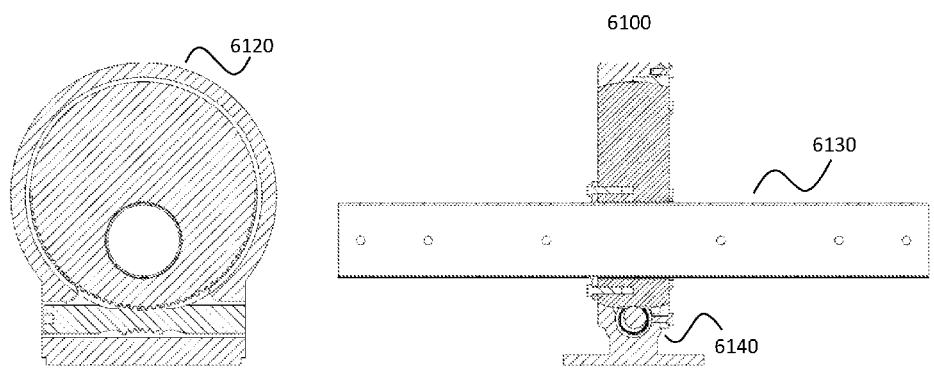
FIG. 63 illustrates cross-sections of front view diagram and a side view diagram of an off-set slew gear drive according to an example of the present invention.

FIG. 63 illustrates cross-sections of front view diagram and a side view diagram of an off-set slew gear drive 6100 according to an example of the present invention. In an example, cross-sections of the aforementioned diagrams are shown. The cut away shows the plurality of gears on the inner race region operably coupled to the worm gear to facilitate movement of the inner race structure 6110. As shown are both the front view cross-section and the side-view cross-section. Of course, there can be other variations, modifications, and alternatives.

Figure 64:
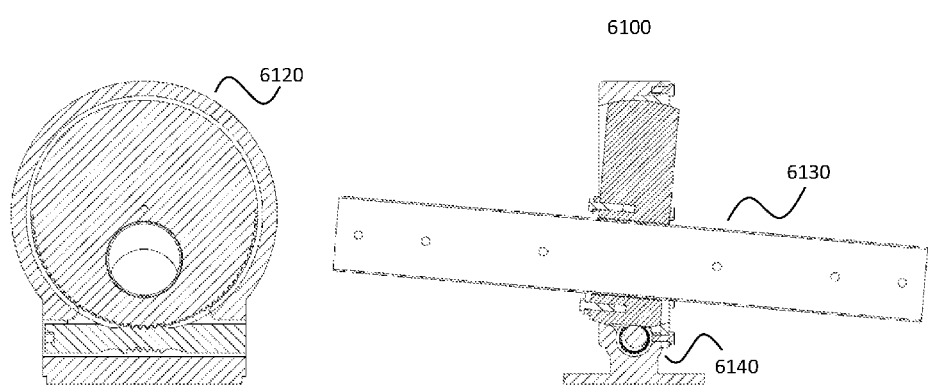
FIG. 64 illustrates cross sections of front view diagram and a side view diagram of an off-set slew gear drive in a pivot position according to an example of the present invention.

FIG. 64 illustrates cross sections of front view diagram and a side view diagram of an off-set slew gear drive 6100 in a pivot position according to an example of the present invention. In an example, cross-sections of the aforementioned diagrams are shown. The cut away shows the plurality of gears on the inner race region operably coupled to the worm gear to facilitate movement of the inner race structure 6110. Additionally, the cross-sections illustrate a pivot movement about a region to allow the torque tube to move about a solid conical space on each side of the inner race region in other examples. As shown are both the front view cross-section and the side-view cross-section. Of course, there can be other variations, modifications, and alternatives.

Figure 65:
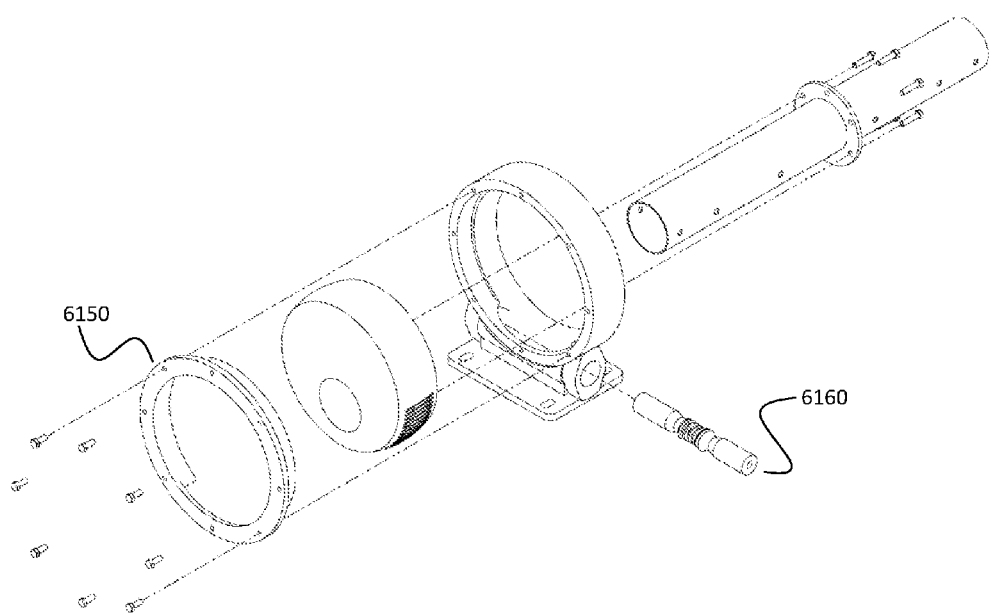
FIG. 65 is an exploded view of an off-set slew gear device in an example of the present invention.

FIG. 65 is an exploded view of an off-set slew gear device 6100 in an example of the present invention. As shown, the assembly has an inner race structure 6110 shaped as a cylindrical drum. The assembly has an outer race structure 6120 coupled to enclose the inner race structure 6110. The outer race structure 6120 is shaped as an annular frame structure to enclose the inner race structure 6110. In an example, the outer race structure 6120 is configured from a rigid steel structure. In an example, the inner race is coupled to the outer face using a bearing or a bushing device. In an example, the inner race comprises a plurality of gear structure; and further comprises a bearing assembly or a bushing assembly configured within an inner region of the gear structure. The bearing or bushing assembly operably couples the outer race structure 6120 to the inner race structure 6110 to allow the inner face structure to rotate freely within the outer race structure 6120.

As further shown, the assembly has a ring clamp member 6150 comprising a plurality of openings. The clamp member 6150 is disposed on one side of the inner race member while a bearing or bushing assembly provided on the outer face member is disposed on the other side to sandwich the inter race member in between the clamp member 6150 and the outer face member. A plurality of bolts and/or other fasteners each of which is firmly engaged to maintain the inner race member within the outer race member during operation. In an example the torque tube comprises a flange structure configured and firmly attached around a periphery of the torque tube, as shown. The flange has a plurality of openings, each of which can include a bolt that firmly engages the flange structure along with the torque tube to the inner race structure 6110. That is, the inner race structure 6110 is firmly engaged and fixed in place with the torque tube, which rotates along with the inner race structure 6110. The torque tube is driven by a drive motor, which turns the worm gear to facilitate movement of the inner race structure 6110 about an arc or even for 360 degrees, in one or more examples. Of course, there can be other variations, modifications, and alternatives.

In an example, the assembly has a torque tube sleeve 6130 configured in an off-set manner on a region between a center region of the inner race structure 6110 and an outer region of the inter race structure. As shown, the inner race structure 6110 has an opening configured in an off-set manner to allow the torque tube sleeve 6130 to be inserted into the opening in a direction normal to the face of the inner race structure 6110.

In an example, a drive is coupled to the inner race structure 6110 to cause the torque tube to move about an arc region. As shown, a portion of the inner race structure 6110 has a plurality of gears formed on the surface of the outer surface of the inner race structure 6110. In an example, the drive comprises a slew gear device, which is coupled to the plurality of gears. In an example, the drive comprises a slew gear device that transfers torque for rotating the inter race structure about the outer race structure 6120 to cause the torque tube to rotate about an arc region that is continuous from a first spatial region to a second spatial region.

In an example, as shown, the outer race structure 6120 comprises a main hub region configured in a perpendicular direction to a worm gear assembly. As shown, the main hub region is configured on a lower portion of the inner race structure 6110. In an example, the main hub region is configured with a shaft 6160 including a plurality of gears, which operably couple to the inner race structure 6110 comprising gears. The gears on the shaft 6160 cause the inner race structure 6110 to move in either direction in a rotational action. In an example, the worm gear assembly being coupled to an electric motor drive, which provides for the movement of the inner race structure 6110.

In an example, the torque tube sleeve 6130 is configured with the region using a cylindrical bearing assembly fitted within the inner race structure 6110. The cylindrical bearing allows the torque tube to pivot about a region to allow the torque tube to move freely about a conical spatial region on each side of the inner race structure 6110. In an example, the torque tube sleeve 6130 can pivot up to an angle range up to 10 degrees or 15 degrees relative to a face of the inner race structure 6110. In an example, the region is characterized by solid angle characterizing a cone having an acute angle of 20 to 30 degrees (as measured from each inner region of the cone along any point in a z-axis direction, where the apex is defined by a region where the torque tube is coupled to the inner race region), although there may be variations.

As shown, the main hub region comprises a support structure. The support structure comprises a flat region having a plurality of openings. The flat region is provided to be assembled onto a pier structure, such as those previously noted, as well as outside of the present specification. Of course, there can be other variations, modifications, and alternatives. In other embodiments, the torque tube is configured within a center region of the inner race structure 6110, while the torque tube is configured in an off-set manner using an elbow and bend. Of course, there can be other variations, modifications, and alternatives.

Figure 66:
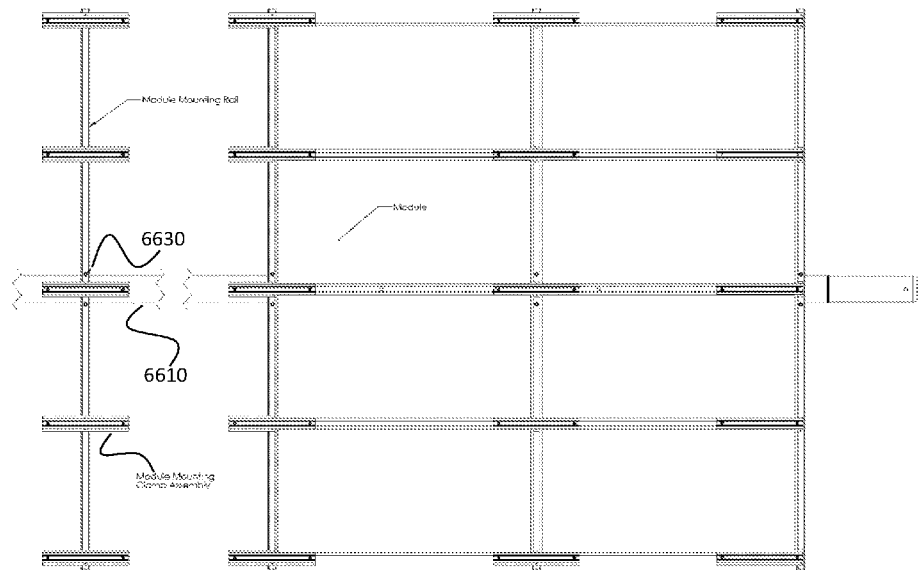
FIG. 66 is a simplified diagram of a top view of an array of solar modules configured on a tracker apparatus according to an embodiment of the present invention.

FIG. 66 is a simplified diagram of a top view of an array of solar modules configured on a tracker apparatus according to an embodiment of the present invention. As shown, a torque tube is configured from a first end to a second end via a center region of the array of solar modules. Each column of solar modules comprises at least four modules in a serial configuration. A second row of four modules is disposed against the first row of solar modules. A plurality of rows numbered from 3 to N form the remainder of the array of solar modules. A plurality of clamps are configured to hold the array together onto a frame assembly. The frame assembly is coupled to the torque tube 6610 using a U-bolt assembly 6630. The frame assembly comprises a plurality of members running normal to a length of the torque tube 6610, as shown. Each member also runs normal to a length of each of the clamps. Of course, there can be other variations, modifications, and alternatives.

In an example, the frame member, clamp, and other members can be made of a suitable material such as rolled steel, stamped steel, cast steel, or others. In an example, the steel sheet metal can include ASTM A572 Grade 50, among other materials, combinations of materials, and the like. Depending upon the embodiment, the material can be coated or uncoated. Of course, there can be other variations, modifications, and alternatives.

Figure 67:
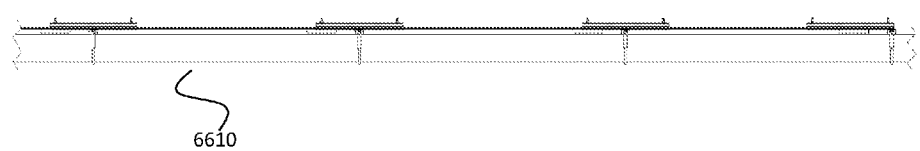
FIG. 67 is a simplified diagram of a side-view of an array of solar modules configured on a torque tube for a tracker apparatus according to an embodiment of the present invention.

FIG. 67 is a simplified diagram of a side-view of an array of solar modules configured on a torque tube 6610 for a tracker apparatus according to an embodiment of the present invention. As shown, the torque tube 6610 is configured from a first end to a second end via a center region of the array of solar modules. Each column of solar modules comprises at least four modules in a serial configuration. A second row of four modules is disposed against the first row of solar modules. A plurality of rows numbered from 3 to N form the remainder of the array of solar modules. A plurality of clamps is configured to hold the array together onto a frame assembly. The frame assembly is coupled to the torque tube 6610 using a U-bolt assembly 6630, which couple each of the solar modules in place. As shown, a side view diagram of a U-bolt having a bottom region configured around a portion of the torque tube 6610 while being pulled by a clamp member coupled to each member of the frame. A U-bolt clamp is configured on each end of the U-bolt while the frame member is in between to secure the torque tube 6610, frame member, and plurality of modules together. Of course, there can be other variations, modifications, and alternatives.

Figure 68:
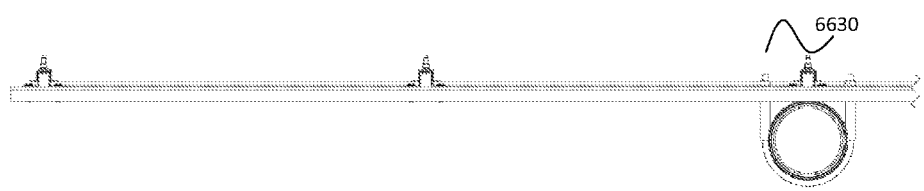
FIG. 68 is a simplified diagram of a front-view of an array of solar modules configured on a torque tube for a tracker apparatus according to an embodiment of the present invention.

FIG. 68 is a simplified diagram of a front-view of an array of solar modules configured on a torque tube 6610 for a tracker apparatus according to an embodiment of the present invention. As shown, the torque tube 6610 is configured from a first end to a second end via a center region of the array of solar modules. Each column of solar modules comprises at least four modules in a serial configuration. A second row of four modules is disposed against the first row of solar modules. A plurality of rows numbered from 3 to N form the remainder of the array of solar modules. A plurality of clamps is configured to hold the array together onto a frame assembly. The frame assembly is coupled to the torque tube 6610 using a U-bolt assembly 6630. As shown, a side view diagram of a U-bolt having a bottom region configured around a portion of the torque tube 6610 while being pulled by a clamp member coupled to each member of the frame. Of course, there can be other variations, modifications, and alternatives.

Figure 69:
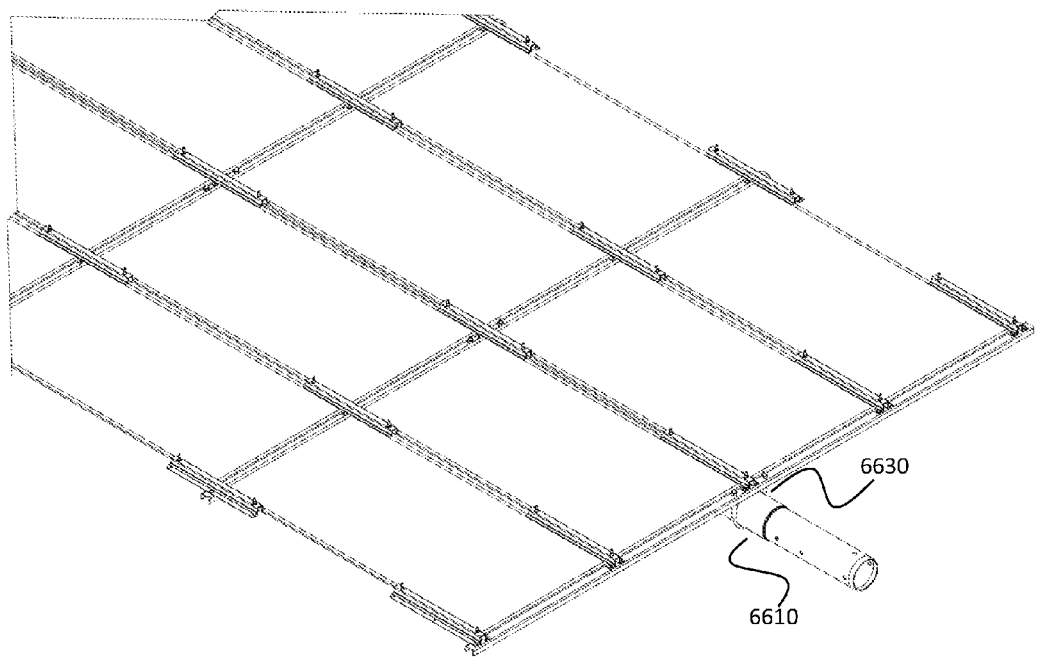
FIG. 69 is a simplified diagram of a perspective-view of an array of solar modules configured on a tracker apparatus according to an embodiment of the present invention.

FIG. 69 is a simplified diagram of a perspective-view of an array of solar modules configured on a tracker apparatus according to an embodiment of the present invention. As shown, the perspective view emphasizes a top portion of the plurality of solar modules configured in an array.

Figure 70:
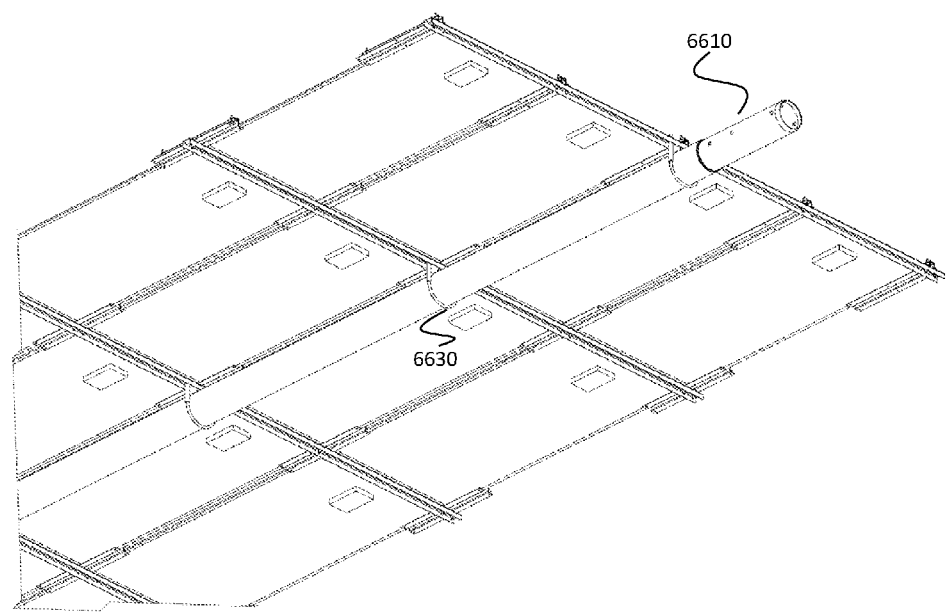
FIG. 70 is a simplified diagram of a perspective-view of an array of solar modules configured on a tracker apparatus according to an embodiment of the present invention.

FIG. 70 is a simplified diagram of a perspective-view of an array of solar modules configured on a tracker apparatus according to an embodiment of the present invention. As shown, the perspective view emphasizes a bottom portion of the plurality of solar modules configured in an array. As shown, a plurality of U-bolt clamp assemblies are spatially disposed along portions the torque tube 6610. Each spacing between each pair of clamps has a similar or same distance for a length of the torque tube 6610 in an example. Each of the U-bolt clamp assemblies is configured on a frame member, which runs normal to a length of the torque tube 6610.

Figure 71:
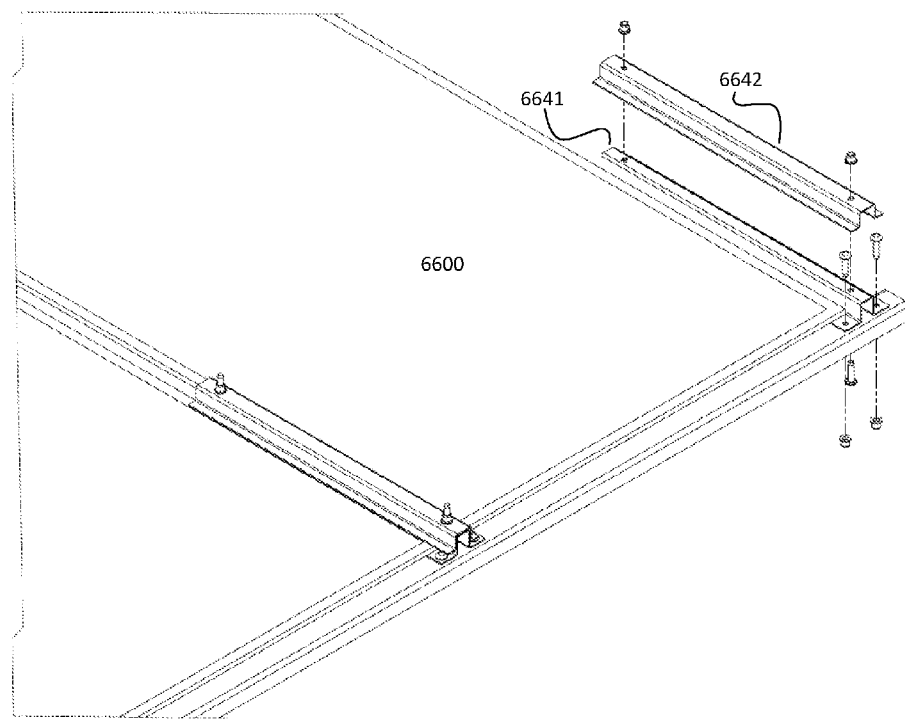
FIG. 71 illustrates each of the clamp members configured to hold edges of at least a pair of solar modules together.

FIG. 71 illustrates each of the clamp members configured to hold edges of at least a pair of solar modules together. As shown, the clamp members comprise a bottom hat channel clamp member 6641 and a top hat channel clamp member 6642, which sandwich edges of the pair of solar panels. The bottom hat channel clamp 6641 is disposed on a frame member. An edge or edges of a solar module 6600 or modules is placed on a brim region of the bottom hat channel member 6641. The bottom hat channel member 6641 is fixed to the frame member using a pair of nuts and bolts configured on each side of a channel region of the hat channel clamp. The top hat channel clamp member 6642, which has a slightly larger inner width than a width of the bottom hat channel member 6641, is configured to intimately couple a protruding channel or male portion with the bottom hat channel member 6641 with a slot or female portion of the top hat channel member 6642 while leaving a spatial gap between an upper surface of the bottom hat channel member 6641 and a bottom surface of the top hat channel member 6642. In an example, the gap can be used to form a spring action to cause force to increase as a nut member is secured form an outer region to an inner region. The increase in force leads to a secure attachment of edges of the solar modules between each of the hat channel members. In an example, the pair of hat channel members causes a mechanical load on each brim region of the top hat channel member 6642 to sandwich each of the edges between the top hat channel member 6642 and the bottom hat channel member 6641. In an example, the top hat channel member 6642 is made of a suitable material, which is different in thickness for example, to desirably compress edges of the solar modules between each of the hat channel members.

In an example, each of the hat channel members is configured with a compressible material such as a plastic or polymer, de-formal or conformal material, rubber or sponge like material, or other structure that facilitates friction in the sandwich structure to prevent movement or sliding of any of the solar modules.

Figure 72:
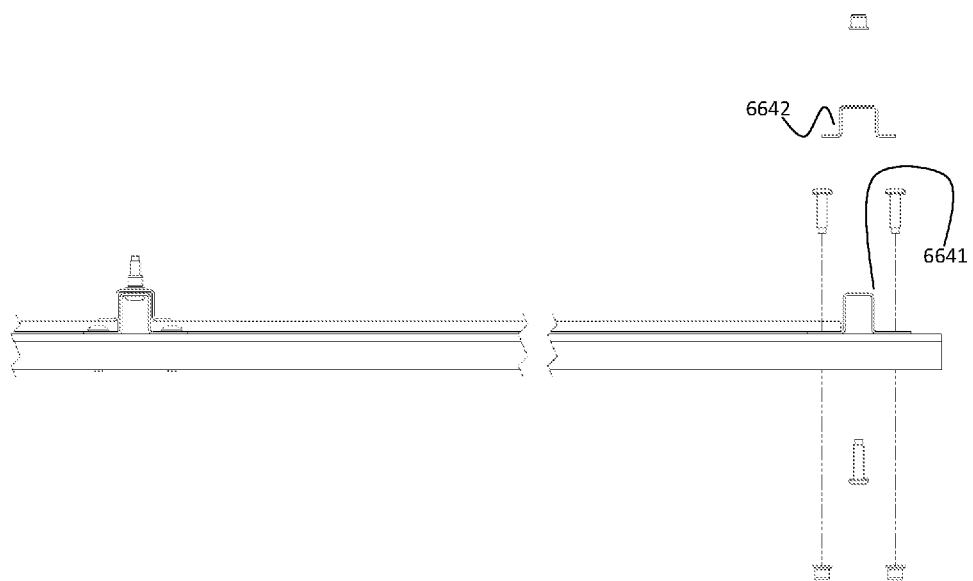
FIG. 72 illustrates a front view diagram of each of the clamp members configured to hold edges of at least a pair of solar modules together.

FIG. 72 illustrates a front view diagram of each of the clamp members configured to hold edges of at least a pair of solar modules together. In other examples at an edge of an entire array, each clamp member can hold an edge of a single solar module or a pair. In other locations, the clamp can hold up to four panels together, which have four corners together. As shown, the clamp members comprise a bottom hat channel clamp member 6641 and a top hat channel clamp member 6642, which sandwich edges of the pair of solar panels. The bottom hat channel clamp 6641 is disposed on a frame member. An edge or edges of a solar module 6600 or modules is placed on a brim region of the bottom hat channel member 6641. The bottom hat channel member 6641 is fixed to the frame member using a pair of nuts and bolts configured on each side of a channel region of the hat channel clamp. As shown, a bolt inserted from a bottom portion of the frame member, extends through both hat channel members, and protrudes through an upper surface of the top hat channel member 6642. A nut is configured on the bolt to firmly engage the structure together. Of course, there can be other variations, modifications, and alternatives.

Figure 73:
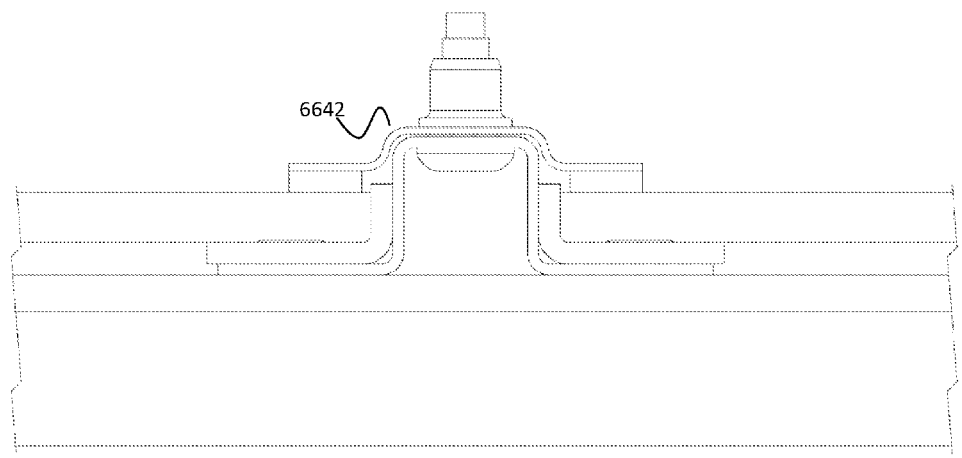
FIG. 73 is a simplified front-view diagram of a clamp assembly according to an example of the present invention.

FIG. 73 is a simplified front-view diagram of a clamp assembly according to an example of the present invention. As shown, the clamp members comprise a bottom hat channel clamp member 6641 and a top hat channel clamp member 6642, which sandwich edges of the pair of solar panels. The bottom hat channel clamp 6641 is disposed on a frame member. An edge or edges of a solar module 6600 or modules is placed on a brim region of the bottom hat channel member 6641. The bottom hat channel member 6641 is fixed to the frame member using a pair of nuts and bolts configured on each side of a channel region of the hat channel clamp. As shown, a bolt inserted from a bottom portion of the frame member, extends through both hat channel members, and protrudes through an upper surface of the top hat channel member 6642. A nut is configured on the bolt to firmly engage the structure together. As also shown, a compressible material such as a plastic or polymer, deformal or conformal material, rubber or sponge like material, or other structure is disposed between each edge of the solar module edge overlying a portion of an edge of a channel region, and overlying an upper surface of each brim region. A thickness of compressive material is also disposed between an underlying region of the brim on the top hat channel member 6642 and an upper edge portion of the solar module 6600. Each of the compressive materials (on each side of the channel region-four total) provides friction in a sandwich structure to prevent movement or sliding of any of the solar modules among each other. Of course, there can be other variations, modifications, and alternatives.

It is understood that the examples and embodiments described herein are for illustrative purposes only and that various modifications or changes in light thereof will be suggested to persons skilled in the art and are to be included within the spirit and purview of this application and scope of the appended claims.

I claim:

1. A solar tracker apparatus, the apparatus comprising:
   a inner race structure, the inner race structure comprising a cylindrical region coupled to a main body region, the main body comprising an off-set open region;
   an outer race structure coupled to enclose the inner race structure, and configured to allow the inner race structure to move in a rotational manner about a spatial arc region; and configured to allow the inner race structure to pivot about a region normal to a direction of the spatial arc region;
   a torque tube sleeve configured in an off-set manner on a region between a center region and an outer region of the inner race structure, and configured to be inserted within the off-set open region; and
   a drive coupled to the inner race structure to cause the inner race structure to rotate within the outer race structure.

2. The apparatus of claim 1 wherein drive comprises a slew gear device, the slew gear device comprising a worm gear operably coupled to a portion of the inner race structure comprising a plurality of gears; and further comprising a flange structure configured and firmly attached around a periphery of the torque tube, flange having a plurality of openings, each of which can include a bolt that firmly engages the flange structure along with the torque tube to the inner race structure such that the inner race structure is firmly engaged and fixed in place with the torque tube, which rotates along with the inner race structure.

3. The apparatus of claim 1 wherein the outer race structure is configured from a rigid steel structure and shaped as an annular sleeve having a main hub region for a slew gear device and a support structure comprising a flat region for a pier structure.

4. The apparatus of claim 1 wherein the drive comprises a slew gear device that transfers torque for rotating the inner race structure from a first spatial region to a second spatial region and then from the first spatial region to the second spatial region in a rocking motion to track movement of a solar source.

5. The apparatus of claim 1 wherein the inner race structure is coupled to the outer race structure using a bearing or a bushing device to couple the inner race structure to the outer race structure for the radial movement.

6. The apparatus of claim 1 wherein the inner race comprises a plurality of gear structures; and further comprises a bearing assembly or a bushing assembly configured within an inner region of the gear structure.

7. The apparatus of claim 1 wherein the torque tube sleeve is configured with the region using a cylindrical bearing assembly to pivot the inner race structure with respect to the outer race structure.

8. The apparatus of claim 1 wherein the outer race structure comprises a main hub region configured in a perpendicular direction to a worm gear assembly; and further comprising a clamp member to sandwich the inner race structure between the clamp member and the outer race structure.

9. The apparatus of claim 1 wherein the outer race structure comprises a main hub region configured in a perpendicular direction to a worm gear assembly, the worm gear assembly being coupled to an electric motor drive.

10. The apparatus of claim 1 further comprising a torque tube coupled to the torque tube sleeve; and further comprising a plurality of solar panels configured on the torque tube.

11. A solar tracker apparatus, the apparatus comprising:
    a inner race structure, the inner race structure comprising a cylindrical region coupled to a main body region, the main body comprising an off-set open region;
    an outer race structure coupled to enclose the inner race structure, and configured to allow the inner race structure to move in a rotational manner about a spatial arc region; and configured to allow the inner race structure to pivot about a region normal to a direction of the spatial arc region;
    a torque tube sleeve configured in an off-set manner on a region between a center region and an outer region of the inner race structure, and configured to be inserted within the off-set open region;
    a cylindrical bearing assembly coupling the inner race structure to the outer race structure to facilitate movement about the spatial arc region and facilitate movement normal to the spatial arc region to pivot the inner race structure to allow each side of the torque tube sleeve to move about a spatial region defined by a conical region at any point about the spatial arc region; and
    a drive coupled to the inner race structure to cause the inner race structure to rotate within the outer race structure.

12. The apparatus of claim 11 wherein drive comprises a slew gear device, the slew gear device comprising a worm gear operably coupled to a portion of the inner race structure comprising a plurality of gears.

13. The apparatus of claim 11 wherein the outer race structure is configured from a rigid steel structure and shaped as an annular sleeve having a main hub region for a slew gear device and a support structure comprising a flat region for a pier structure.

14. The apparatus of claim 11 wherein the drive comprises a slew gear device that transfers torque for rotating the inner race structure from a first spatial region to a second spatial region and then from the first spatial region to the second spatial region in a rocking motion to track movement of a solar source.

15. The apparatus of claim 11 wherein the inner race comprises a plurality of gear structures; and wherein the outer race structure comprises a main hub region configured in a perpendicular direction to a worm gear assembly; and further comprising a clamp member to sandwich the inner race structure between the clamp member and the outer race structure.

16. The apparatus of claim 11 wherein the outer race structure comprises a main hub region configured in a perpendicular direction to a worm gear assembly, the worm gear assembly being coupled to an electric motor drive.

17. The apparatus of claim 11 further comprising a torque tube coupled to the torque tube sleeve; and further comprising a plurality of solar panels configured on the torque tube.

\* \* \* \* \*